United States Patent
Carnevali

(10) Patent No.: US 10,630,334 B2
(45) Date of Patent: Apr. 21, 2020

(54) DOCKING SLEEVE WITH ELECTRICAL ADAPTER

(71) Applicant: National Products, Inc., Seattle, WA (US)

(72) Inventor: Jeffrey D. Carnevali, Seattle, WA (US)

(73) Assignee: National Products, Inc., Seattle, WA (US)

(*) Notice: Subject to any disclaimer, the term of this patent is extended or adjusted under 35 U.S.C. 154(b) by 0 days.

(21) Appl. No.: 16/233,662

(22) Filed: Dec. 27, 2018

(65) Prior Publication Data
US 2019/0132019 A1   May 2, 2019

Related U.S. Application Data

(63) Continuation of application No. 15/960,274, filed on Apr. 23, 2018, now Pat. No. 10,389,399, which is a
(Continued)

(51) Int. Cl.
*H04M 1/00* (2006.01)
*H04B 1/3888* (2015.01)
(Continued)

(52) U.S. Cl.
CPC ......... *H04B 1/3888* (2013.01); *G06F 1/1628* (2013.01); *G06F 1/1632* (2013.01);
(Continued)

(58) Field of Classification Search
CPC ... H01R 13/6205; H01R 31/06; H02J 7/0044; H02J 7/0045; Y02E 60/12; H04M 1/0214; H04B 1/3888
(Continued)

(56) References Cited

U.S. PATENT DOCUMENTS

| 809,977 A | 1/1906 | O'Brien |
| 1,786,459 A | 7/1926 | Simons |

(Continued)

FOREIGN PATENT DOCUMENTS

| CN | 101674096 | 3/2010 |
| CN | 202268924 | 6/2012 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.
(Continued)

*Primary Examiner* — Thanh Tam T Le
(74) *Attorney, Agent, or Firm* — Lowe Graham Jones PLLC; Bruce E. Black

(57) ABSTRACT

A protective arrangement for an electronic device includes a flexible cover having a panel and a skirt that form an interior cavity to receive an electronic device; and an adapter fixedly positioned in the flexible cover and having a male plug with connectors extending into the interior cavity of the flexible cover for mating with a female socket of the device and a contactor with contacts adjacent outwardly from the flexible cover and electrically coupled to one or more of the connectors of the plug. A docking cradle or external adapter can receive the electronic device and cover.

18 Claims, 32 Drawing Sheets

Related U.S. Application Data continuation of application No. 15/195,176, filed on Jun. 28, 2016, now Pat. No. 10,050,658, which is a continuation-in-part of application No. 14/936,517, filed on Nov. 9, 2015, now Pat. No. 9,706,026, which is a continuation-in-part of application No. 14/829,378, filed on Aug. 18, 2015, now Pat. No. 9,602,639, which is a continuation-in-part of application No. 14/754,492, filed on Jun. 29, 2015, now Pat. No. 9,529,387, which is a continuation-in-part of application No. PCT/US2015/017131, filed on Feb. 23, 2015, said application No. 15/960,274 is a continuation-in-part of application No. 14/222,320, filed on Mar. 21, 2014, now Pat. No. 9,331,444.

(60) Provisional application No. 62/040,037, filed on Aug. 21, 2014, provisional application No. 61/943,986, filed on Feb. 24, 2014.

(51) Int. Cl.
*G06F 1/16* (2006.01)
*H01R 31/06* (2006.01)
*H04M 1/18* (2006.01)
*H01R 13/62* (2006.01)
*H04M 1/02* (2006.01)
*H04M 1/04* (2006.01)
*A45C 11/00* (2006.01)
*H04M 1/725* (2006.01)

(52) U.S. Cl.
CPC ............ *H01R 31/06* (2013.01); *H04M 1/185* (2013.01); *A45C 2011/002* (2013.01); *A45C 2011/003* (2013.01); *G06F 2200/1633* (2013.01); *H01R 13/6205* (2013.01); *H04M 1/0274* (2013.01); *H04M 1/04* (2013.01); *H04M 1/72527* (2013.01)

(58) Field of Classification Search
USPC ............ 439/38, 39, 638, 929; 320/114, 115; 361/679.41; 455/575.1, 575.8, 575.9
See application file for complete search history.

(56) References Cited

U.S. PATENT DOCUMENTS

| | | |
|---|---|---|
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,535,274 A * | 7/1996 | Braitberg ............... H04M 1/738 379/446 |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 * | 6/2004 | Lundstrom ............. H04M 1/04 379/446 |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,641,477 B2 | 1/2010 | DiFonzo et al. |
| 7,645,143 B2 | 1/2010 | Rohrbach et al. |
| 7,663,879 B2 | 2/2010 | Richardson et al. |

(56) References Cited

U.S. PATENT DOCUMENTS

| | | | |
|---|---|---|---|
| 7,688,580 B2 | 3/2010 | Richardson et al. | |
| 7,812,567 B2 * | 10/2010 | Shen | H02J 7/0044 |
| | | | 310/50 |
| 7,841,776 B2 | 11/2010 | DiFonzo et al. | |
| 7,850,032 B2 | 12/2010 | Carnevali et al. | |
| 7,855,529 B2 | 12/2010 | Liu | |
| 7,889,489 B2 | 2/2011 | Richardson et al. | |
| 7,901,216 B2 | 3/2011 | Rohrbach et al. | |
| 7,907,394 B2 | 3/2011 | Richardson et al. | |
| 8,061,516 B2 | 11/2011 | Carnevali | |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,172,580 B1 | 5/2012 | Chen et al. | |
| 8,177,560 B2 | 5/2012 | Rohrbach et al. | |
| 8,183,825 B2 | 5/2012 | Sa | |
| 8,224,408 B2 | 7/2012 | Tomasini et al. | |
| 8,390,255 B1 | 3/2013 | Fathollahi | |
| 8,405,974 B2 | 3/2013 | Sayavong | |
| 8,435,042 B2 | 5/2013 | Rohrbach et al. | |
| 8,453,835 B2 | 6/2013 | So | |
| 8,483,758 B2 | 7/2013 | Huang | |
| 8,497,753 B2 | 7/2013 | DiFonzo et al. | |
| 8,560,014 B1 | 10/2013 | Hu et al. | |
| 8,634,887 B2 | 1/2014 | Hu et al. | |
| 8,639,288 B1 | 1/2014 | Friedman | |
| 8,646,698 B2 | 2/2014 | Chen et al. | |
| 8,690,582 B2 | 4/2014 | Rohrbach et al. | |
| 8,729,854 B2 | 5/2014 | Tsai et al. | |
| 8,760,311 B2 | 6/2014 | Heaton | |
| 8,763,802 B2 | 7/2014 | Ellis-Brown | |
| 8,801,441 B2 | 8/2014 | Zhang et al. | |
| 8,825,123 B1 | 9/2014 | Gudino | |
| 8,891,800 B1 | 11/2014 | Shaffer | |
| 8,907,783 B2 * | 12/2014 | Fish | H01R 13/6205 |
| | | | 340/539.12 |
| 8,911,246 B2 | 12/2014 | Carnevali | |
| 8,929,065 B2 | 1/2015 | Williams | |
| 8,950,717 B2 | 2/2015 | Chuang | |
| 8,970,332 B2 | 3/2015 | DiFonzo et al. | |
| 9,026,187 B2 | 5/2015 | Huang | |
| 9,071,060 B2 | 6/2015 | Fathollahi | |
| 9,072,172 B2 | 6/2015 | Hsu | |
| 9,112,304 B2 | 8/2015 | Rohrbach et al. | |
| 9,123,935 B2 | 9/2015 | Huang | |
| 9,172,781 B1 | 10/2015 | Goldstein | |
| 9,356,267 B1 | 5/2016 | To et al. | |
| 9,647,474 B2 | 5/2017 | Fathollahi et al. | |
| 2004/0108348 A1 | 6/2004 | Barnes | |
| 2005/0189354 A1 | 9/2005 | Heather et al. | |
| 2006/0058073 A1 | 3/2006 | Kim | |
| 2006/0175766 A1 | 8/2006 | Carnevali | |
| 2009/0160400 A1 | 6/2009 | Woud | |
| 2009/0314400 A1 | 12/2009 | Liu | |
| 2012/0018325 A1 | 1/2012 | Kim | |
| 2012/0043235 A1 | 2/2012 | Klement | |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0331156 A1 | 12/2013 | Lui | |
| 2013/0334071 A1 | 12/2013 | Carnevali | |
| 2015/0146401 A1 | 5/2015 | Su et al. | |
| 2015/0189780 A1 | 7/2015 | Su et al. | |
| 2017/0227987 A1 | 8/2017 | Carnevali et al. | |

FOREIGN PATENT DOCUMENTS

| | | |
|---|---|---|
| CN | 204408423 | 6/2015 |
| JP | 2004-349969 | 12/2004 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |

OTHER PUBLICATIONS

Officeonthego.com, 3 pages of product description of Magnifico® PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

International Search Report and Written Opinion for PCT/US2015/017131 dated Apr. 20, 2015.

Official Communication for U.S. Appl. No. 14/222,320 dated Sep. 18, 2015.

Official Communication for U.S. Appl. No. 14/667,564 dated Jul. 9, 2015.

Official Communication for U.S. Appl. No. 14/829,378 dated Jul. 13, 2016.

Official Communication for U.S. Appl. No. 14/754,492 dated Jul. 13, 2016.

Official Communication for U.S. Appl. No. 14/936,517 dated Sep. 15, 2016.

International Search Report and Written Opinion for PCT/US2016/039876 dated Sep. 26, 2016.

Official Communication for U.S. Appl. No. 14/941,389 dated Jul. 25, 2016.

Official Communication from U.S. Appl. No. 15/384,035, dated Jun. 29, 2017.

Official Communication for U.S. Appl. No. 14/936,517 dated Apr. 4, 2017.

Official Communication for U.S. Appl. No. 15/384,035 dated Nov. 17, 2017.

Official Communication for U.S. Appl. No. 15/495,796 dated Nov. 21, 2017.

Official Communication for U.S. Appl. No. 15/195,176 dated Nov. 15, 2017.

Official Communication for U.S. Appl. No. 15/495,796 dated Apr. 18, 2018.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Official Communication for U.S. Appl. No. 15/960,274 dated Mar. 1, 2019.

Official Communication for U.S. Appl. No. 16/233,635 dated Mar. 1, 2019.

Official Communication for U.S. Appl. No. 16/194,062 dated Mar. 1, 2019.

* cited by examiner

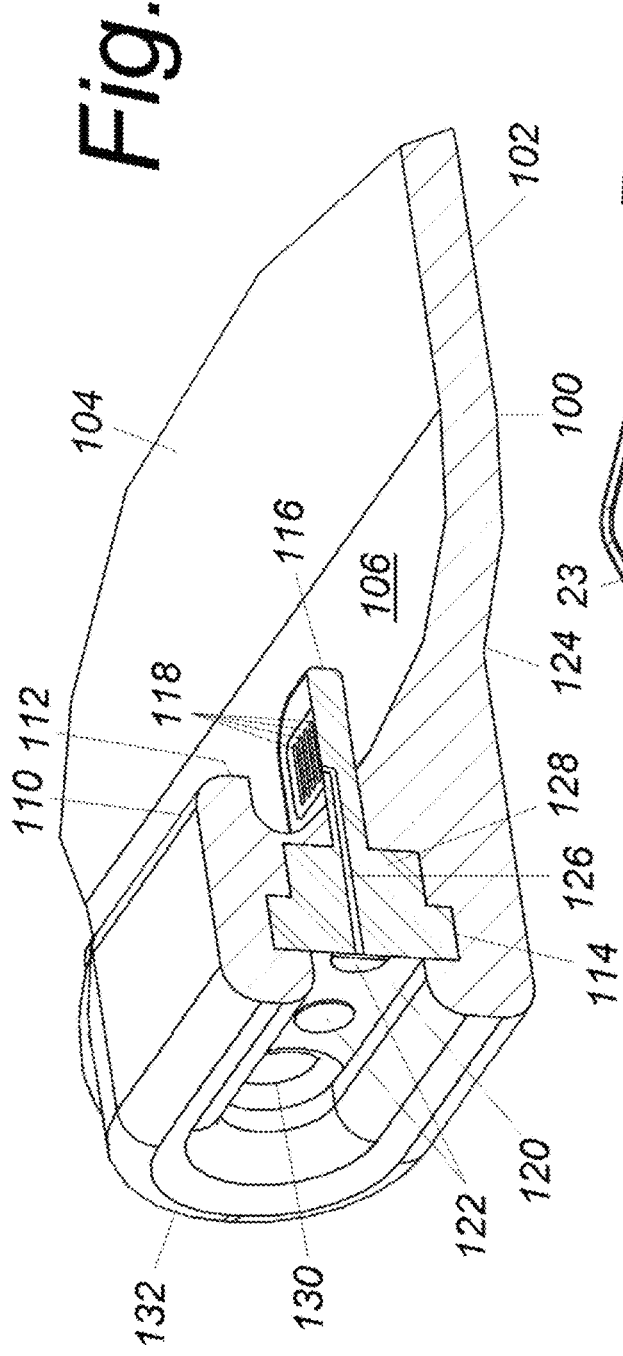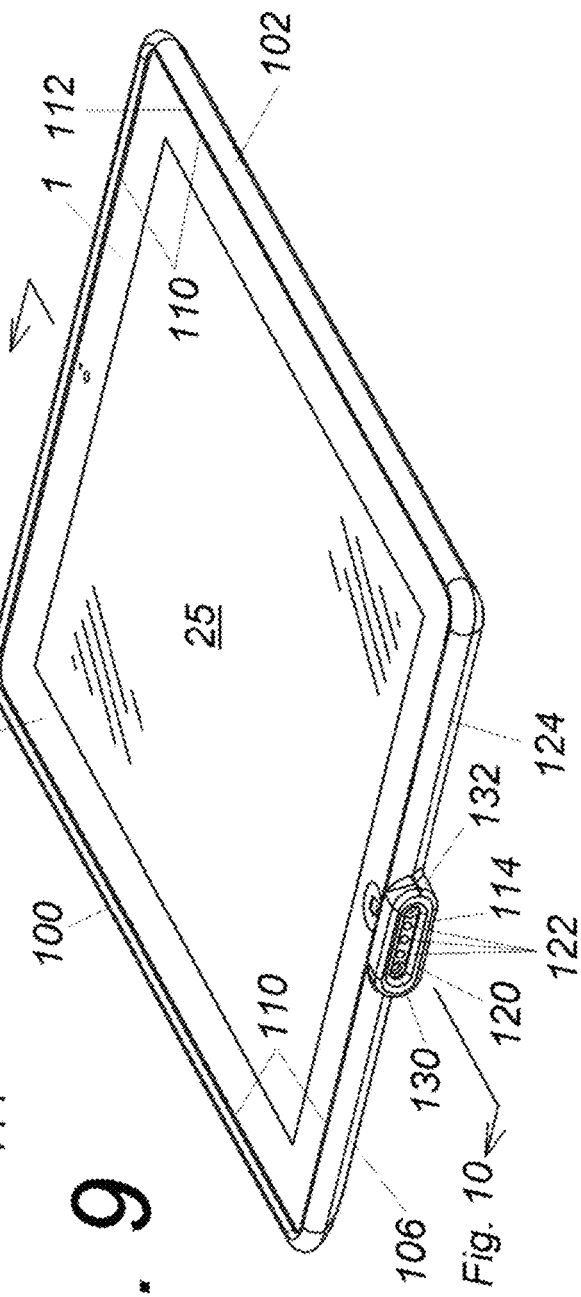

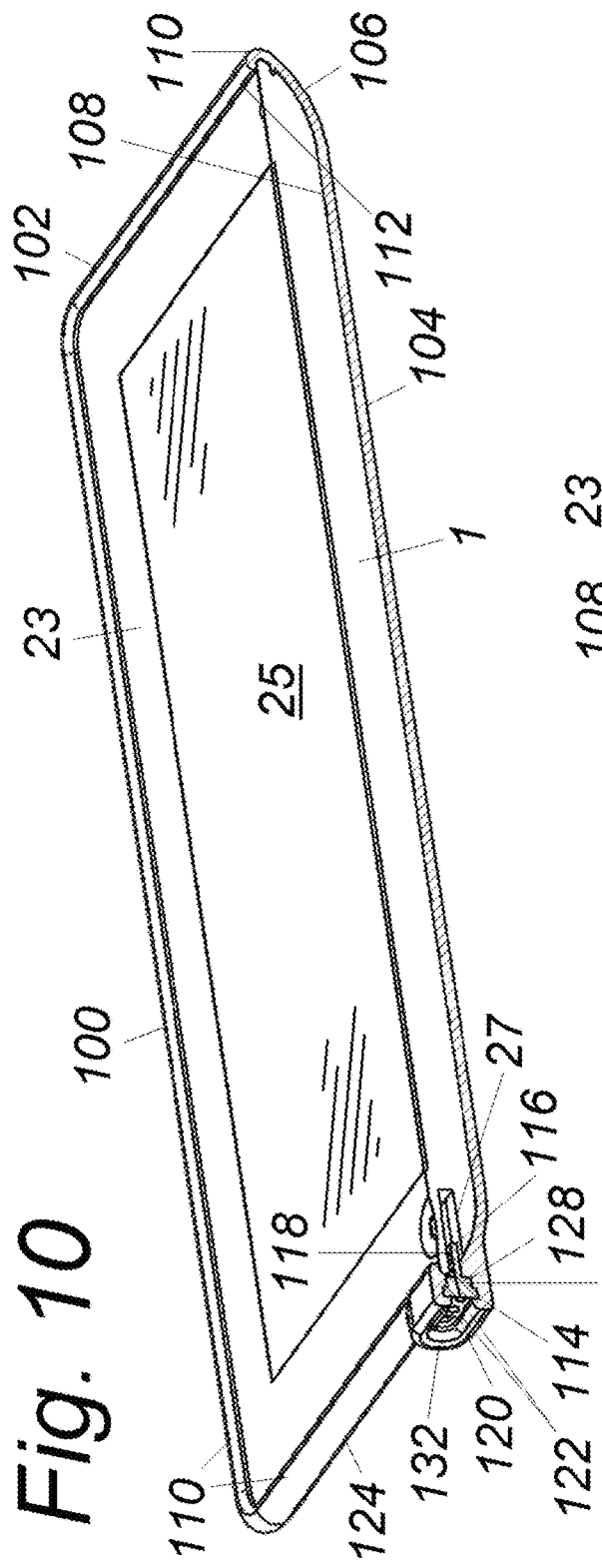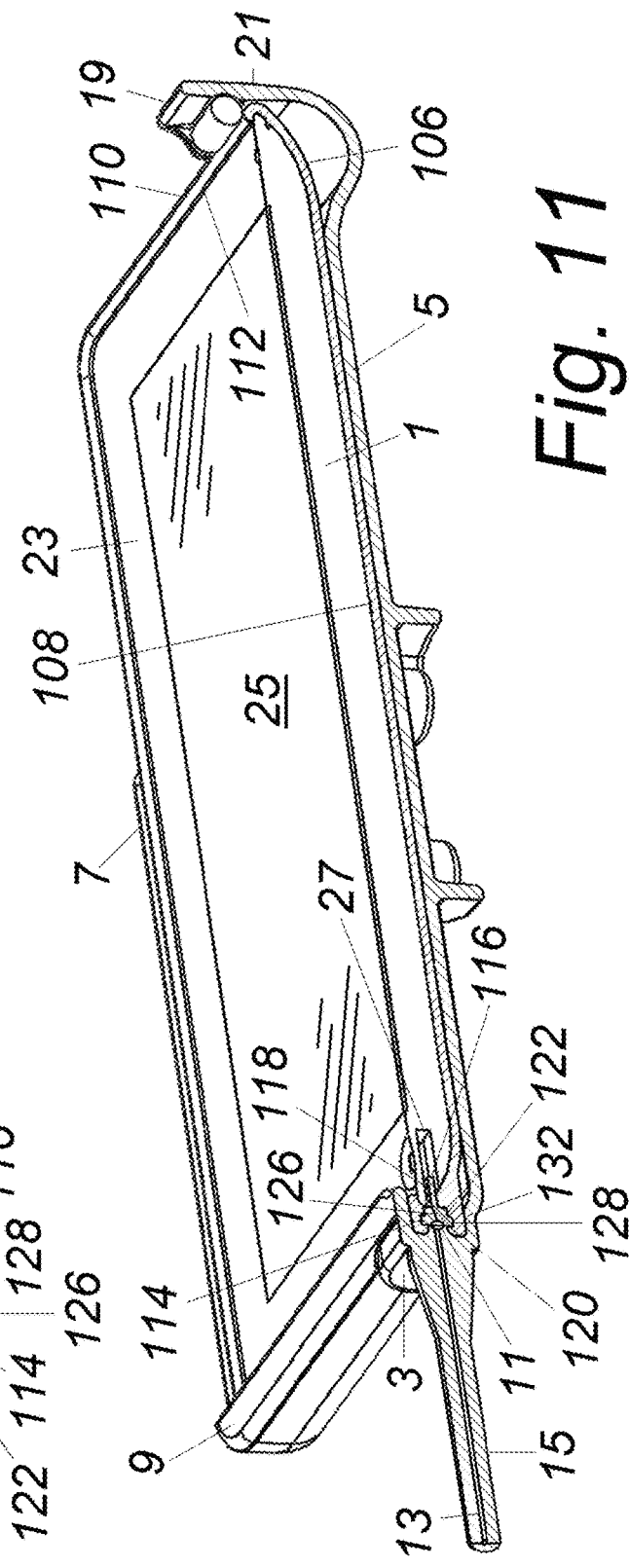

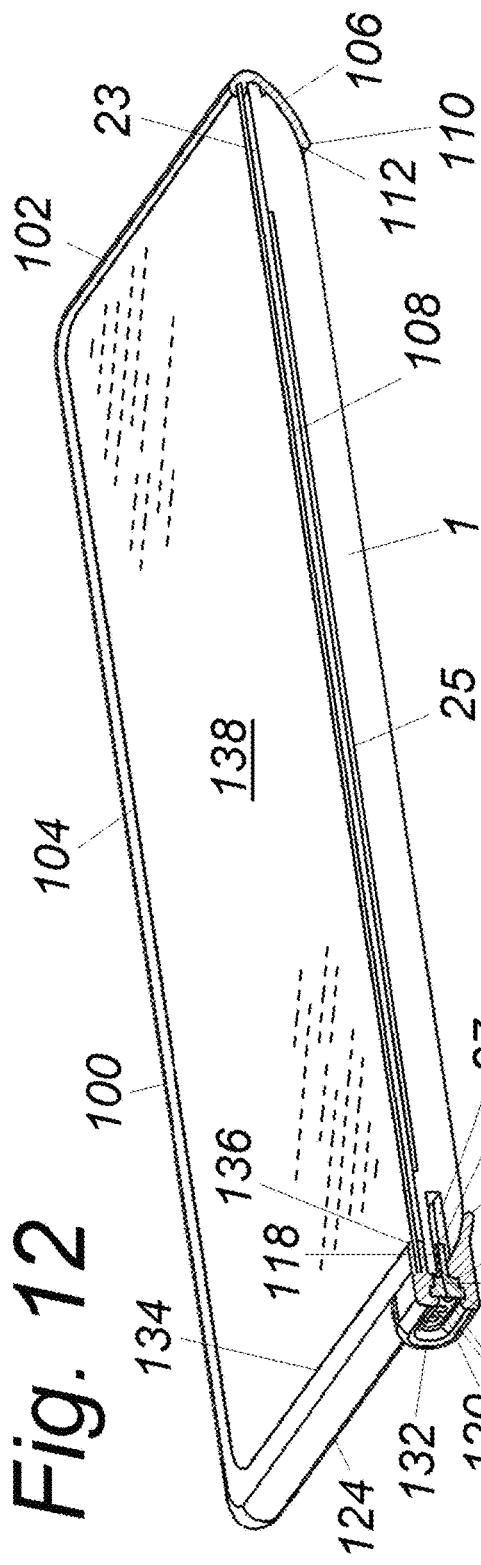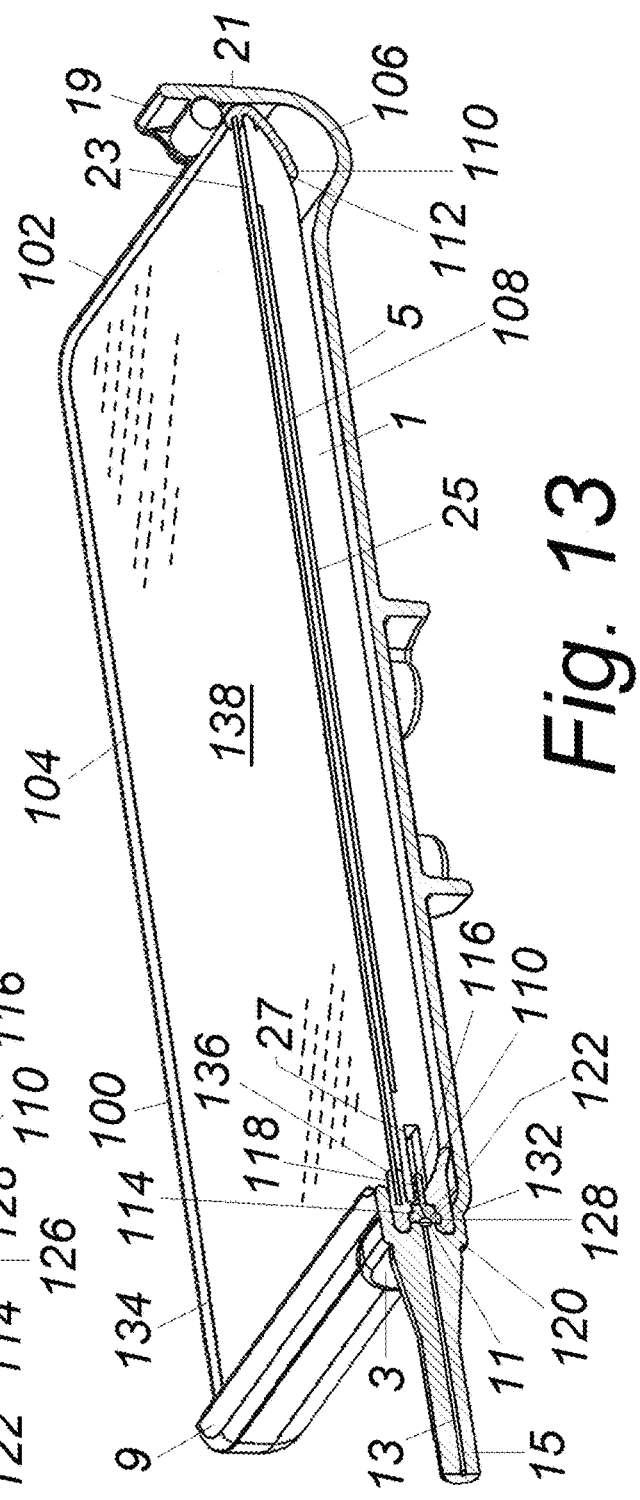

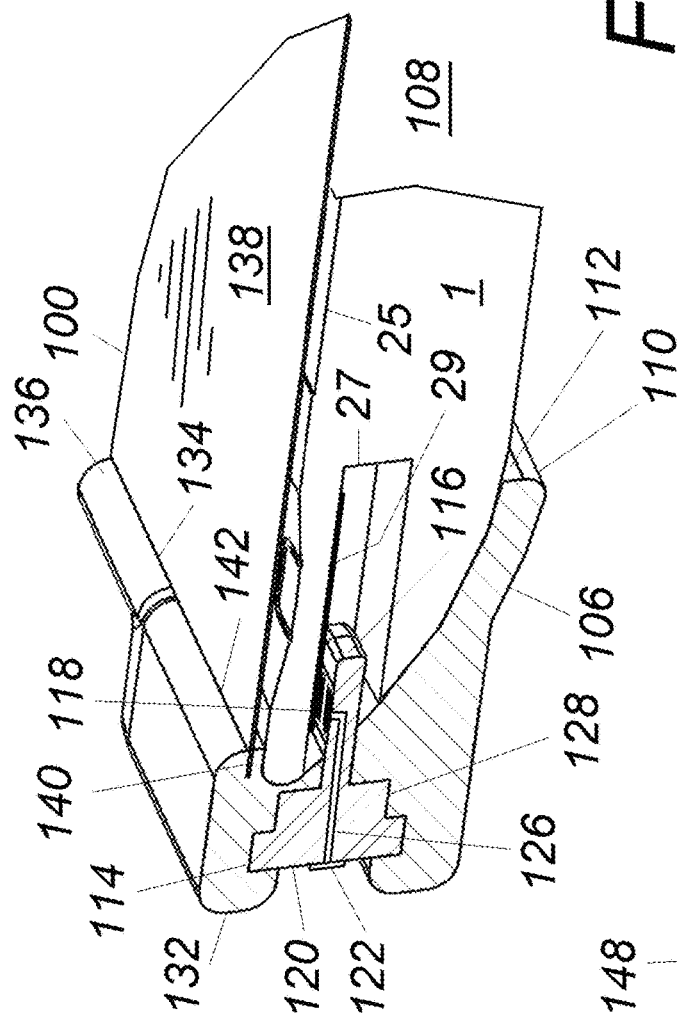
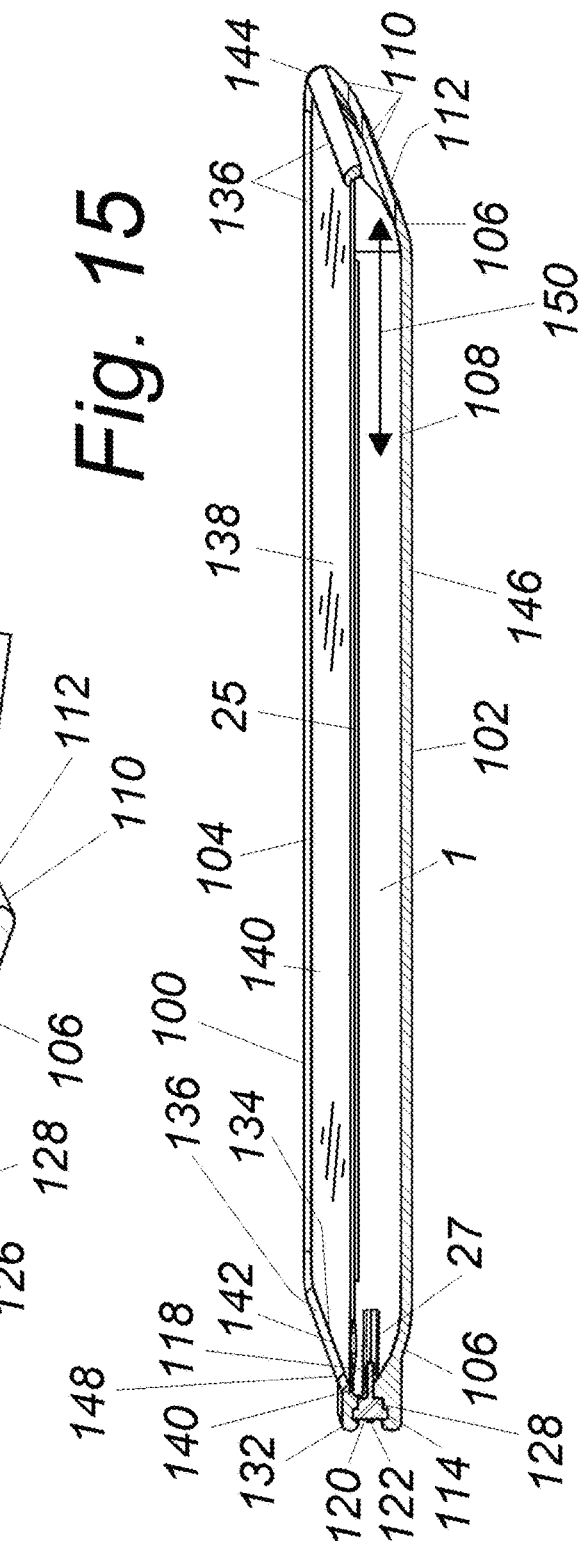

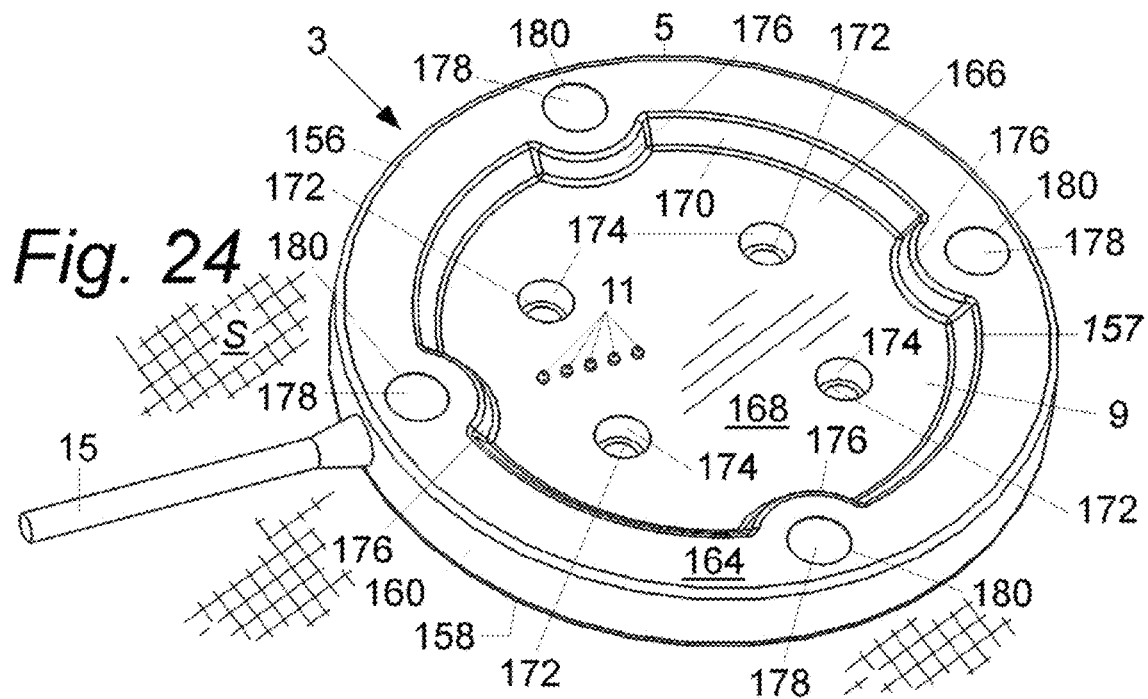
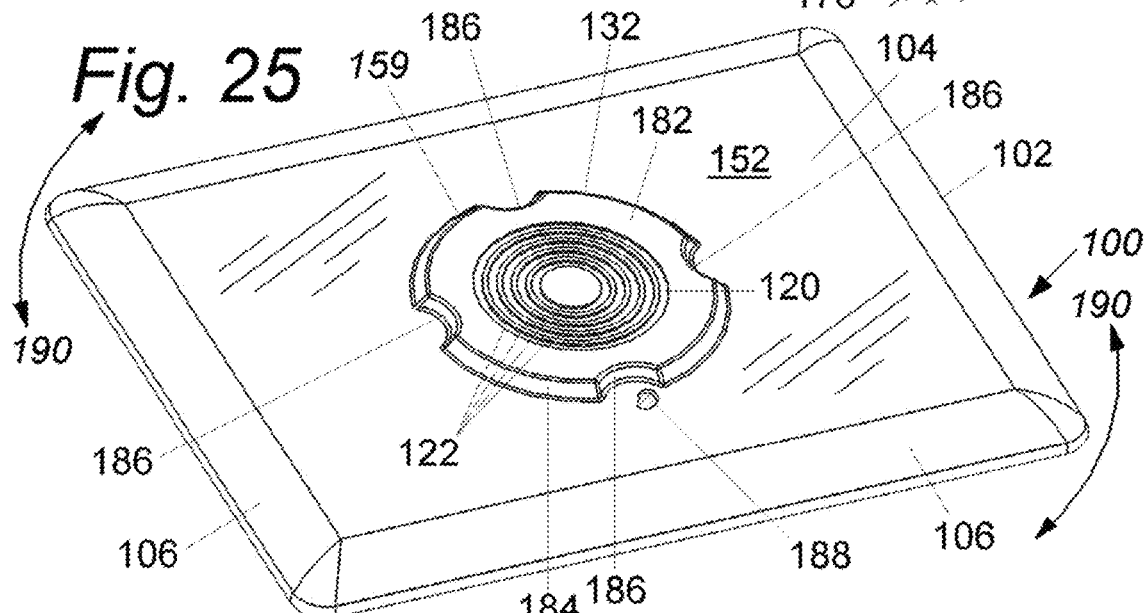
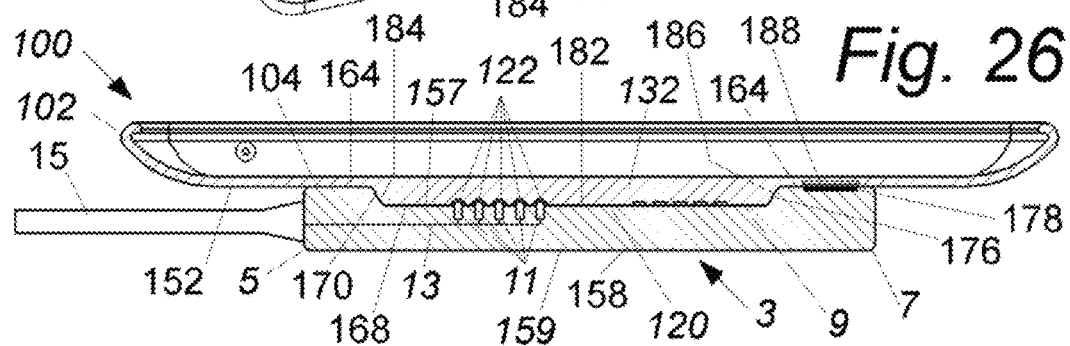

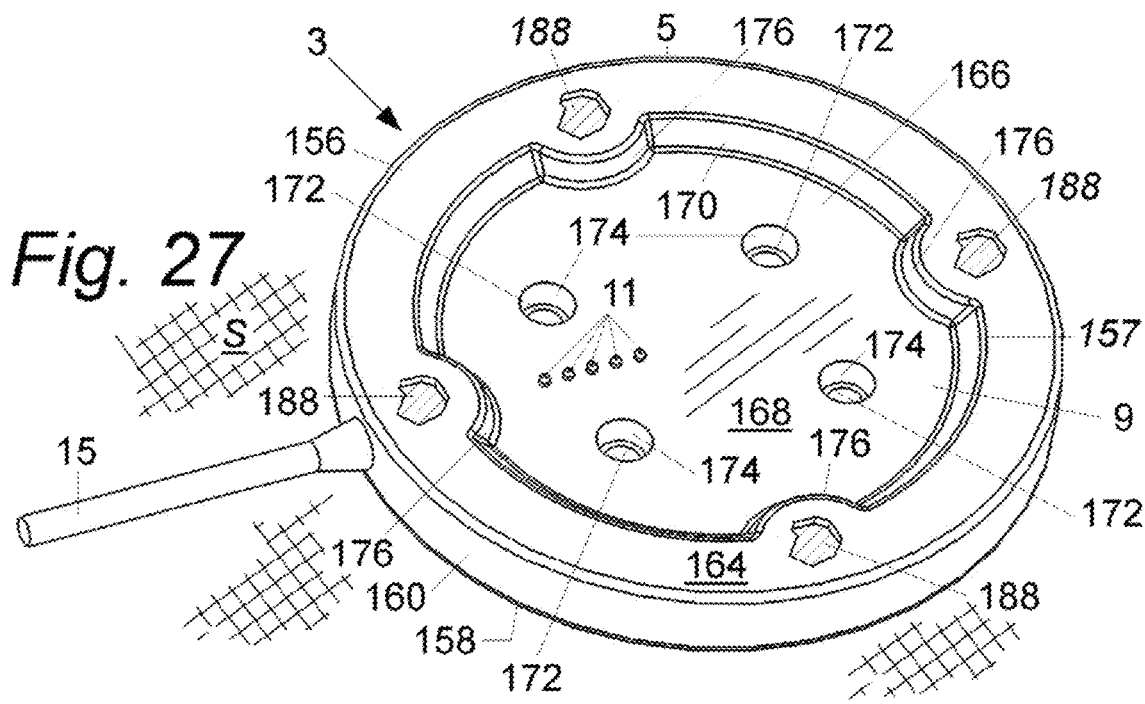
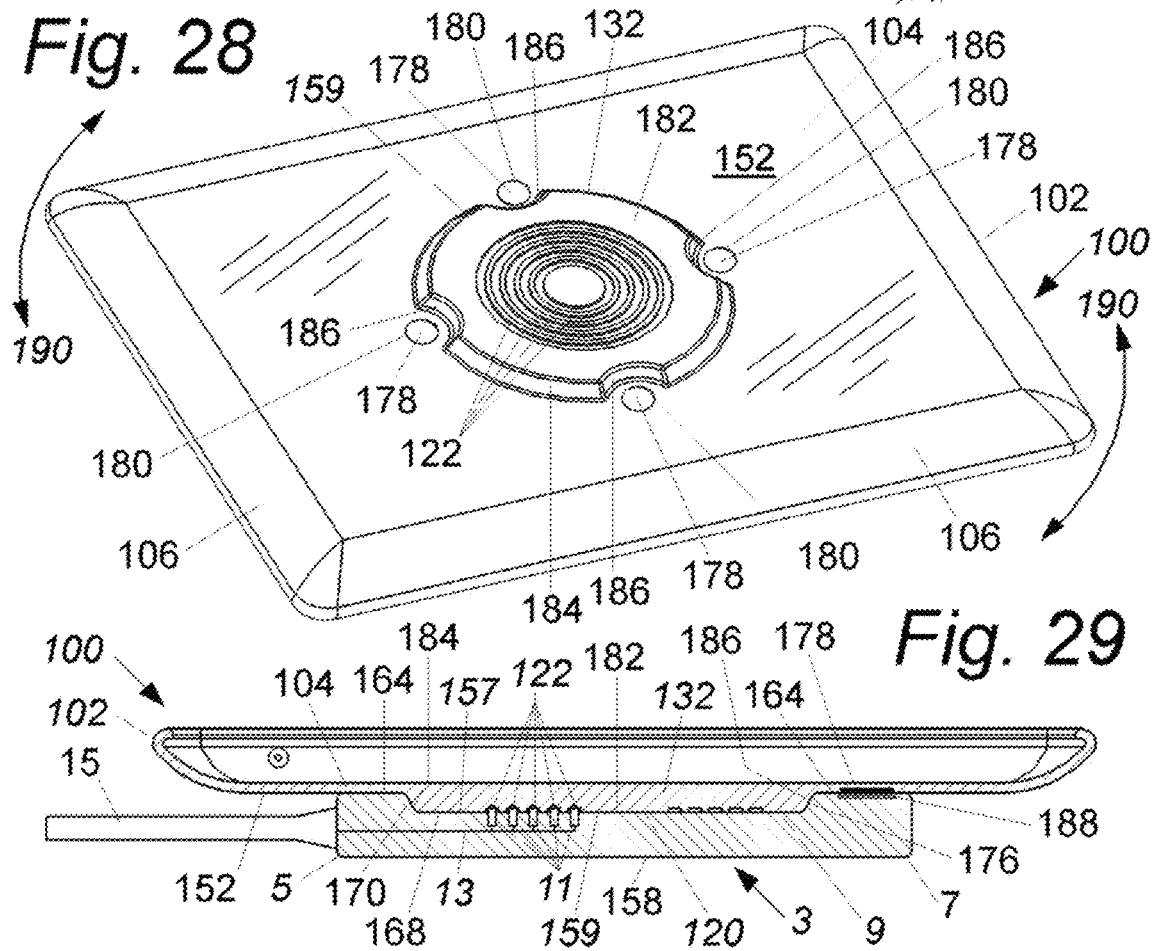

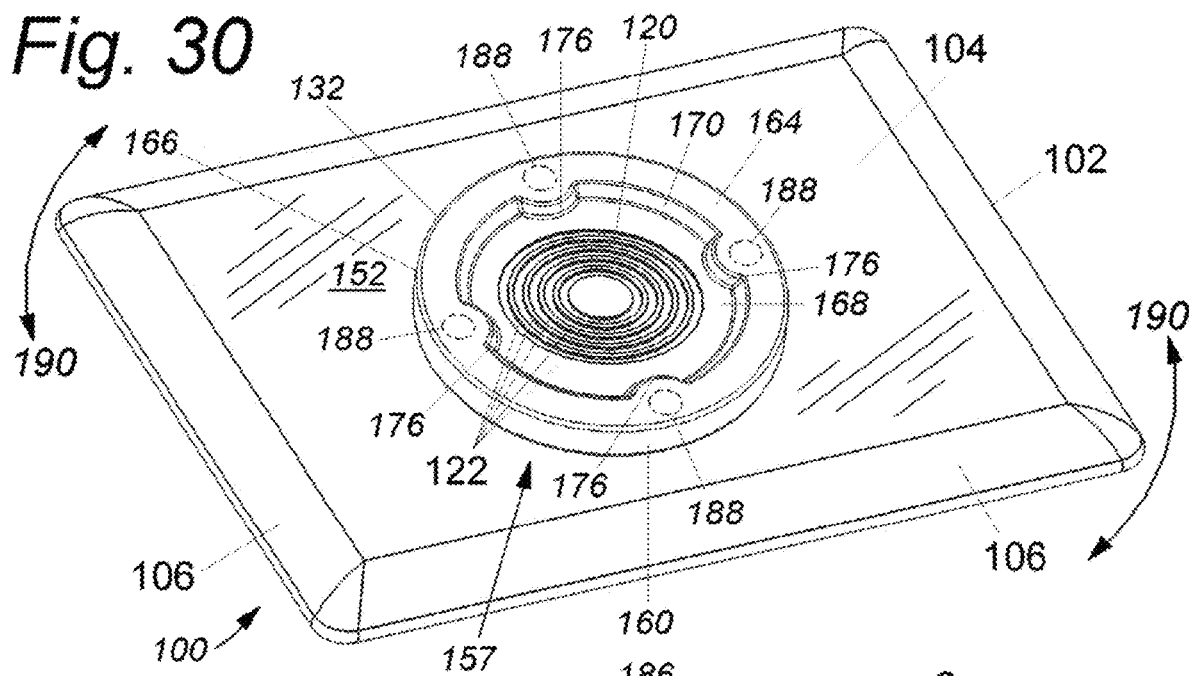
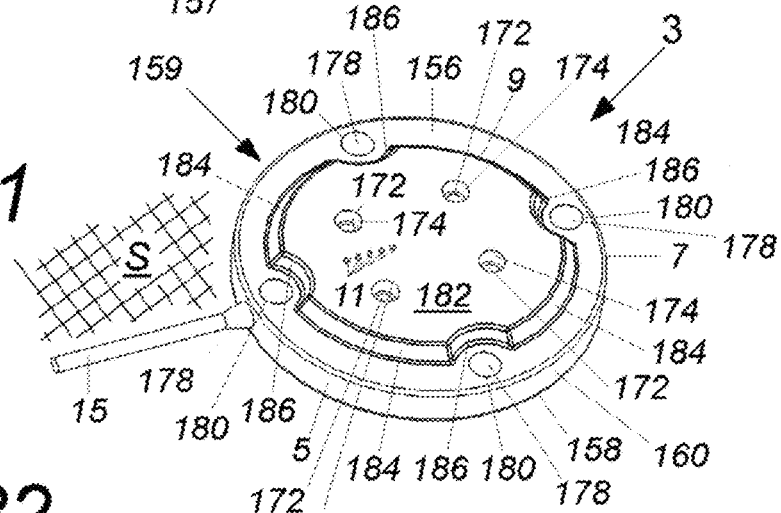
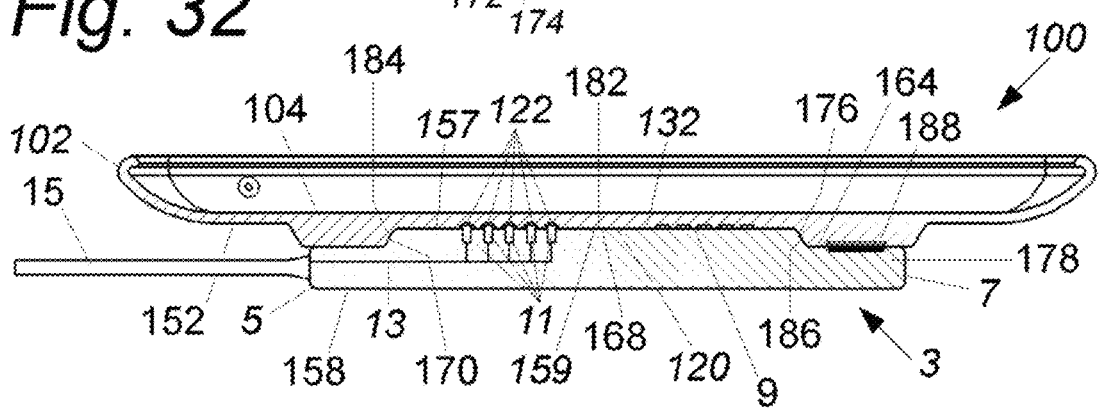

DOCKING SLEEVE WITH ELECTRICAL ADAPTER

CROSS-REFERENCE TO RELATED APPLICATIONS

This patent application is a continuation of U.S. patent application Ser. No. 15/960,274, filed Apr. 23, 2018, which is a continuation of U.S. patent application Ser. No. 15/195,176, filed Jun. 28, 2016, which is a continuation-in-part of U.S. patent application Ser. No. 14/936,517 filed Nov. 9, 2015, which issued as U.S. Pat. No. 9,706,026, which is a continuation-in-part of U.S. patent application Ser. No. 14/829,378 filed Aug. 18, 2015, which issued as U.S. Pat. No. 9,602,639, which is a continuation-in-part of U.S. patent application Ser. No. 14/754,492, filed Jun. 29, 2015, which issued as U.S. Pat. No. 9,529,387, which is a continuation-in-part of PCT Patent Application No. PCT/US2015/017131, filed Feb. 23, 2015, which claims the benefit of U.S. Provisional Patent Application No. 62/040,037, filed Aug. 21, 2014, and is a continuation-in-part of co-pending U.S. patent application Ser. No. 14/222,320, filed Mar. 21, 2014, which issued as U.S. Pat. No. 9,331,444, which claims the benefit of U.S. Provisional Patent Application Ser. No. 61/943,986, filed Feb. 24, 2014, all of which are incorporated herein by reference.

FIELD OF THE INVENTION

The present invention relates to a cover for protecting a portable electronic device, and in particular to a flexible cover having an electrical adapter for coupling the device to a docking station.

BACKGROUND OF THE INVENTION

Protective covers, or 'skins', are generally well-known for protecting a portable electronic device, such as a smartphone, or tablet or another portable electronic device. Such skins are typically somewhat flexible which allows them to be wrapped around to partially envelop a device.

However, known protective covers, or 'skins', are limited in their ability to provide efficient and reliable usage of such portable electronic devices.

SUMMARY OF THE INVENTION

The present invention is a cover for protecting a portable electronic device that overcomes limitations of the prior art for efficient and reliable usage of such portable electronic devices.

One aspect of the invention is a protective arrangement for an electronic device that includes a flexible cover having a panel and a skirt surrounding the panel, where the panel and skirt form an interior cavity therebetween, and the skirt forming a mouth opening that communicates with the interior cavity that is configured and arranged to receive an electronic device; an adapter fixedly positioned in the flexible cover and having a male plug with connectors extending into the interior cavity of the flexible cover in an arrangement for mating with a female socket of the device and a contactor with contacts adjacent outwardly from the flexible cover and electrically coupled to one or more of the connectors of the plug; and a hard shell configured and arranged to be disposed around at least a portion of the flexible protective cover and having an opening through which the contactor of the adapter is extendable. The hard shell may also include corner openings and the flexible cover may include corner portions configured and arranged to protrude from the corner openings of the hard shell. The hard shell may include at least one button opening and the flexible cover may include at least one soft button configured and arranged to protrude from the at least one button opening of the hard shell.

Another aspect of the invention is a protective arrangement for an electronic device that includes a hard shell configured and arranged to be disposed around at least a portion of the electronic device and having an opening to allow access to an input/output socket of the electronic device; a flexible cover having a panel and a skirt surrounding the panel, where the panel and skirt form an interior cavity therebetween, and the skirt forming a mouth opening that communicates with the interior cavity that is configured and arranged to receive the electronic device disposed in the hard shell; and an adapter fixedly positioned in the flexible cover and including a male plug having connectors extending into the interior cavity of the flexible cover in an arrangement for mating with the input/output socket of the device through the opening in the hard shell and a contactor having contacts adjacent outwardly from the flexible cover and electrically coupled to one or more of the connectors of the plug.

Yet another aspect of the invention is a docking system that includes one of the protective arrangement described above and a docking cradle having a tray configured to receive the protective arrangement and a docking connector having contacts positioned to connect with one or more of the contacts of the contactor.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 8 is a partial cross-section view of the protective cover of FIG. 1 taken through an electrical adapter of the invention;

FIG. 9 illustrates the elastomeric protective cover of FIG. 1 in situ as partially enveloping the target portable electronic device;

FIG. 10 illustrates a plurality of electrical connectors of a male plug of the electrical adapter being mechanically and electrically mated with a female input/output socket of the target electronic device when the target device is received within an interior cavity of the flexible protective shell of the invention, as illustrated in FIG. 9;

FIG. 11 illustrates the target portable electronic device being received within the flexible protective shell of the protective cover of FIG. 1, and the protected target portable electronic device being subsequently inserted into the docking cradle;

FIG. 12 illustrates the flexible protective shell of the protective cover of FIG. 1, wherein at least a flexible center panel of the protective shell is an integral window panel formed of a substantially optically transparent flexible membrane for use with a portable electronic device having a pressure-sensitive touch screen;

FIG. 13 illustrates the portable electronic device being received within the flexible protective shell of the protective cover of FIG. 1, wherein the touch-sensitive screen of the target electronic device is positioned in contact with the integral transparent window panel of the center panel as disclosed in FIG. 12, and the protected portable electronic device being subsequently inserted into the docking cradle with the touch-sensitive screen facing outwardly away therefrom;

FIG. 14 is a close-up section view of the protective cover of FIG. 1 as illustrated in FIG. 12, wherein the protective shell is formed with the interior transparent window panel for use with the portable electronic device having a touch-sensitive screen, which illustrates the male plug of the electrical adapter being interfaced with electrical contacts of the female I/O socket of the portable electronic device;

FIG. 15 illustrates the protective cover of FIG. 1 being formed with the interior transparent window panel for use with the portable electronic device having a touch-sensitive screen as illustrated in FIG. 12, wherein the interior window panel is positioned for being juxtaposed with the touch-sensitive screen of the portable electronic device, and wherein the mouth opening through the side skirt of the protective shell is positioned adjacent to one side thereof between the transparent window panel and an opposing panel of the protective shell;

FIG. 24 illustrates one embodiment of the docking cradle configured with a female nest for receiving the protective cover of FIG. 1 having the contactor of the converting adapter provided on external surface of the flexible center panel, as illustrated in FIG. 25, and wherein the docking cradle includes one part (magnets shown) of a magnetic attraction couple operable between the protective cover and the docking cradle for securing the protective cover in the docking cradle;

FIG. 25 illustrates the unitary protective shell of the protective cover of FIG. 1 formed with the locator dam configured as a complementary male nesting appendage configured to seat in female nest of the docking cradle embodiment illustrated in FIG. 24, and wherein the protective cover includes one part (magnetically permeable ferromagnetic member shown) of the magnetic attraction couple operable between the protective cover and the docking cradle for securing the protective cover in the docking cradle;

FIG. 26 is a cross-section view that illustrates the elastomeric shell of the protective cover of FIG. 1 as illustrated in FIG. 25 being seated in the tray of the docking cradle embodiment illustrated in FIG. 24, wherein the complementary male nesting appendage of the protective cover is nested with the female nest of the docking cradle, wherein the portion of the magnetic attraction couple resident in each of the protective cover and the docking cradle is operable for securing the shell of the protective cover in the docking cradle;

FIG. 27, FIG. 28 and FIG. 29 together illustrate an alternative embodiment of the protective cover of FIG. 1 as illustrated in FIG. 25, wherein the components of the magnetic attraction couple are inverted between the protective cover and the docking cradle, i.e., wherein the magnetically permeable members are substituted for the magnets in the docking cradle, while the magnets are substituted for the magnetically permeable members in the protective cover, wherein FIG. 27 illustrates the docking cradle configured with the magnetically permeable members, FIG. 28 illustrates the protective cover configured with the magnets, and FIG. 29 is a cross-section view that illustrates the protective cover of FIG. 1 as illustrated in FIG. 28 being seated in the tray of the docking cradle embodiment illustrated in FIG. 27;

FIG. 30, FIG. 31 and FIG. 32 together illustrate an alternative embodiment of cooperating the protective cover of FIG. 1 as illustrated in FIG. 25 and the docking cradle of FIG. 24, wherein the positioning interface features the protective cover of FIG. 1 as illustrated in FIG. 28 formed by the male nesting appendage and mating female nest is inverted, wherein FIG. 30 illustrates the protective cover of FIG. 25 being configured with the female nest positioning interface feature, FIG. 31 illustrates the docking cradle of FIG. 24 being configured with the complementary male nesting positioning interface feature, and FIG. 32 is a cross-section view that illustrates the protective cover of FIG. 1 as illustrated in FIG. 30 being mated with the tray of the docking cradle embodiment illustrated in FIG. 31;

DETAILED DESCRIPTION OF PREFERRED EMBODIMENT

As required, a detailed illustrative embodiment of the present protective enclosure is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the Figures, like numerals indicate like elements.

Figure 1:
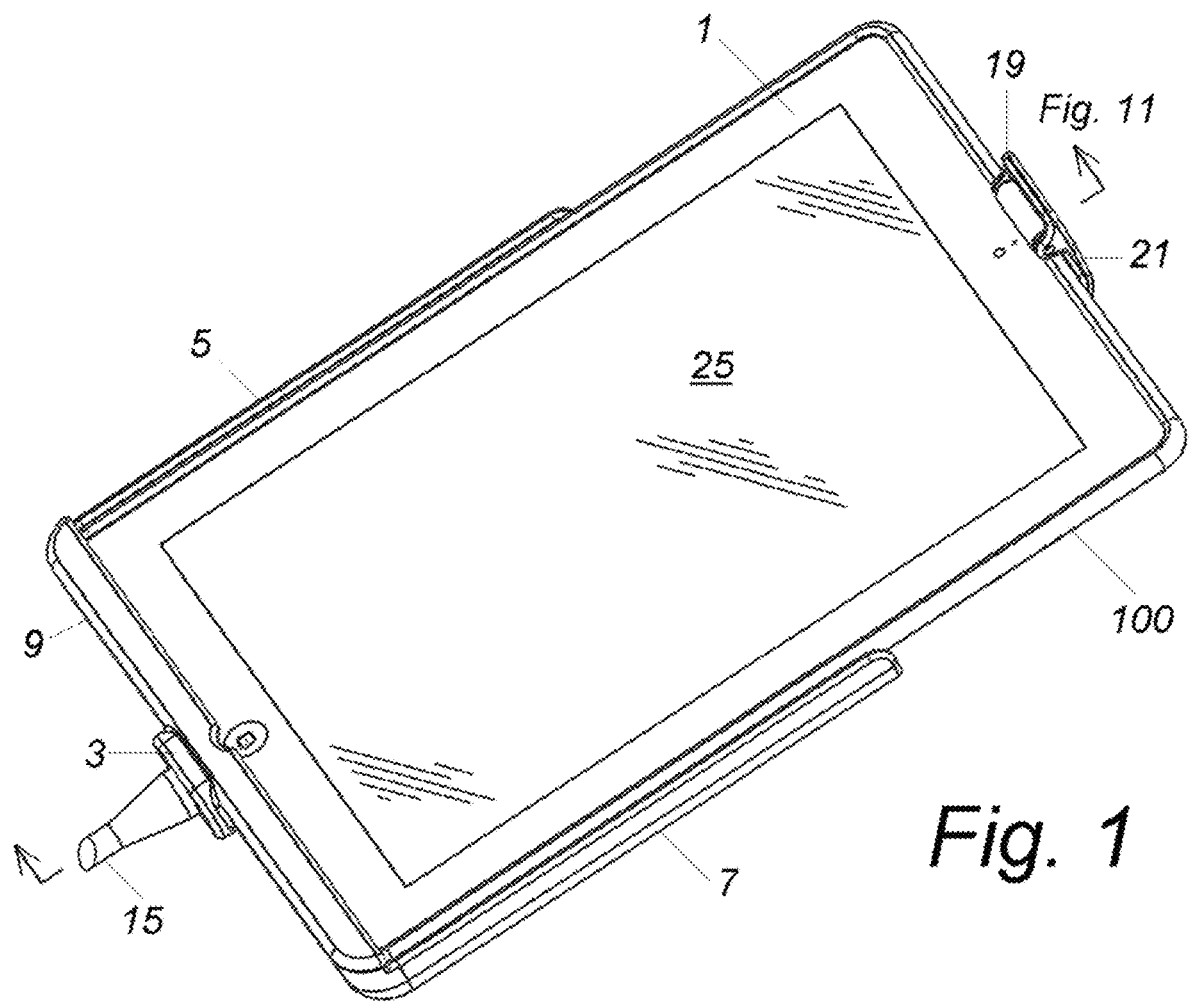
FIG. 1 and FIG. 2 each illustrate the same invention embodied by example and without limitation as a completely integral one-piece elastomeric protective cover, or skin, in situ as partially enveloping a target portable electronic device, such as a smartphone or tablet or another portable electronic device of the prior art having a port for a docking connector.
Figure 2:
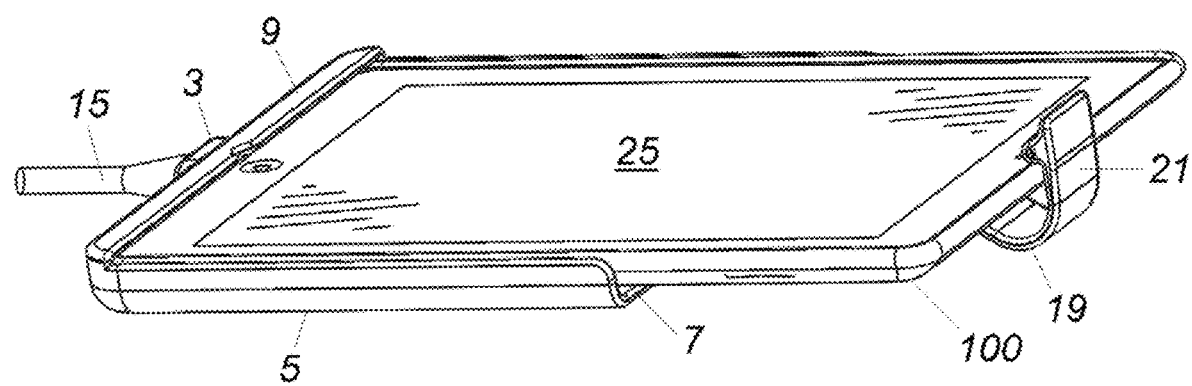

FIG. 1 and FIG. 2 illustrate a completely integral one-piece elastomeric protective cover, or skin, 100 of the present invention in situ as partially enveloping the portable electronic device 1 such as a smartphone or tablet or another portable electronic device of the prior art having a port for a docking connector 3. Cover 100 of the present invention is a sheath molded of a suitable elastic or flexibly resilient elastomer, such as but not limited to vinyl, in a size and shape to fit over and closely conform to the smartphone, tablet or other portable electronic device 1 so that the cover 100 fits the device 1 like a surgical glove.

A smartphone, or smart phone, is a mobile phone with more advanced computing capability and connectivity than basic feature phones. Early smartphones typically combined the features of a mobile phone with those of another popular consumer device, such as a personal digital assistant (PDA), a media player, a digital camera, and/or a GPS navigation unit. Modern smartphones include all of those features plus usually include the additional features of a touch-screen computer, including web browsing, Wi-Fi, and 3rd-party apps and accessories. The most popular smartphones today are powered by Google's Android and Apple's iOS mobile operating systems. See, e.g., Wikipedia, The Free Encyclopedia.

A tablet computer, or simply tablet, is a mobile computer with display, circuitry and battery in a single unit. Tablets are equipped with sensors, including cameras, microphone, accelerometer and touch-screen, with finger or stylus gestures replacing computer mouse and keyboard. Tablets may include physical buttons, e.g., to control basic features such as speaker volume and power and ports for network communications and to charge the battery. An on-screen, pop-up virtual keyboard is usually used for typing. Tablets are typically larger than smart phones or personal digital assistants at 7 inches (18 cm) or larger, measured diagonally. One example of a tablet is the iPad tablet computer from Apple. See, e.g., Wikipedia, The Free Encyclopedia.

Hybrid tablets having detachable keyboards have been sold since the mid-1990s. Convertible touch-screen notebook computers have an integrated keyboard that can be hidden by a swivel or slide joint. Booklet tablets have dual-touch-screens and can be used as a notebook by displaying a virtual keyboard on one of the displays. See, e.g., Wikipedia, The Free Encyclopedia.

Other portable electronic devices can include, for example, testing equipment (for example, ohmmeters, multimeters, alignment tools, battery testers, calibrators, distance meters, light meters, pressure meters, radiation detectors, thermometers, or the like), cameras, media players, or the like. In at least some embodiments, the portable electronic device includes a sensor for detecting, for example, temperature, pressure, leveling, angles, altitude, light, density, x-rays, magnetic fields, acceleration, speed, velocity, distance, energy, current or energy flow, force, durometer, mass/weight, torque, resistance, capacitance, voltage, reactance, or the like or any combination thereof.

As disclosed herein, an electrical adapter is part of protective cover 100, the adapter includes a male plug having a plurality of electrical connectors extending into a cavity formed by protective cover 100 in an arrangement for mating with a female input/output socket of the smartphone or tablet or other portable electronic device 1, and a contactor having a plurality of electrical contacts that are positioned adjacent to an exterior of protective cover 100 and are electrically coupled to one or more of the connectors of the plug.

Accordingly, when the electronic device 1 is received within the cavity of flexible protective cover 100, the plurality of connectors of the male plug are mated with the female socket of the device 1. Thereafter, the female input/output socket is electrically accessed through the plurality of contacts of the contactor that are exterior of protective cover 100.

Protective cover 100, with the electronic device 1 installed therein, is then inserted into a docking cradle 5 which includes docking connector 3 having its own plurality of contacts. The docking connector is joined to the contactor of the electrical adapter with one or more of the plurality of contacts of the docking connector being electrically coupled with contacts of the contactor. Accordingly, the input/output socket of the electronic device 1 is electrically accessed through the docking connector of the docking cradle 5 via the electrical adapter of protective cover 100.

Figure 3:
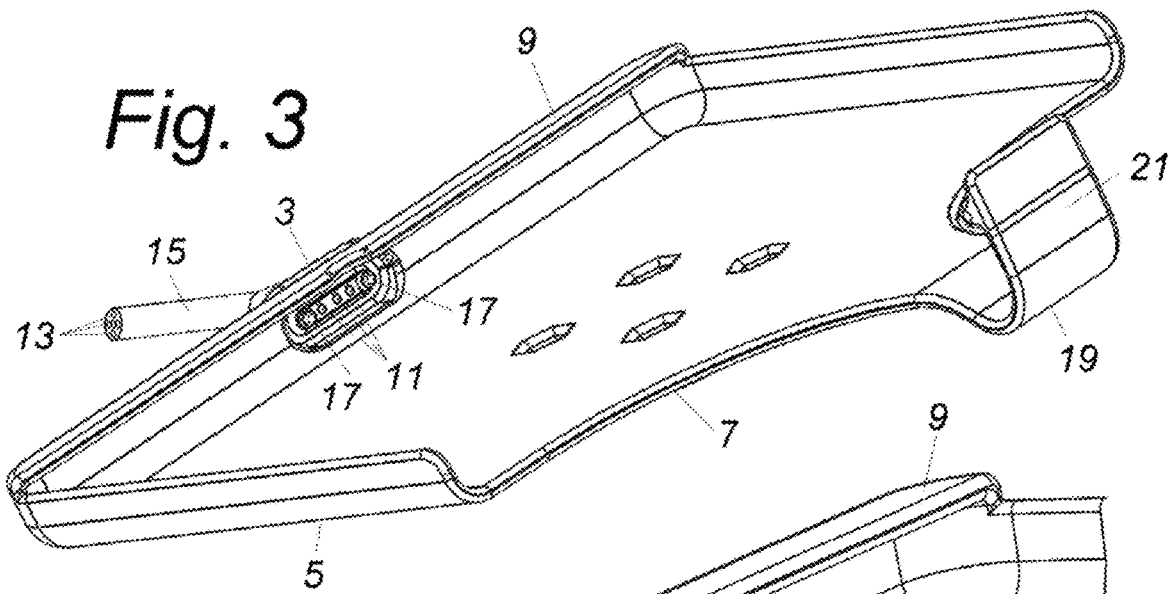
FIG. 3, FIG. 4 and FIG. 5 describe by example and without limitation a docking cradle of a type useful with the protective cover of the invention.
Figure 4:
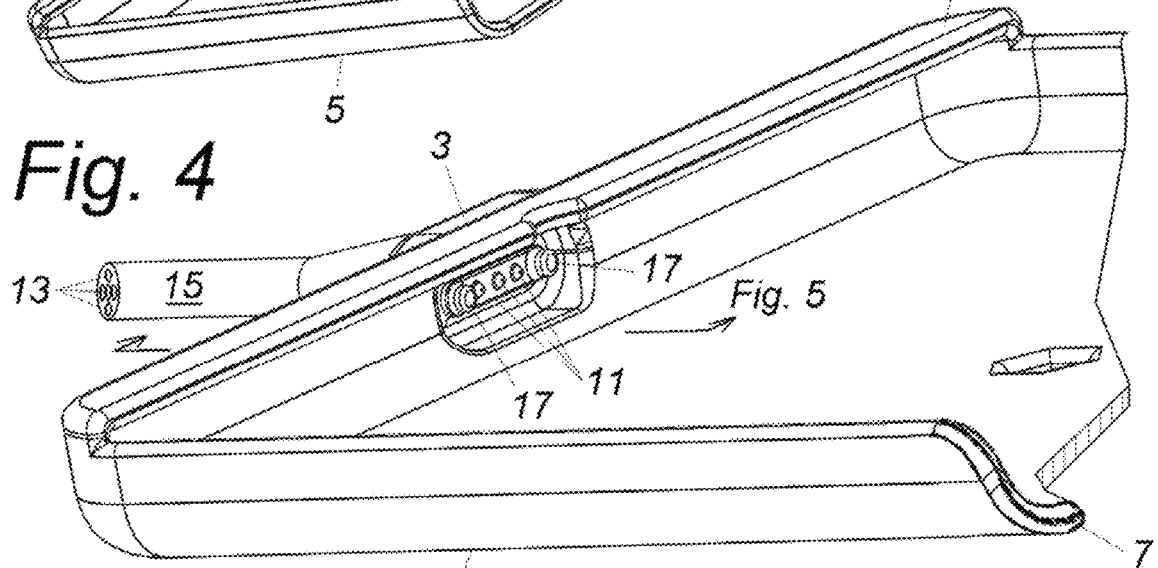
Figure 5:
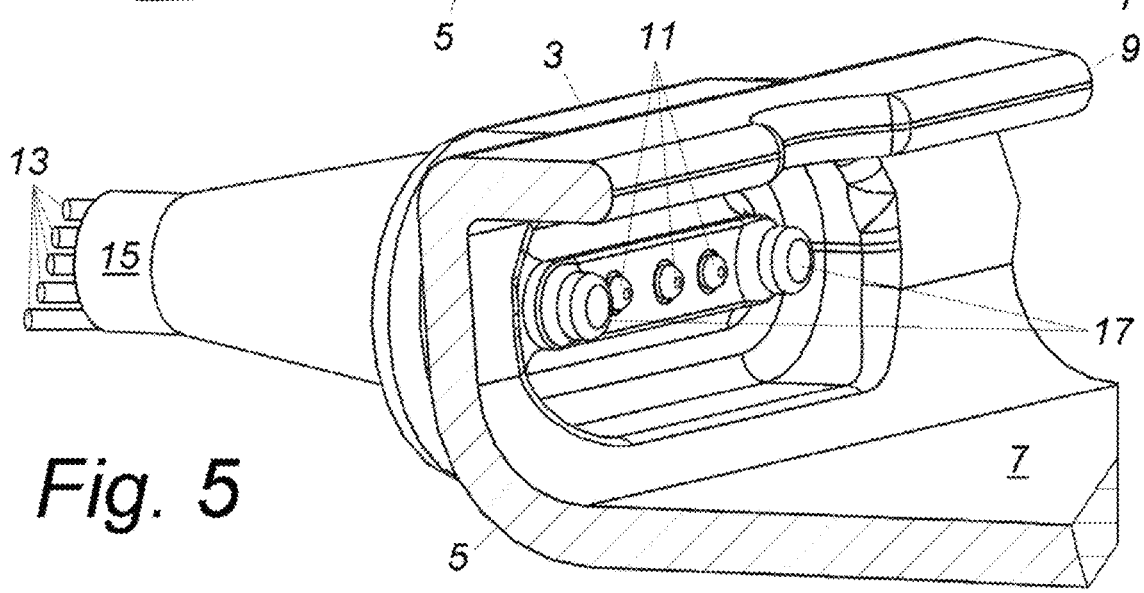

FIG. 3, FIG. 4 and FIG. 5 describe by example and without limitation a docking cradle 5 of a type useful with protective cover 100. For example, docking cradle 5 has a tray 7 with a base receiver 9 sized to receive a specific smartphone, tablet or other portable electronic device 1 already protected within the cover 100. The tray 7 includes a back support surface 101 to support a back of the cover 100 and a docking support surface 103 extending away from the back support surface. The back support surface 101 and docking support surface 103 may form an angle in a range of 90 to 130 degrees or more.

Docking connector 3 is provided in the docking cradle 5, often in the middle of base receiver 9 of tray 7. The docking connector 3 may be specific to a particular portable electronic device 1, or may be generic to a type of device 1. Docking connector 3 includes a plurality of biasing electrical contacts 11, typically biasing pogo pins or biasing leaf spring contacts. Electrical contacts 11 are coupled to leads 13 in an electrical wire or cable 15 coupled to docking cradle 5. Docking connector 3 may be a female connector as illustrated in FIGS. 3-5 and may define a rim 105. The rim 105 may be recessed with respect to the docking support surface 103.

Docking connector 3 may also include optional guide pins 17 adapted for mating with mating guide pin receivers in the contactor of the electrical adapter, as disclosed herein.

Docking cradle 5 optionally includes a clamp 19 adapted for capturing the specific portable electronic device 1 within base receiver 9 of tray 7. Clamp 19 also has a compression component, i.e. arm 21 that operates to compress the electrical contacts of the contactor on the exterior of protective cover 100 into contact with electrical contacts 11 of docking connector 3.

Figure 6:
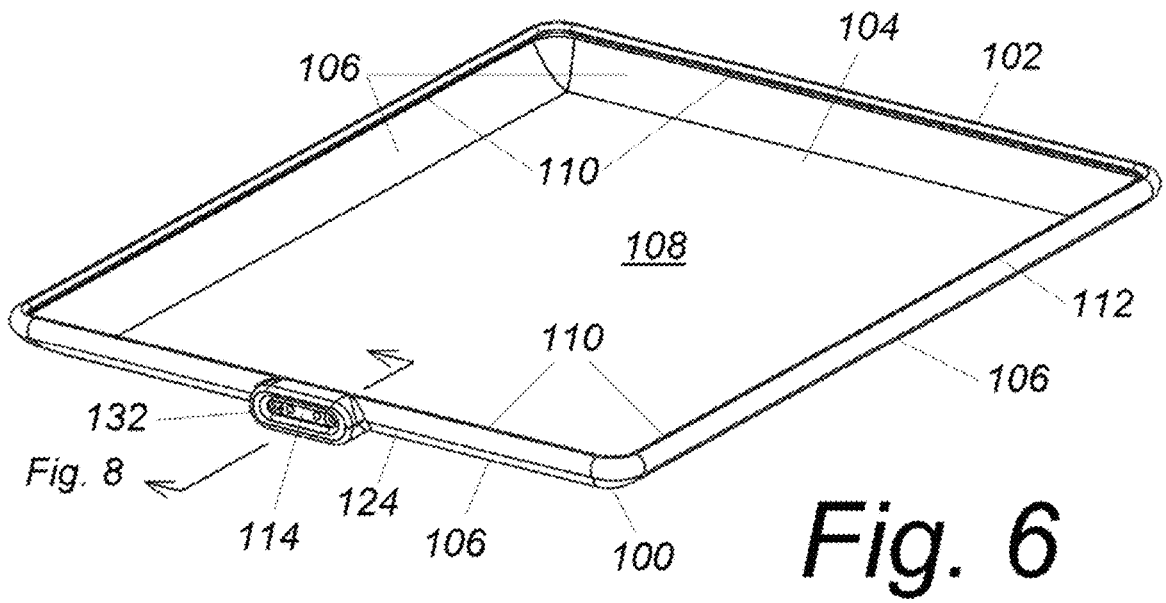
FIG. 6 and FIG. 7 are different views that each illustrate by example and without limitation the protective cover of FIG. 1 with the portable device removed for clarity.
Figure 7:
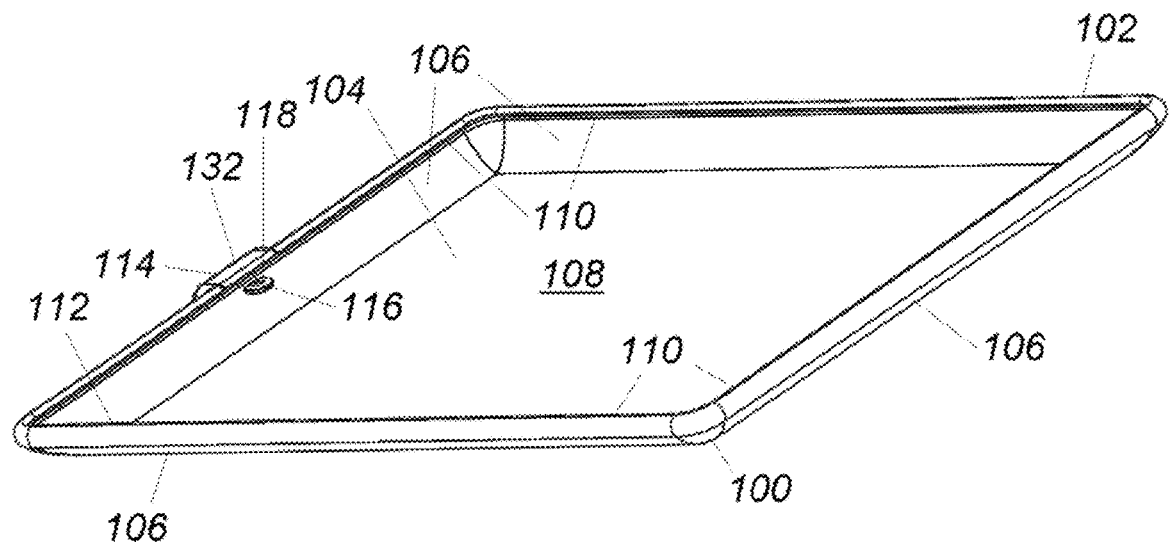

FIG. 6 and FIG. 7 illustrate the protective cover 100 of the invention with the portable electronic device 1 removed for clarity. Protective cover 100 is complimentary in shape to portable electronic device 1. Protective cover 100 is shown being formed of a flexible unitary protective shell 102 having a flexible center panel 104 surrounded by an integral flexible side skirt 106. Panel 104 and skirt 106 combine to form an interior cavity 108 therebetween that is sized to at least partially cover the side faces and one of the front and back faces of portable electronic device 1, and to further extend around a peripheral edge of an opposite one of the front and back faces of portable electronic device 1. A continuous integral lip 110 extends inward of side skirt 106 and forms a mouth opening 112 that communicates with cavity 108. Mouth opening 112 is sized to receive electronic device 1 therethrough into cavity 108.

Protective cover 100 includes an adapter 114 that is fixedly positioned in side skirt 106. For example, adapter 114 is either over molded, bonded or fastened through side skirt 106. Adapter 114 is formed of a male plug 116 having a plurality of electrical connectors 118 that extend into cavity 108 of shell 102 in an arrangement for mating with a female input/output socket of the portable electronic device 1. Adapter 114 also includes a contactor 120 having a plurality of electrical contacts 122 that are spaced away from male plug 116 at an opposite end of adapter 114, as illustrated in FIGS. 8 and 9. Adapter 114 is extended through protective shell 102, for example, through either center panel 104 or side skirt 106 (shown). Thus, while male plug 116 is extended into cavity 108 of shell 102, contactor 120 and its contacts 122 are positioned adjacent to an exterior 124 of shell 102, whereby plurality of electrical contacts are exposed for connection to electrical contacts 11 of docking connector 3.

FIG. 8 is a partial cross-section view of protective cover 100 taken through electrical adapter 114. As illustrated here, electrical contacts 122 of contactor 120 are electrically coupled to one or more of electrical connectors 118 of plug 116 via electrical cables, wires, traces or other electrical conductors 126 (one shown for clarity) embedded in a body 128 of adapter 114. Contactor 120 of adapter 114 is optionally formed with one or more guide pin receivers 130 sized and positioned to mate with optional guide pins 17, if present, of docking connector 3.

Optionally, contactor 120 of adapter 114 is further recessed in outer surface 124 of unitary protective shell 102. By example and without limitation, an optional dam 132 is formed in outer surface 124 of unitary protective shell 102, and adapter contactor 120 is further recessed within dam 132. Electrical contacts 122 of contactor 120 are protected from damage by being recessed within dam 132 or otherwise within outer surface 124 of unitary protective shell 102.

FIG. 9 illustrates the elastomeric protective cover 100 of the present invention in situ as partially enveloping the portable electronic device 1. Here, portable electronic device 1 is received within cavity 108 of flexible protective shell 102 through mouth opening 112 that communicates with cavity 108. Electronic device 1 is inserted into flexible protective shell 102 through mouth opening 112 in continuous integral lip 110 through side skirt 106 that communicates with cavity 108. One of either a front face 23 (shown) or a back face of electronic device 1 is exposed in mouth opening 112. Here, a touch-sensitive screen or other display 25 of portable electronic device 1 is exposed in mouth opening 112 for easy operation by user.

FIG. 10 illustrates plurality of electrical connectors 118 of male plug 116 are mechanically and electrically mated with the female input/output socket 27 of device 1 when portable electronic device 1 is received within cavity 108 of flexible protective shell 102, as illustrated in FIG. 9. Accordingly, mating of male plug 116 with female input/output socket 27 creates access to power, sensor and/or other functions of portable electronic device 1 from outside surface 124 of unitary protective shell 102.

FIG. 11 illustrates portable electronic device 1 being received within flexible protective shell 102 of protective cover 100, and protective cover 100 with portable electronic device 1 therein being subsequently inserted into docking cradle 5. Docking connector 3 of docking cradle 5 is joined to contactor 120 of electrical adapter 114 with one or more of plurality of biasing electrical contacts 11 of docking connector 3 being electrically coupled with electrical contacts 122 of adapter contactor 120. Accordingly, portable electronic device 1 is accessed by docking cradle 5 without being first removed from protective cover or 'skin' 100 as required with prior art protective covers. Compression of clamp 19, when present, aids in maintaining electrical coupling between electrical contacts 122 of adapter contactor 120 and biasing electrical contacts 11 of docking connector 3.

FIG. 12 illustrates protective cover 100 reversed on electronic device 1 with center panel 104 adjacent to the face of device 1 having display 25. Protective shell 102 is formed with mouth opening 112 that communicates with cavity 108 positioned substantially opposite from center panel 104. Continuous integral lip 110 extends inward of side skirt 106 and forms mouth opening 112.

Here, an interior window opening 134 is formed in flexible center panel 104 of flexible protective shell 102 opposite from mouth opening 112 and in a position over touch-sensitive screen display 25 of portable electronic device 1 for operation of electronic device 1.

Center panel 104 of protective shell 102 is formed with interior window opening 134 that communicates with cavity 108. Interior window opening 134 is positioned and sized to reveal therethrough pressure-sensitive touch screen 25 of a portable electronic device 1 residing in cavity 108. A continuous integral lip 136 extends around periphery of center panel 104 inward of side skirt 106 and forms interior window opening 134.

An integral interior window panel 138 is positioned in flexible center panel 104 within window opening 134, and is retained in protective shell 102 by continuous integral lip 136 surrounding opening 134. For example, as more clearly illustrated in FIG. 14, a peripheral edge 140 of interior window panel 138 is welded, adhered, bonded or otherwise joined to integral lip 136 of window opening 134. Optionally, a substantially watertight joint 142 is formed between interior window panel 138 and integral lip 136 of window opening 134. According to one embodiment, interior window panel 138 is overmolded into integral lip 136 of window opening 134 for joining to integral lip 136 and forming watertight joint 142 therebetween.

Integral interior window panel 138 is formed of a substantially optically transparent membrane for use with portable electronic device 1 having a pressure-sensitive touch screen 25, whereby operation of electronic device 1 via touch-sensitive screen 25 is accomplished through intervening window panel 138.

Optionally, interior window panel 138 is formed of a hard, inelastic and noncompressible material. For example, the plastic sheet component forming interior window panel 138 is optionally a noncompressible sheet of relatively hard and substantially visually transparent material, including but not limited to polyethylene terephthalate (PET) or another suitable substantially visually transparent material. According to one embodiment, the plastic sheet component forming interior window panel 138 is optionally a noncompressible sheet of relatively hard and substantially visually transparent polyvinyl chloride (PVC) material. As disclosed herein, interior window panel 138 formed of PET or PVC or other hard, noncompressible and inelastic plastic sheet material similarly permits tactile stimulation of the touch-sensitive screen display 25 of portable electronic device 1.

Alternatively, optionally either the entirety of protective shell 102, or only interior window panel 138, is formed of an optically transparent flexible elastomer membrane which is either clear, or may be tinted with color, such as pink or blue as may be aesthetically pleasing. In other embodiments, the protective shell 102 is opaque or translucent and may be any color or pattern. In such embodiments, the portable electronic device 1 is disposed within the protective cover 100 with its display visible through the mouth opening 112.

Optionally, the optically transparent elastomer of protective shell 102 or only interior window panel 138 is a dielectric material having static dissipative properties, such as an effective dielectric constant on the order of about 4.5. For example, the elastomer includes a quantity of powdered metal, mixed-metal oxides, polymers, or is coated with a static dissipative coating. Optionally, the optically transparent elastomer of protective shell 102 or only interior window panel 138 is polarized to reduce glare. Accordingly, protective cover 100 is optionally utilized with portable electronic device 1 having a pressure-sensitive touch screen that permits inputting data of and operating the device 1 by application of light pressure by the user, as is generally well-known.

Portable electronic device 1 is illustrated as being inserted through second mouth opening 112 into cavity 108 of flexible protective shell 102 with touch-sensitive screen 25 being positioned in contact with interior window panel 138 of opposing center panel 104, whereby the flexibility of the elastomeric material permits application of pressure to touch-sensitive screen 25 for inputting data and operating the electronic device 1 in general. As disclosed herein, interior window panel 138 of center panel 104 is structured as a thin flexible membrane in a position that corresponds to touch-sensitive screen 25 of device 1. By example and without limitation, window area of flexible center panel 104 is expected to be about 0.05 to 0.06 inch thick, or another thickness suitable for permitting touch-sensitive screen 25 to respond to pressure exerted by the user for inputting data and operating the electronic device 1 in general. Integral interior window panel 138 of center panel 104 covers pressure-sensitive touch screen 25 of electronic device 1 to protect it from scratching, denting, and other external abrasions. Side skirt 106 and portions of protective shell 102 surrounding interior window panel 138 of center panel 104 may be thicker for providing protection from bumps and scrapes.

Male plug 116 of adapter 114 is inserted into female input/output socket 27 of electronic device 1.

FIG. 13 illustrates portable electronic device 1 being received within flexible protective shell 102 of protective cover 100 with touch-sensitive screen 25 being positioned in contact with interior window panel 138. Protective cover 100 with portable electronic device 1 therein is subsequently inserted into docking cradle 5 with touch-sensitive screen 25 facing outwardly away therefrom. Docking connector 3 of docking cradle 5 is joined to contactor 120 of electrical adapter 114 with one or more of plurality of biasing electrical contacts 11 of docking connector 3 being electrically coupled with electrical contacts 122 of adapter contactor 120. Accordingly, portable electronic device 1 is accessed by docking cradle 5 without being first removed from protective cover or 'skin' 100 as required with prior art protective covers. When present, compression of clamp 19 aids in maintaining electrical coupling between electrical contacts 122 of adapter contactor 120 and biasing electrical contacts 11 of docking connector 3.

FIG. 14 is a close-up section view of protective cover 100 as illustrated in FIG. 12, wherein protective shell 102 is formed with interior window panel 138. FIG. 14 illustrates male plug 116 of electrical adapter 114 being interfaced with plurality of electrical contacts 29 of female input/output socket 27 of the portable electronic device 1.

FIG. 15 illustrates protective cover 100 being formed with interior transparent window panel 138 in a position for being juxtaposed with touch-sensitive screen 25 of portable electronic device 1. However, mouth opening 112 through side skirt 106 is positioned adjacent to one side 144 of unitary protective shell 102 between interior window panel 138 in center panel 104 and an opposing panel 146 of protective shell 102. Here, mouth opening 112 is formed by continuous integral lip 110 that extends inward of side skirt 106 at side 144 of protective shell 102.

When mouth opening 112 is formed through side skirt 106 adjacent to one side 144 of protective shell 102, electrical adapter 114 is positioned in side skirt 106 at a second side 148 opposite from side 144. With mouth opening 112 and electrical adapter 114 thus located at opposite sides 144 and 148, respectively, of protective shell 102, male plug 116 of electrical adapter 114 is extended into cavity 108 of shell 102 in a position to be received into and mechanically and electrically mated with the female input/output socket 27 of device 1 when portable electronic device 1 is received within cavity 108 through side mouth opening 112. Accordingly, in practice portable electronic device 1 is inserted (arrow 150) into protective shell 102 through side mouth opening 112 and into interior cavity 108 until the female input/output socket 27 is mechanically mated with male plug 116 of electrical adapter 114, whereupon female input/output socket 27 is simultaneously electrically mated with electrical adapter 114. Portable electronic device 1 is removed from protective shell 102 in reverse order along the insertion direction (arrow 150).

Figure 16:
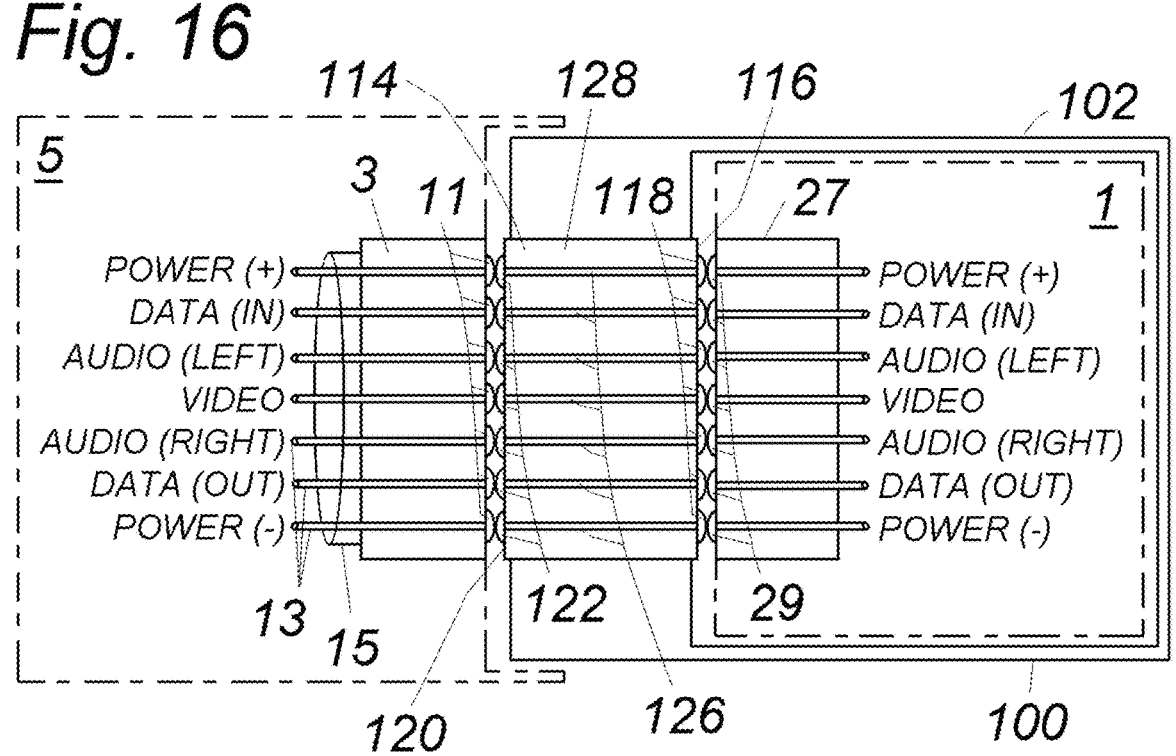
FIG. 16 is a block diagram that illustrates the electrical adapter of the protective cover of FIG. 1 being configured as a pass-through electrical adapter having electrical couplings between sequentially ordered pairs of the plurality of electrical connectors of its male plug and corresponding electrical contacts of its contactor.

FIG. 16 is a block diagram that illustrates adapter 114 being further configured as a pass-through adapter having electrical couplings between sequentially ordered pairs of the plurality of electrical connectors 118 of male plug 116 and corresponding electrical contacts 122 of contactor 120. Here, wires or other electrical conductors 126 embedded in body 128 of adapter 114 communicate in direct sequential relationship between electrical connectors 118 of male plug 116 and corresponding electrical contacts 122 of contactor 120. When adapter 114 is configured as a pass-through adapter, and portable electronic device 1 (shown in phantom) is received into protective cover 100 and the two received into docking cradle 5 (shown in phantom), as shown, input/output signals on a plurality of electrical contacts 29 of female socket 27 of the portable electronic device 1 are presented to electrical contacts 11 of docking connector 3 in the same order as presented on electrical contacts 29 of female input/output socket 27 of portable electronic device 1. Accordingly, electrical contacts 11 of docking connector 3 must be ordered correspondingly to electrical contacts 29 of input/output socket 27 of electronic device 1. Any desired reordering of input/output signals on electrical contacts 29 of female socket 27 of the electronic device 1 must occur in docking connector 3 of docking cradle 5, or elsewhere downstream of docking connector 3.

Figure 17:
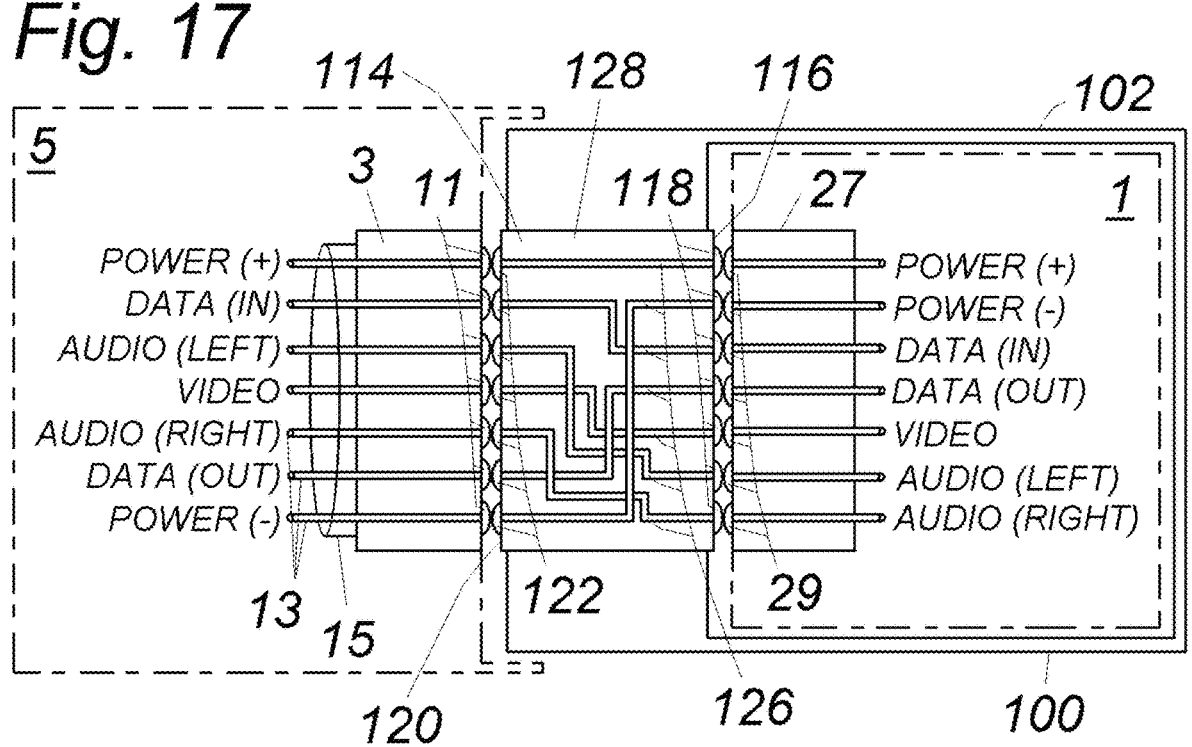
FIG. 17 is a block diagram that illustrates an alternative embodiment wherein the electrical adapter of the protective cover of FIG. 1 is configured as a converting electrical adapter having electrical couplings between non-sequentially ordered pairs of the plurality of electrical connectors of its male plug and corresponding electrical contacts of its contactor.

FIG. 17 is a block diagram that illustrates an alternative embodiment wherein adapter 114 is instead further configured as a converting adapter having electrical couplings between non-sequentially ordered pairs of the plurality of electrical connectors 118 of male plug 116 and corresponding electrical contacts 122 of contactor 120. Here, wires, traces or other electrical conductors 126 embedded in body 128 of adapter 114 communicate in non-sequential relationship between electrical connectors 118 of male plug 116 and electrical contacts 122 of contactor 120. When adapter 114 is configured as a converting adapter, and portable electronic device 1 (shown in phantom) is received into protective cover 100 and the two received into docking cradle 5 (shown in phantom), as shown, input/output signals on the plurality of electrical contacts 29 of female socket 27 of the portable electronic device 1 are presented to electrical contacts 11 of docking connector 3 in any desired order, in contrast to only the order presented on electrical contacts 29 of female input/output socket 27 of portable electronic device 1 as in the pass-through configuration of adapter 114 shown in FIG. 14. Electrical contacts 11 of docking connector 3 are thus ordered correspondingly to a predetermined input/output sequence on leads 13 in electrical cable 15 of docking cradle 5. Accordingly, input/output signals on electrical contacts 29 of female socket 27 of the electronic device 1 are reordered in any desired sequence to match docking connector 3, whereby downstream reordering of input/output signals on electrical contacts 29 of female socket 27 of the electronic device 1 in docking connector 3 is not required to match the specific electronic device 1 received in docking cradle 5. Instead, docking connector 3 operates as a universal docking connector for cooperating with any device 1 inserted into docking cradle 5 when converting adapter 114 is matched to the portable electronic device 1. Accordingly, docking cradle 5 can be provided with a single generic or universal docking connector 3 and still be utilized with a variety of different ones of the portable electronic device 1 by simply coordinating the order of coupling relationships between electrical connectors 118 of male plug 116 and electrical contacts 122 of contactor 120 within electrical adapter 114 by routing of wires, electrical traces or other electrical conductors 126 embedded in a body 128 of adapter 114.

Figure 18:
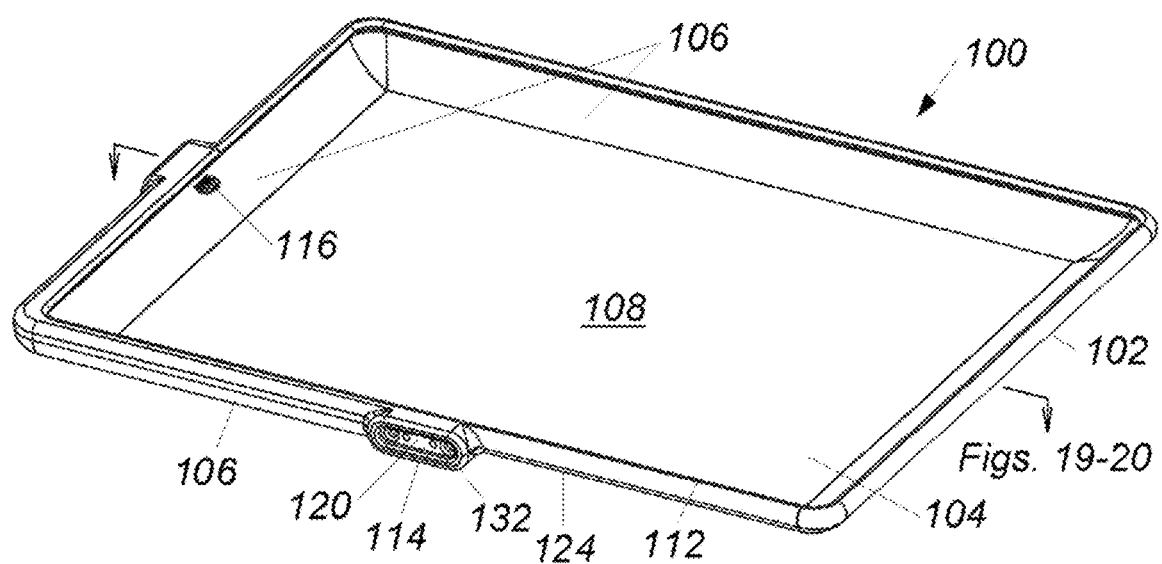
FIG. 18 illustrates the electrical adapter of the protective cover of FIG. 1 having the converting adapter configured as its male plug and contactor separated into two individual adapter plug and contactor bodies which are located in different areas of the protective shell.

FIG. 18 illustrates converting adapter 114 configured as having male plug 116 and contactor 120 separated into two individual adapter plug body 128a and contactor body 128b which are located in different areas of protective shell 102. Individual adapter plug body 128a of male plug 116 and contactor body 128b of contactor 120 are fixedly positioned in side skirt 106 of protective shell 102. Here for example, individual adapter plug and contactor bodies 128a, 128b are optionally embedded and overmolded in protective shell 102. By example and without limitation, male plug 116 is optionally embedded in skirt 106 adjacent to one side 102a of protective shell 102, while contactor 120 is optionally embedded in skirt 106 in a position spaced apart from male plug 116. For example, contactor 120 is optionally embedded in skirt 106 spaced apart from male plug 116 and adjacent to one side 102b of protective shell 102.

Optionally, contactor body 128b of adapter contactor 120 is recessed in outer surface 124 of unitary protective shell 102. By example and without limitation, optional dam 132 is formed in outer surface 124 of unitary protective shell 102, and adapter contactor 120 is further recessed within dam 132. Electrical contacts 122 of contactor 120 are protected from damage by being recessed within dam 132 or otherwise within outer surface 124 of unitary protective shell 102.

Figure 19:
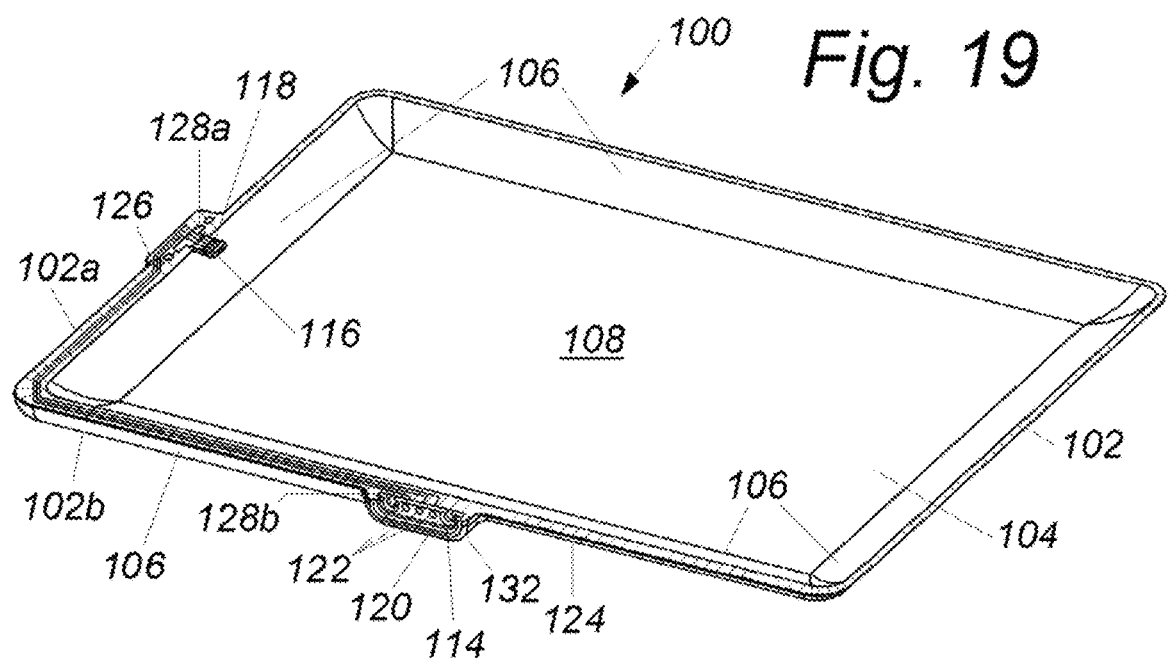
FIG. 19 and FIG. 20 are cross-section views of the protective cover of FIG. 1, wherein each of FIG. 19 and FIG. 20 illustrate the individual plug and contactor bodies of the electrical adapter are interconnected in the protective shell of the protective cover, for example by elongated electrical cables, wires or other electrical conductors.
Figure 20:
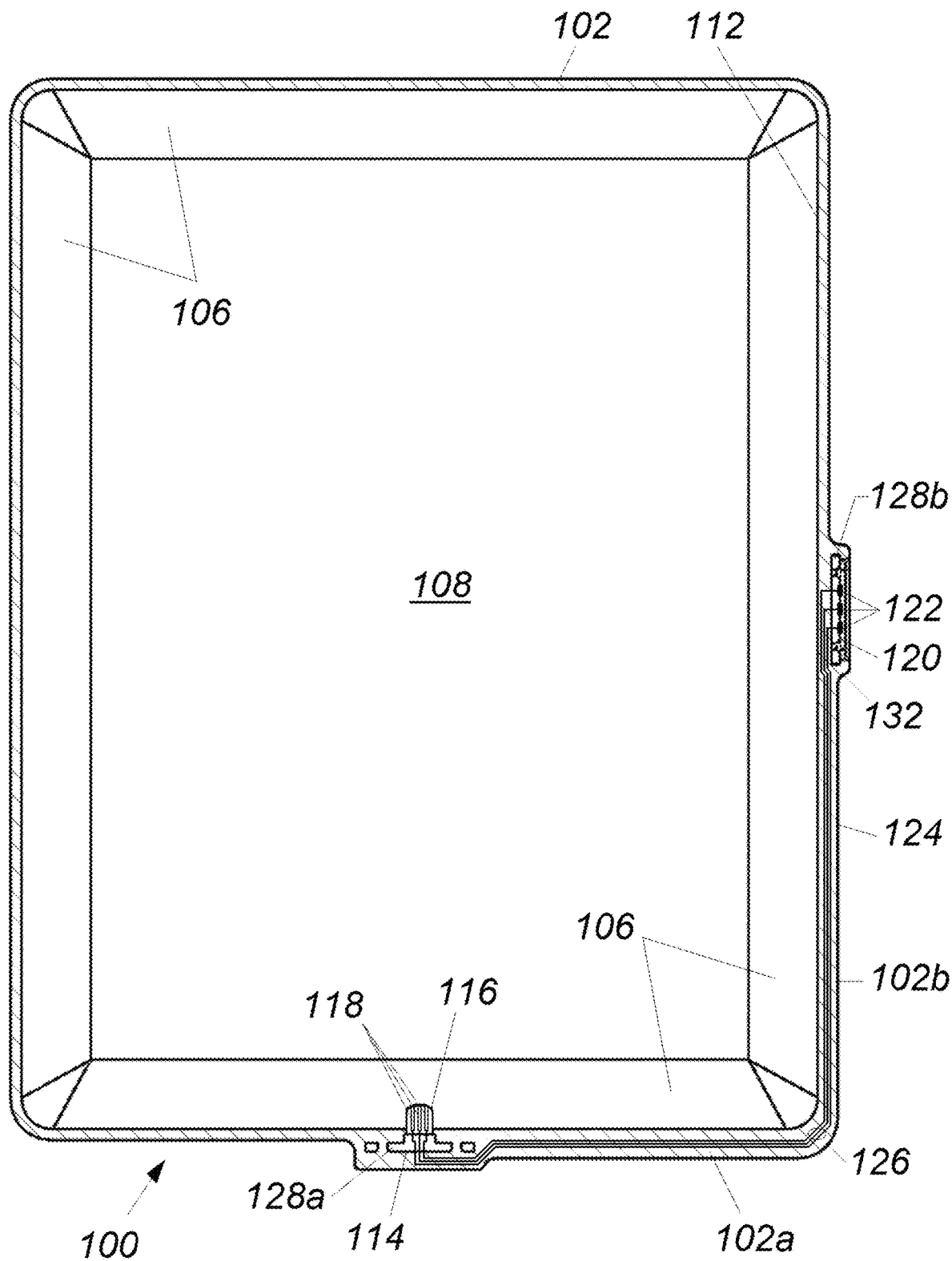

FIG. 19 and FIG. 20 illustrate individual adapter plug body 128a of male plug 116 and contactor body 128b of contactor 120 are interconnected in protective shell 102 by extended wires, traces or other electrical conductors 126. For example, plurality of electrical conductors 126 are formed as elongated electrical cables, wires or other electrical conductors (three shown) that are extended for electrically interconnecting plurality of electrical connectors 118 of male adapter plug 116 with corresponding plurality of electrical contacts 122 of adapter contactor 120. Electrical conductors 126 are fixedly positioned in protective shell 102. For example, electrical conductors 126 are optionally embedded and overmolded in side skirt 106 of protective shell 102. Alternatively, electrical conductors 126 are optionally adhered to a surface of protective shell 102, either an interior or an exterior surface.

Optionally, side 102a and/or side 102b of protective shell 102 are optionally adapted to receive plurality of electrical conductors 126 within skirt 106 of protective shell 102. For example, portions of side 102a and/or side 102b of protective shell 102 are optionally thickened to accommodate additional volume of plurality of electrical conductors 126 within skirt 106.

Figure 21:
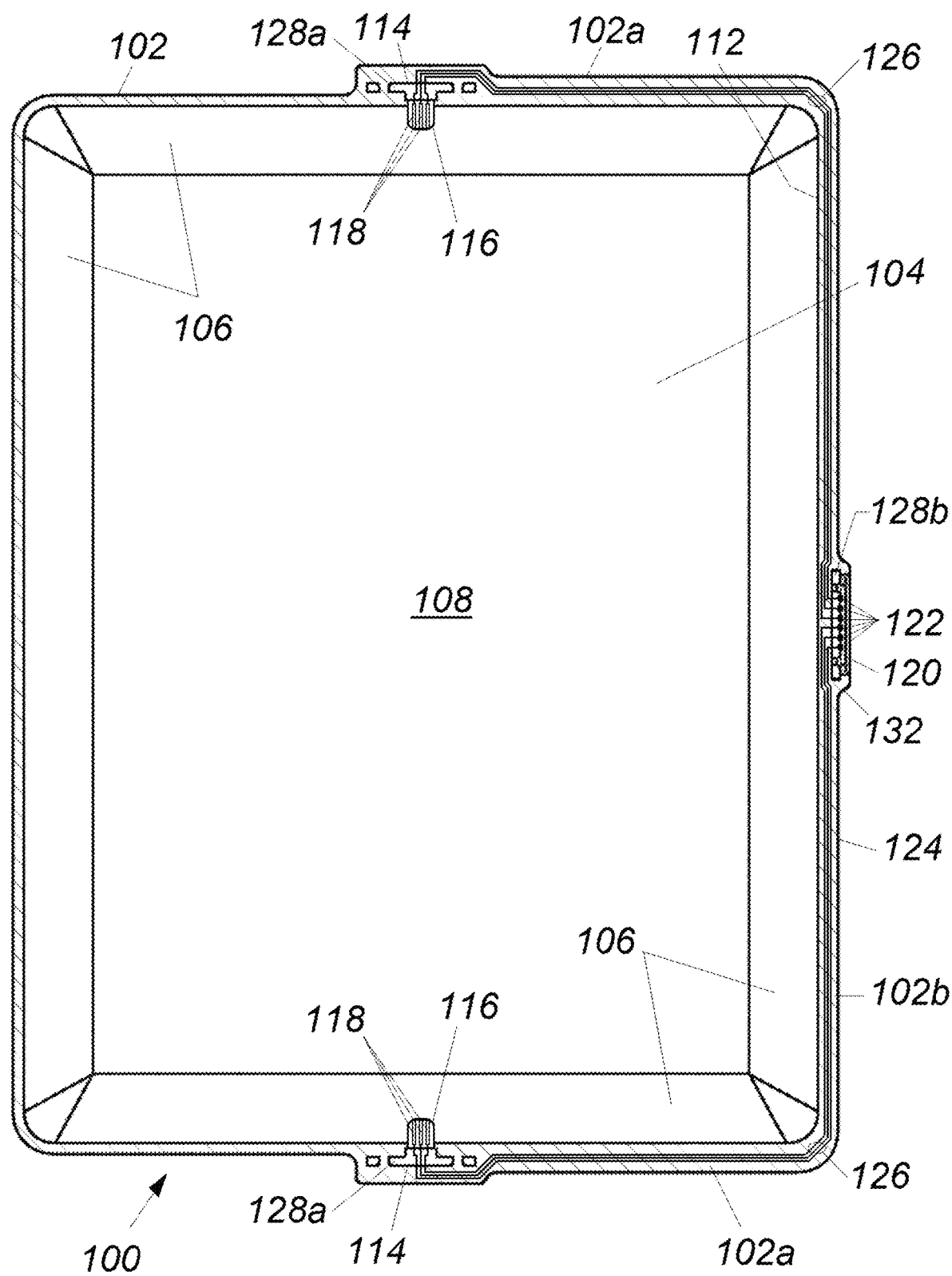
FIG. 21 illustrates the converting adapter configured as being separated into a plurality of male plugs (two shown) each located in the side skirt of the protective cover of FIG. 1 at different areas of elastomer shell.

FIG. 21 illustrates converting adapter 114 configured as separated into a plurality of male plugs 116 (two shown) in a plurality of individual adapter plug bodies 128a which are located in side skirt 106 adjacent to different sides 102a in different areas of elastomer shell 102. Each of the plurality of male plugs 116 is electrically coupled with electrical contacts 122 of contactor 120 in single contactor body 128b mounted on side skirt 106 of protective shell 102. Each individual adapter plug body 128a of male plugs 116 and contactor body 128b of contactor 120 are fixedly positioned in side skirt 106 of protective shell 102. By example and without limitation, all male plugs 116 are optionally embedded in side skirt 106 adjacent to one or more different sides 102a of protective shell 102. For example, each individual adapter plug body 128a is optionally overmolded into protective shell 102. Contactor 120 is optionally embedded, for example overmolded, in side skirt 106 in a position spaced apart from one or more of male plugs 116. For example, contactor 120 is optionally embedded in side skirt 106 spaced apart from male plug 116 and adjacent to one side 102b of protective shell 102.

As illustrated here, contactor body 128b of adapter contactor 120 is recessed in outer surface 124 of side skirt 106 of unitary protective shell 102. By example and without limitation, optional dam 132 is formed in outer surface 124 of unitary protective shell 102, and adapter contactor 120 is further recessed within dam 132. Electrical contacts 122 of contactor 120 are protected from damage by being recessed within dam 132 or otherwise within outer surface 124 of unitary protective shell 102.

As disclosed herein, dam 132 is a locator formed in outer surface 124 that cooperates with docking cradle 5 as a positioning interface for positively positioning unitary protective shell 102 relative to docking connector 3 for promoting mating therebetween.

As disclosed in each of FIG. 11 and FIG. 13, positioning interface dam 132 operates as a locator on outer surface 124 of unitary protective shell 102 that cooperates with a socket receiver of docking cradle 5 for positively positioning contactor 120 with docking connector 3 for mechanical and electrical coupling therebetween. For example, dam 132 is projected or extended from outer surface 124 of unitary protective shell 102, with adapter contactor 120 and electrical contacts 122 thereof being recessed within recess of locator dam 132, as illustrated for example in FIG. 8. As illustrated in each of FIG. 3, FIG. 4 and FIG. 5, docking connector 3 is recessed within a socket receiver that is recessed within interior surface of base receiver 9 of docking cradle tray 7. Socket receiver thus cooperates with locator dam 132 for positively positioning unitary protective shell 102 relative to docking connector 3 in receiver 9 of docking cradle tray 7 for promoting mating therebetween, as illustrated herein.

Figure 22:
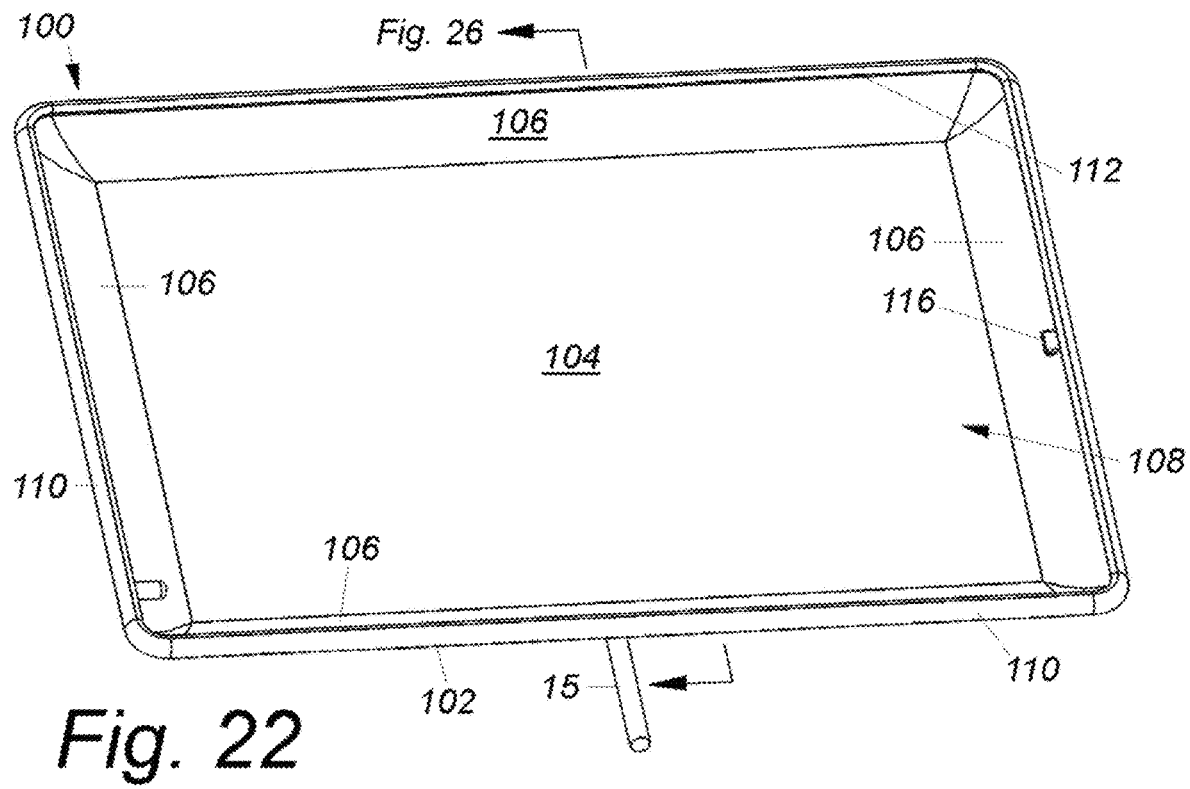
FIG. 22 illustrates the protective cover of FIG. 1 having the male plug of the converting adapter separate and spaced apart from the contactor of the adapter, as more clearly illustrated in subsequent figures.

FIG. 22 illustrates protective shell 102 having male plug 116 of converting adapter 114 separate and spaced apart from adapter contactor 120 thereof provided on an external surface 152 of flexible center panel 104 opposite of interior cavity 108, as more clearly illustrated in subsequent figures.

Figure 23:
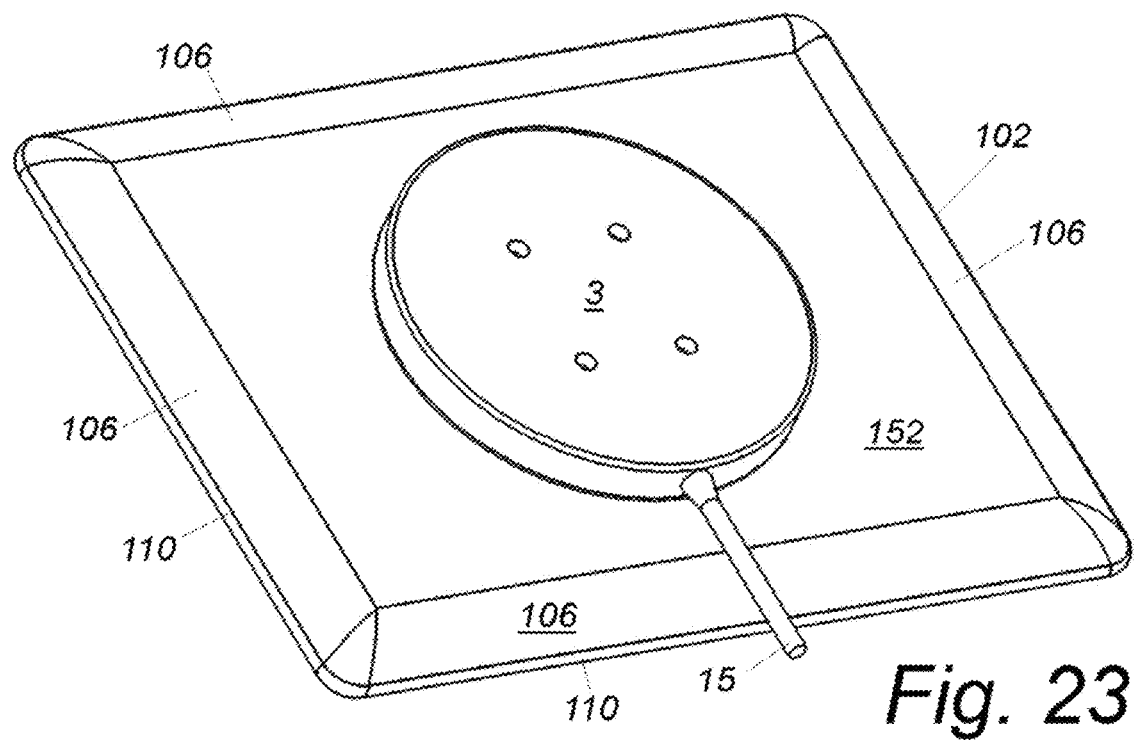
FIG. 23 illustrates the protective cover of FIG. 1 having the contactor of the converting adapter provided on external surface of the flexible center panel, while the docking cradle is alternatively configured to position the docking connector thereof in a position for coupling with the contactor thus positioned.

FIG. 23 illustrates protective shell 102 having contactor 120 of converting adapter 114 provided on external surface 152 of flexible center panel 104 opposite of interior cavity 108. Docking cradle 5 is alternatively configured to position docking connector 3 thereof in a position for coupling with contactor 120 on external surface 152 of flexible center panel 104 instead of being embedded in side skirt 106.

FIG. 24 illustrates one embodiment of docking cradle 5, wherein tray 7 is configured to lie substantially horizontally with base receiver 9 configured having an upper operational surface 156 and a lower interface surface 158 spaced apart by a peripheral side wall 160. As illustrated here, tray 7 of docking cradle 5 may be structured with a generally round shape, but any generally square or rectangular, oval, kidney, or other regular or irregular shapes as are suitable and result in an equivalent structure.

Operational surface 156 of docking cradle tray 7 is formed with a female nest 157 formed of a generally flat or planar peripheral surface 164 forming a support rim surrounding a shallow socket receiver 166 recessed therein. Socket receiver 166 is, for example, of a generally round shape (shown) similarly to the outline shape of the docking cradle tray 7, but may be of a generally square or rectangular, oval, kidney or other regular or irregular shape that optionally matches the shape of the outline shape of tray 7. Recessed socket receiver 166 is formed with a floor 168 forming an electrical interface surface that is recessed relative to, and may be substantially parallel with, surrounding support rim 164. An interior peripheral transition wall 170 provides a transition between socket floor 168 and surrounding rim support surface 164. According to one embodiment of the invention, peripheral transition wall 170 is substantially perpendicular to the offset surfaces of the socket floor 168 and surrounding socket rim 164. According to an alternative embodiment of the invention, peripheral transition wall 170 is optionally outwardly inclined between socket floor 168 and surrounding socket rim 164, thereby providing an inclined transition between socket floor 168 and surrounding socket rim 164. For example, an outwardly inclined peripheral transition wall 170 forms an angle in the range of about 30 degrees to 60 degrees from the plane of socket floor 168. However, the angle is optionally in the much larger range of about 15 degrees or less to 75 degrees or more from the plane of socket floor 168.

Docking cradle tray 7 optionally includes a mechanism for securing to an external mounting surface S. Accordingly, by example and without limitation, the docking cradle tray 7 is pierced by one or more fastener clearance holes 172 each sized to pass therethrough a mechanical fastener appropriate for attaching docking cradle tray 7 to an external mounting surface such as an intermediate mounting device, as discussed herein. Fastener clearance holes 172 optionally include coincidental annular depressions or recesses 174, either countersinks or counter bores, for recessing the head of a threaded fastener passing therethrough below either of both of upper operational surface 156 and recessed socket floor 168.

Alternatively, one or more fastener is optionally integrated with tray 7 of docking cradle 5. For example, the heads of two pair of threaded studs are embedded in the molded structure of docking cradle tray 7 with their threaded shafts projecting out of lower interface surface 158 so as to be inserted through matching apertures in an external mounting surface and secured with nuts. In such instance fastener clearance holes 172 are filled with the fasteners' threaded shafts. Furthermore, recessed socket floor 168, and surrounding socket rim 164 as well as peripheral transition wall 170 therebetween are optionally left completely unbroken, and docking cradle tray 7 thus presents a substantially solid and unbroken surface. Other mechanisms for attaching to external mounting surface S, such as adhesives or pressure sensitive adhesive tapes and films, are also contemplated and may be included or substituted without deviating from the scope and intent of the present invention.

Optionally, female nest 157 of docking cradle tray 7 is formed with one or more male rotational control features 176 that are configured to maintain a rotational orientation between unitary protective shell 102 of protective cover 100 and docking cradle tray 7. By example and without limitation, male rotational control features 176 are configured as shallow intrusions into recessed socket receiver 166 by straight or curved (shown) portions of peripheral transition wall 170 between recessed socket floor 168 and surrounding socket rim 164. Alternatively, peripheral transition wall 170 of socket receiver 166 is configured with any generally square or rectangular, oval, kidney, rectangular or other regular or irregular shapes, whereby rotational control features 176 are inherent in socket receiver 166 as provided by such non-round shapes.

According to one embodiment, shell 102 of protective cover 100 is retained in tray 7 of docking cradle 5 under the weight of portable electronic device 1 in shell 102, i.e., by force of gravity. Positioning interface dam 132 of shell 102 cooperates with docking cradle 5 by nesting into socket receiver 166 recessed in docking cradle tray 7.

Alternatively, one or more permanent magnets 178 are provided between shell 102 of protective cover 100 and tray 7 of docking cradle 5 for securing protective cover 100 in docking cradle 5. By example and without limitation, one or more permanent magnets 178 are disposed within a magnet retention structure 180 that is adjacent to either recessed floor 168 of socket receiver 166, or surrounding socket rim 164 (shown). When present, each permanent magnet 178 is, by example and without limitation, a thin round or disk-shape. Although the disk shape is convenient, other magnet shapes are equivalent and maybe substituted. Magnet 178 is optionally of the well-known rare-earth variety. Rare-earth magnets are very powerful in proportion to size and are therefore useful in practice of the present invention. However, other known and presently unknown magnets that are sufficiently powerful for practice of the invention are equivalent and may be substituted.

By example and without limitation, magnet retention structure 180 is embodied as a plurality of cavities that individually position each magnet 178 in close proximity to either recessed floor 168 of socket receiver 166, or surrounding socket rim 164 of female nest 157. According to one embodiment of the invention, each cavity of magnet retention structure 180 minimizes the distance between magnet 178 and socket's recessed floor 168, or surrounding socket rim 164. Attenuation of magnetic fields generated by magnets 178 is thereby minimized, and the magnetic field generated remains sufficiently powerful to ensure retention of most handheld electronic and other small devices by magnetic attraction to cooperating docking cradle 5.

According to one embodiment, cavities of magnet retention structure 180 are sized to match magnets 178, either as a slip fit or a compression fit such that each magnet 178 is inserted under at least light pressure and as much as a press fit.

Magnet retention cavities 180 may be provided on lower interface surface 158 of tray 7 of docking cradle 5 opposite from operational surface 156. Magnets 178 in retention cavities 180 are retained in close proximity of recessed floor 168 of socket receiver 166, or surrounding socket rim 164 of female nest 157. When docking cradle tray 7 is formed of a substantially rigid plastic or other elastomeric material having a property of being resiliently responsive to slight deformations, and magnet retention cavity 180 is optionally sized as a compression fit for magnet 178, whereby magnet 178 is retained by radial compression of undersized cavity 180 which is resiliently deformed by magnet 178 upon insertion. Therefore, other retention elements are avoided such as bi-adhesive tape as taught by both Tarulli in U.S. Pat. No. 5,992,807 and Won in U.S. Pat. No. 6,149,116 or the bayonets in mating apertures as taught by Rielo in U.S. Pat. No. 5,895,018 entitled, MAGNETIC SUPPORT ATTACHMENT, issued Apr. 20, 1999, which is incorporated herein by reference.

As disclosed herein, docking connector 3 includes plurality of biasing electrical contacts 11 configured, for example, as spring-loaded pogo pins that are electrically coupled to electrical leads 13 in wire or cable 15. Typically, locking connector 3 includes a minimum number of at least two biasing electrical contacts 11, but is not limited to having greater numbers of contacts 11.

FIG. 25 illustrates unitary protective shell 102 of protective cover 100 formed with locator dam 132 of shell 102 as a complementary male nesting appendage 159 configured to seat in female nest 157. For example, locator dam 132 of complementary male nesting feature 159 is configured for mating with recessed socket receiver 166 of horizontal base receiver 9 in tray 7 of docking cradle 5 as illustrated in FIG. 24. Complementary locator dam 132 is projected or extended from external surface 152 of flexible center panel 104 opposite of interior cavity 108 where portable electronic device 1 is seated. Complementary locator dam 132 is configured with a generally round shape when recessed socket receiver 166 is so configured. Alternatively, locator dam 132 is configured with any generally square or rectangular, oval, kidney, rectangular or other regular or irregular shape when recessed socket receiver 166 of female nest 157 in operational surface 156 of docking cradle tray 7 is so configured. Thus, complementary locator dam 132 is a shallow projection formed with a substantially planar contactor surface 182 offset from external surface 152 of flexible center panel 104 to distance about the depth of recessed floor 168 in socket receiver 166 of docking cradle tray 7. Thus, external surface 152 of flexible center panel 104 of protective shell 102 forms a lower rim of male nesting appendage 159 that engages peripheral support rim 164 of docking cradle tray 7 when complementary locator dam 132 nests in recessed socket receiver 166.

When peripheral transition wall 170 of female socket receiver 166 is inclined between socket floor 168 and surrounding socket rim 164, complementary male locator dam 132 optionally includes a exterior peripheral transition wall 184 extended between contactor surface 182 and external surface 152 of flexible center panel 104 and formed with a substantially matching incline. Accordingly, inclined complementary male locator dam 132 nests in incline of recessed socket receiver 166 of female nest 157.

When socket receiver 166 of female nest 157 is configured with one or more male rotational control features 176, complementary male locator dam 132 is configured with one or more matching rotational control features 186. For example, when rotational control features 176 of female socket receiver 166 are configured as male peripheral protrusions of transition wall 170 into interior of socket 166 between recessed socket floor 168 and surrounding socket rim 164, rotational control features 186 are configured as matching female indents or intrusions into periphery of complementary locator dam 132 that are positioned and sized to mate with male rotational control features 176 in socket transition wall 170.

Alternatively, matching male and female rotational control features 176 and 186 are optionally reversed between female socket receiver 166 and complementary locator dam 132 such that female rotational control features 176 are presented in complementary locator dam 132 of shell 102 as male peripheral protrusions of transition wall 184, and matching female rotational control features 186 are presented as complementary female indents or intrusions into periphery of transition wall 170 into rim 164 surrounding female socket receiver 166.

Thus, as disclosed here, male positioning interface 132 includes a combination of both offset projection contactor surface 182 with recessed female rotational control features 186 formed in its periphery and which are, for example, coplanar with surrounding peripheral rim formed by external surface 152 of flexible center panel which contacts rim 164 surrounding socket receiver 166 when seated in female nest 157 of docking cradle tray 7. Recessed female rotational control features 186 of male positioning interface 132 engage male rotational control features 176 of docking cradle tray 7 in female nest 157, whereby shell 102 is rotationally oriented relative to base receiver 9 of tray 7. Accordingly, complementary locator dam 132 on external surface 152 of protective shell 102 nests with female socket receiver 166 in base receiver 9 of docking cradle tray 7, while mating male and female rotational control features 176, 186 control rotation of protective shell 102 relative to base receiver 9 of tray 7.

When tray 7 of docking cradle 5 includes optional magnets 178 adjacent to recessed floor 168 or surrounding rim 164 of socket receiver 166, as shown in FIG. 24, center panel 104 of protective shell 102 is provided with a magnetically permeable member 188 embodied as a thin sheet or plate of a ferrous or other highly magnetically permeable ferromagnetic material, such as iron, nickel, cobalt or another ferromagnetic material or alloy. For example, magnetically permeable member 188 is embedded in center panel 104 of protective shell 102 in a complementary position for attraction by magnets 178. Magnets 178 and magnetically attractive member 188 thus form a magnetic attraction couple operable between shell 102 of protective cover 100 and tray 7 of docking cradle 5 for securing protective cover 100 in docking cradle 5.

Contactor 120 of converting adapter 114 provided on external surface 152 of flexible center panel 104 is suitably configured to electrically couple with plurality of biasing electrical contacts 11 configured as spring-loaded pogo pins in recessed socket receiver 166 of horizontal tray 7. For example, plurality of electrical contacts 122 of contactor 120 are configured as a plurality of concentric contact rings of an electrically conductive material, such as copper, silver, gold, platinum, or another electrically conductive material. Contact rings 122 of contactor 120 are coupled to electrical conductors 126 for electrically interconnecting with plurality of electrical connectors 118 of male adapter plug 116, in either sequentially or non-sequentially ordered pairs, as disclosed herein. Contact rings 122 of contactor 120 are positioned to mate with different pogo pin contacts 11 in recessed socket receiver 166 of base receiver 9 in docking cradle tray 7.

When electrical contacts 122 of contactor 120 are configured as the plurality of concentric contact rings, cooperating male and female rotational control features 176 and 186 are optionally eliminated because contact rings 122 normally mate with different pogo pin contacts 11 in any orientation of shell 102 relative to docking cradle tray 7 regardless of rotation (FIG. 25, arrows 190) of positioning interface dam 132 in female socket receiver 166. However, cooperating male and female rotational control features 176 and 186 may be present for providing relative rotational relationship between protective cover 100 and docking cradle 3, if desired.

FIG. 26 is a cross-section view that illustrates elastomeric shell 102 of protective cover, or skin, 100 seated in tray 7 of docking cradle 3. As illustrated, complementary male nesting appendage 159 of protective cover 100 is nested with female nest 157 of docking cradle 5, whereby shell 102 is retained in docking cradle tray 7. For example, shell 102 is secured by the weight of portable electronic device 1 in shell 102, i.e., by force of gravity, as disclosed herein. Shell 102 cooperates with docking cradle 5 by nesting positioning interface dam 132 into socket receiver 166 recessed in docking cradle tray 7. For example, positioning interface dam 132 is rotated (FIG. 25, arrows 190) until optional female rotational control features 186, if present, mate with matching male rotational control features 176, if present, of tray 7 of docking cradle 5. Thereafter, peripheral transition wall 184 of cooperates with matching transition wall 170 to position locator dam 132 in socket receiver 166 as shell 102 approaches docking cradle tray 7. When positioning interface dam 132 of complementary male nesting feature 159 is fully nested in socket receiver 166 of female nest 157, external surface 152 of flexible center panel 104 contacts peripheral support rim 164 of female socket receiver 166, and contactor surface 182 of elastomer shell 102 is juxtaposed with recessed socket floor 168. Engagement of cooperating peripheral transition walls 184 and 170 of projected positioning interface dam 132 and recessed socket receiver 166 operate to guide electrical contacts 122 of contactor 120 into engagement with biasing electrical contacts 11 of base receiver 9 of docking cradle 3.

According to one embodiment, electrical contacts 122 of contactor 120 engage biasing electrical contacts 11 of base receiver 9 of docking cradle 3 under the weight of shell 102 with electronic device 1 therein, i.e., by force of gravity, as disclosed herein.

Alternatively, when optional magnets 178 are present, magnetic attraction between magnets 178 and magnetically permeable member 188 operates to secure shell 102 of protective cover 100 in nested engagement with tray 7 of docking cradle 5 and engage electrical contacts 122 of contactor 120 with biasing electrical contacts 11 of base receiver 9 of docking cradle 5.

When protective cover, or skin, 100 is retained in tray 7 of docking cradle 3 under force of gravity, simply lifting shell 102 will release protective cover 100 for removal from cradle 3.

Alternatively, when optional magnets 178 are present, magnetic attraction between magnets 178 and magnetically permeable member 188 operates to secure shell 102 of protective cover 100 in nested engagement with tray 7 of docking cradle 5. However, simply rotating shell 102 (FIG. 25, arrows 190) causes positioning interface dam 132 to be rotated until female rotational control features 186 interfere with matching male rotational control features 176 of tray 7 of docking cradle 5. Such interference causes shell 102 to separate from base receiver 9 and attenuate the magnetic attraction, whereby protective cover 100 is released for removal from cradle 3.

FIG. 27, FIG. 28 and FIG. 29 together illustrate an alternative embodiment of cover or skin 100 and docking cradle 5. As disclosed herein, the relative locations of magnets 178 and magnetically permeable member 188 are inverted. For example, one or more magnets 178 are disposed within a magnet retention structure 180 adjacent to external surface 152 of flexible center panel 104 instead of being in raised rim 164 surrounding socket receiver 166 of female nest 157 in docking cradle tray 7. As illustrated by example and without limitation, one or more magnetically permeable members 188 each embodied as a thin sheet or plate of a ferrous or other highly magnetically permeable ferromagnetic material, such as iron, nickel, cobalt or another ferromagnetic material or alloy, as disclosed herein, are embedded in either recessed floor 168 of female socket receiver 166, or surrounding socket rim 164 (shown).

Additionally, one or more permanent magnets 178 mounted in complementary male nesting appendage 159 of protective cover 100. For example, magnets 178 are embedded in center panel 104 of protective shell 102 for cooperating with magnetically permeable members 188 for magnetically securing protective cover 100 in docking cradle 5.

FIG. 30, FIG. 31 and FIG. 32 illustrate an alternative embodiment of cooperating device cover 100 and docking cradle 5, wherein the positioning interface feature provided between contactor 120 of converting adapter 114 and docking connector 3 formed by male nesting appendage 159 and mating female nest 157 of docking cradle tray 7 is inverted. The inverted embodiment of the positioning interface feature of female nest 157 of and complementary male nesting feature 159 is formed by locator dam 132 being configured as the female receiver which is provided on external surface 152 of center panel 104 of shell 102, while base receiver 9 of docking cradle tray 7 is configured as the cooperating male locator.

FIG. 30 illustrates female nest 157 being provided on protective shell 102 by locator dam 132 which is configured here with shallow socket receiver 166 from docking cradle tray 7. Socket receiver 166 of locator dam 132 is surrounded by generally flat or planar peripheral surface 164 forming a support rim thereabout that is projected from external surface 152 of flexible center panel 104 opposite of interior cavity 108 of shell 102. Socket receiver 166 of dam 132 includes interior peripheral transition wall 170 that provides transition between socket floor 168 and surrounding rim support surface 164. Transition wall 170 is formed with rotational control features 176 that are configured to positively rotationally orient elastomer shell 102 of protective cover 100 relative to docking cradle tray 7, as disclosed herein.

Thus, as disclosed here, male positioning interface 132 includes a combination of both contactor surface recessed in floor 168 of socket receiver 166 with projected rotational control features 176 formed in its periphery and which are, for example, coplanar with surrounding peripheral contact rim 164 surrounding socket floor 168. Contact rim 164 engages operational surface 156 of docking cradle tray 7 when female nest 157 is seated over complementary male nesting appendage 159 of docking cradle tray 7. Projected rotational control features 176 of female positioning interface 132 engage recessed rotational control features 186 of docking cradle tray 7 in male nesting appendage 159, whereby shell 102 is rotationally oriented relative to base receiver 9 of tray 7.

Optionally, shell 102 of protective cover 100 is retained in tray 7 of docking cradle 5 under weight, i.e., by force of gravity, as disclosed herein. Alternatively, optional magnets 178 and magnetically permeable member 188, when present, may be provided in either of docking cradle tray 7 or protective shell 102, as disclosed herein. As illustrated here by example and without limitation, magnets 178 are provided in magnet retention structure 180 that is adjacent to either recessed floor 168 of socket receiver 166, or surrounding socket rim 164 (shown).

Contactor 120 of converting adapter 114 may be configured as a plurality of concentric contact rings 122 of an electrically conductive material, as disclosed herein. Contactor 120 is positioned on floor 168 of socket receiver 166.

FIG. 31 illustrates tray 7 of docking cradle 5 being configured to lie substantially horizontally with base receiver 9 configured having its upper operational surface 156 formed of a generally flat plane. Operational surface 156 of tray 7 is configured with complementary male nesting appendage 159 from protective cover 100.

Substantially planar contactor surface 182 is offset or projected from upper operational surface 156 of docking cradle tray 7 and is configured with any generally round, square or rectangular, oval, kidney, rectangular or other regular or irregular shape and sized to fit snugly within recessed socket receiver 166 of female locator dam 132 of nest 157 on protective shell 102. Thus, upper operational surface 156 of docking cradle tray 7 engages peripheral support rim 164 of locator dam 132 in protective shell 102 when projected contactor surface 182 of complementary male nesting appendage 159 nests in recessed socket receiver 166 in female locator dam 132 of nest 157.

Thus, as disclosed here, complementary male nesting appendage 159 of docking cradle tray 7 includes a combination of both contactor surface 182 projected from upper operational surface 156 of base receiver 9 with female rotational control features 186 recessed in its periphery and which are, for example, coplanar with surrounding peripheral contact rim formed as operational surface 156. Operational surface 156 engages contact rim 164 of peripheral surface 164 forming a support rim surrounding socket receiver 166 of locator dam 132 that is projected from external surface 152 of flexible center panel 104 of shell 102 (shown in FIG. 30) when female nest 157 is seated over complementary male nesting appendage 159 of docking cradle tray 7. Projected male rotational control features 176 of female positioning interface 132 engage recessed female rotational control features 186 of docking cradle tray 7 in male nesting appendage 159, whereby shell 102 is rotationally oriented relative to base receiver 9 of tray 7.

As disclosed herein, docking connector 3 includes plurality of biasing electrical contacts 11 configured, for example, as spring-loaded pogo pins that are electrically coupled to electrical leads 13 in wire or cable 15.

Docking cradle tray 7 is optionally pierced by fastener clearance holes 172 for attaching docking cradle tray 7 to an external mounting surface, as discussed herein. Fastener clearance holes 172 optionally include coincidental annular depressions or recesses 174, either countersinks or counter bores, as discussed herein, for recessing the head of a threaded fastener passing therethrough below projected contactor surface 182 of complementary male nesting appendage 159. As further disclosed herein, other mechanisms for attaching to external mounting surface S, such as adhesives or pressure sensitive adhesive tapes and films, are also contemplated and may be included or substituted without deviating from the scope and intent of the present invention.

Exterior peripheral transition wall 184 of complementary projected male nesting appendage 159 is optionally inclined for cooperatively nesting in incline of recessed socket receiver 166 for positively positioning unitary protective shell 102 relative to docking connector 3 in receiver 9 of docking cradle tray 7.

When locator dam 132 of protective shell 102 is formed with male rotational control features 176, tray 7 of docking cradle 5 may be formed with matching female rotational control features 186 that mate with male rotational control features 176 and cooperate for controlling rotational orientation between protective shell 102 and docking cradle tray 7.

Alternatively, matching male and female rotational control features 176 and 186 are optionally reversed between female socket receiver 166 of locator dam 132, forming female nest 157 on protective shell 102, and complementary male nesting appendage 159 of docking cradle tray 7 such that rotational control features 186 are presented as female indents or intrusions into periphery of transition wall 170 into rim 164 surrounding female socket receiver 166 of locator dam 132, and matching rotational control features 176 are presented as complementary male peripheral protrusions of transition wall 184.

FIG. 32 is a cross-section view, wherein female nest 157 is provided on protective shell 102 by locator dam 132, and complementary male nesting appendage 159 is provided on tray 7 of docking cradle 5 by base receiver 9. Accordingly, positioning interface between shell 102 of protective cover 100 and tray 7 of docking cradle 5 is provided by female nest 157 on protective shell 102 being received onto complementary male nesting appendage 159 of base receiver 9.

When protective cover 100 is secured by the weight of the portable electronic device 1 in shell 102, i.e., by force of gravity, as disclosed herein, tray 7 of docking cradle 5 is expected to be presented with complementary male nesting appendage 159 of base receiver 9 oriented generally upright for receiving female nest 157 of protective shell 102 thereonto. Alternatively, one or more permanent magnets 178 and magnetically permeable members 188 are disposed in complementary locations for magnetic attraction between shell 102 of protective cover 100 and tray 7 of docking cradle 5. For example, when optional magnets 178 and magnetically permeable member 188 are present, as illustrated here, rotation of docking cradle tray 7 is possible with electronic device 1 in protective cover 100 being releasably magnetically mounted thereon. Depending upon the strength of magnetic attraction as a function of selected magnets 178 and magnetically permeable member 188, tray 7 of docking cradle 5 can be tilted or rotated to a greater extreme, even to inverted with docking cradle tray 7 being upside-down, with electronic device 1 secured therein by magnetic attraction between protective cover 100 and docking cradle tray 7 sufficiently that electrical contacts 122 of shell contactor 120 remain mechanically and electrically coupled to electrical contacts 11 of docking connector 3 sufficiently for operation of electronic device 1.

As illustrated by example and without limitation, one or more magnetically permeable members 188 each embodied as a thin sheet or plate of a ferrous or other highly magnetically permeable ferromagnetic material, such as iron, nickel, cobalt or another ferromagnetic material or alloy, as disclosed herein, are embedded in either recessed floor 168 of female socket receiver 166, or surrounding socket rim 164 (shown) of locator dam 132 on protective shell 102. Additionally, one or more permanent magnets 178 mounted in complementary male nesting appendage 159 of protective cover 100. For example, magnets 178 are embedded in center panel 104 of protective shell 102 for cooperating with magnetically permeable members 188 for magnetically securing protective cover 100 in docking cradle 5.

Alternatively, relative locations of magnets 178 and magnetically permeable member 188 are optionally inverted, as disclosed herein, wherein one or more magnets 178 are disposed within a magnet retention structure 180 in female nest 157 of locator dam 132 on protective shell 102, and one or more magnetically permeable members 188 are disposed in a complementary location in operational surface 156 of tray 7 adjacent to male nesting appendage 159 of base receiver 9.

As disclosed herein, interior transition wall 170 of socket receiver 166 cooperates with exterior peripheral transition wall 184 of complementary projected male nesting appendage 159 for positively positioning unitary protective shell 102 relative to docking connector 3 in receiver 9 of docking cradle tray 7.

Furthermore, when locator dam 132 of protective shell 102 is formed with rotational control features 176, tray 7 of docking cradle 5 may be formed with complementary rotational control features 186 that mate with rotational control features 176 and cooperate therewith for controlling rotational orientation between protective shell 102 and docking cradle tray 7.

Figure 33:
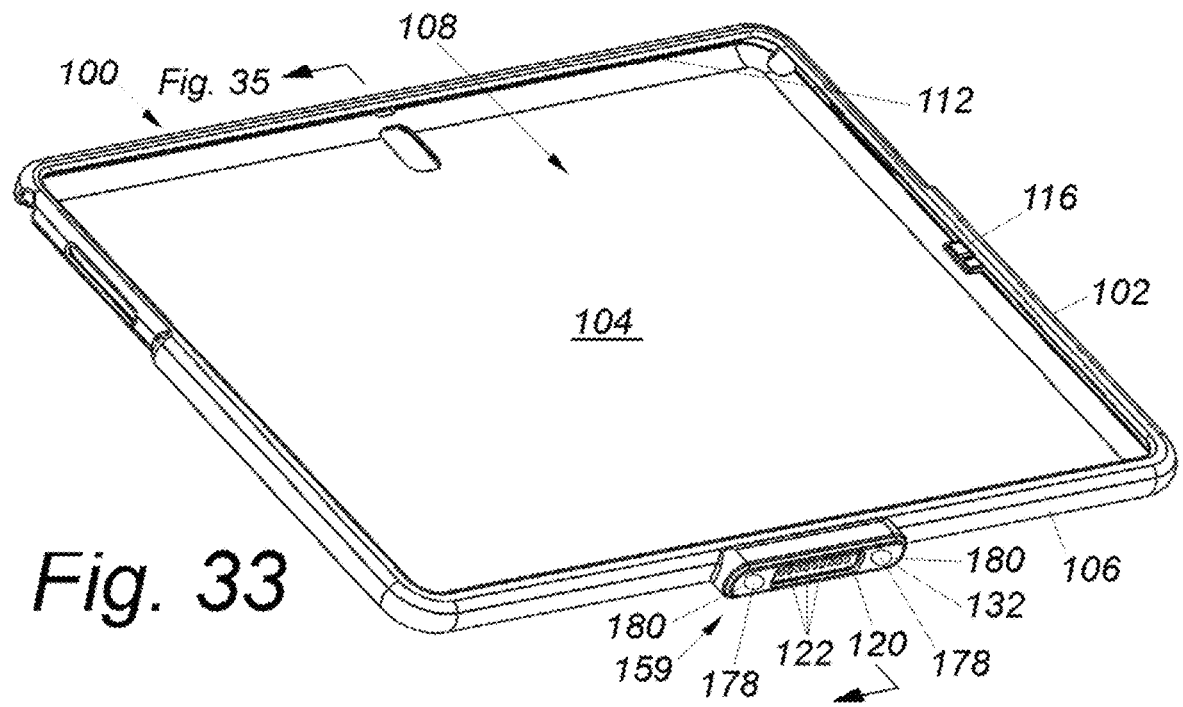
FIG. 33 illustrates the protective cover of FIG. 1 as illustrated in FIG. 18 through FIG. 20, wherein the complementary male nesting appendage is configured as the positioning interface dam in one side skirt of the protective shell, as similarly shown in FIG. 6, for being received into the female nest of the base receiver of the docking cradle, as similarly shown in FIG. 11, and wherein in contrast, the positioning interface dam on the exterior of the protective shell is spaced away from the male plug of the converting adapter, which plug is extended into the protective shell at a position in a different side skirt of the shell away from the contactor and contacts of the converting adapter, as disclosed herein, and wherein the complementary male nesting appendage is further configured with one or more magnets of the magnetic attraction couple.

FIG. 33 illustrates protective cover 100, wherein complementary male nesting appendage 159 is configured as positioning interface dam 132 in side skirt 106 of protective shell 102, as similarly shown in FIG. 6, for being received into female nest 157 of base receiver 9, as similarly shown in FIG. 11. In contrast, here positioning interface dam 132, which includes contactor 120 and its contacts 122, is spaced away from male plug 116 which is extended into cavity 108 of shell 102 at a position in a different side skirt 106 of protective shell 102 away from contactor 120 and its contacts 122, as disclosed herein.

Positioning interface dam 132 of male nesting appendage 159 is optionally formed with magnet retention structures 180 adjacent to either side of contactor 120 of converting adapter 114, whereby magnets 178 are mounted adjacent to contactor 120. Accordingly, protective cover 100 is configured to cooperate with tray 7 of docking cradle 5 having one or more magnetically permeable members 188, such that magnetic attraction of protective shell 102 to tray 7 operates to secure protective cover 100 in docking cradle 5 when male nesting appendage 159 is seated in complementary female nest 157, as disclosed herein.

Figure 34:
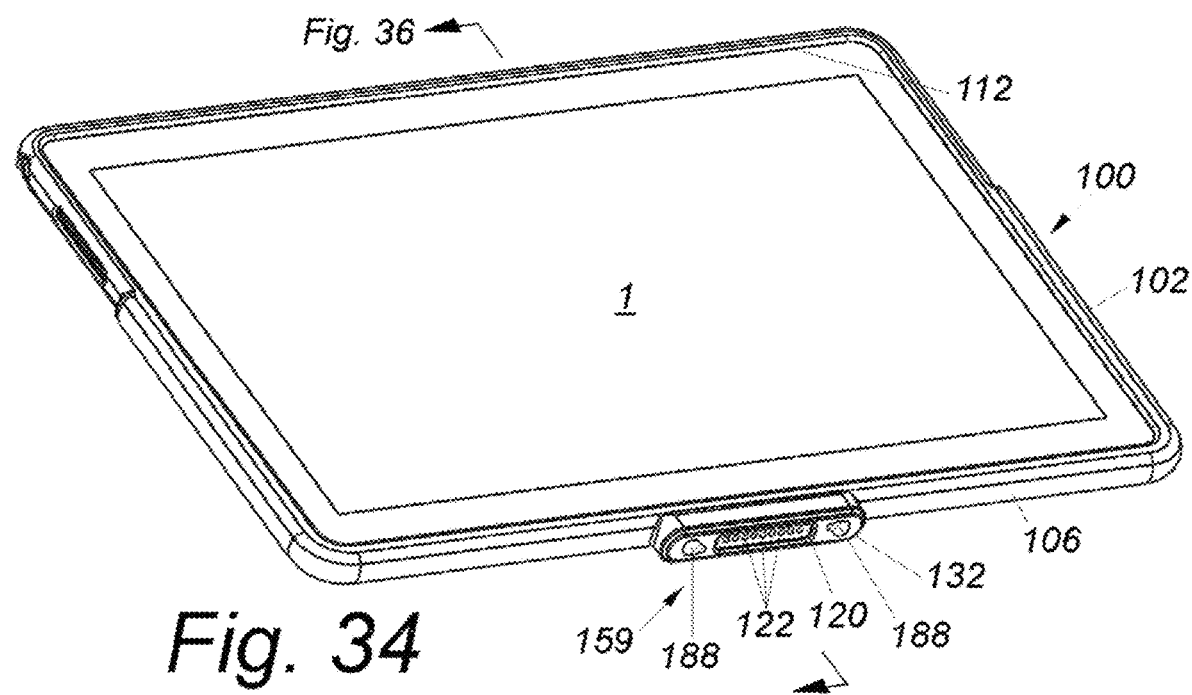
FIG. 34 illustrates the protective cover of FIG. 1 as illustrated in FIG. 33 having the electronic device installed therein, wherein the magnetically permeable members are substituted for the magnets of the magnetic attraction couple.

FIG. 34 illustrates protective cover 100 having electronic device 1 installed therein. Protective cover 100 here is similar to the embodiment illustrated in FIG. 33, except here positioning interface dam 132 of male nesting appendage 159 instead includes magnetically permeable member 188 embodied as one or more thin sheets or plates of a ferrous or other highly magnetically permeable ferromagnetic material, such as iron, nickel, cobalt or another ferromagnetic material or alloy. For example, magnetically permeable member 188 is embedded in locator dam 132 on outer surface 124 of protective shell 102 in a complementary position for cooperating with one or more magnets 178 positioned in base receiver 9 of docking cradle tray 7. Thus, when male nesting appendage 159 is seated in complementary female nest 157, magnets 178 and magnetically permeable members 188 cooperate for securing protective cover 100 with electronic device 1 in docking cradle 5, as disclosed herein.

Figure 35:
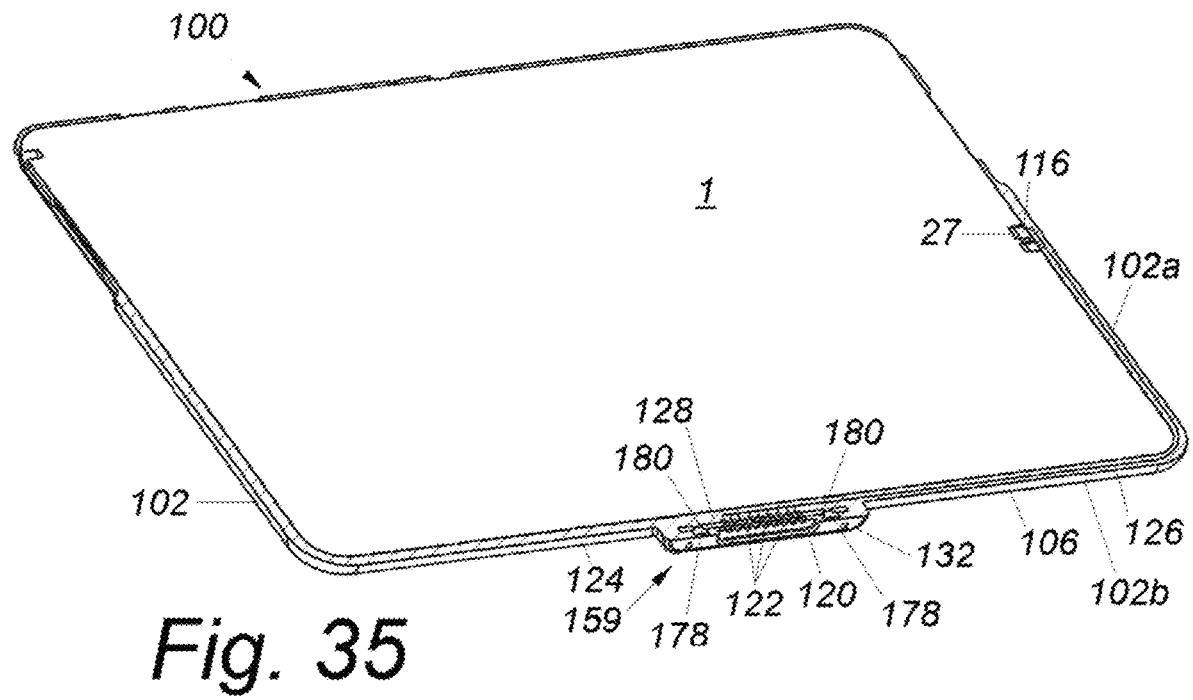
FIG. 35 is a cross-section taken through the protective cover of FIG. 1 as illustrated in FIG. 33, wherein the male plug and contactor of the electrical adapter are spaced apart in different areas of the side skirt of the protective shell, and wherein the complementary male nesting appendage is further configured with one or more magnets of the magnetic attraction couple.

FIG. 35 is a cross-section taken through protective cover 100 of FIG. 33, wherein male plug 116 and contactor 120 of electrical adapter 114 are spaced apart in different areas of side skirt 106 of protective shell 102. As illustrated here, electrical contacts 122 of contactor 120 embedded in body 128 of adapter 114 are electrically coupled to one or more of electrical connectors 118 of plug 116 via electrical cables, wires, traces or other electrical conductors 126 (one shown for clarity). Portable electronic device 1 is received within cavity 108 of elastomer shell 102 with female input/output socket 27 engaged with male plug 116 of adapter 114 in skirt 106 adjacent to one side 102a of protective shell 102.

Positioning interface dam 132 is formed in outer surface 124 of unitary protective shell 102, and adapter contactor 120 is further recessed within locator dam 132 to form complementary male nesting appendage 159 for seating in female nest 157. Here, locator dam 132 includes magnets 178 disposed within magnet retention structure 180 for magnetic attraction of magnetically permeable members 188 in base receiver 9 of docking cradle tray 7.

Alternatively, magnets 178 are in base receiver 9 of docking cradle tray 7, and cooperating magnetically permeable members 188 are flanking electrical contacts 122 of contactor 120 in locator dam 132 exterior of protective shell 102.

Figure 36:
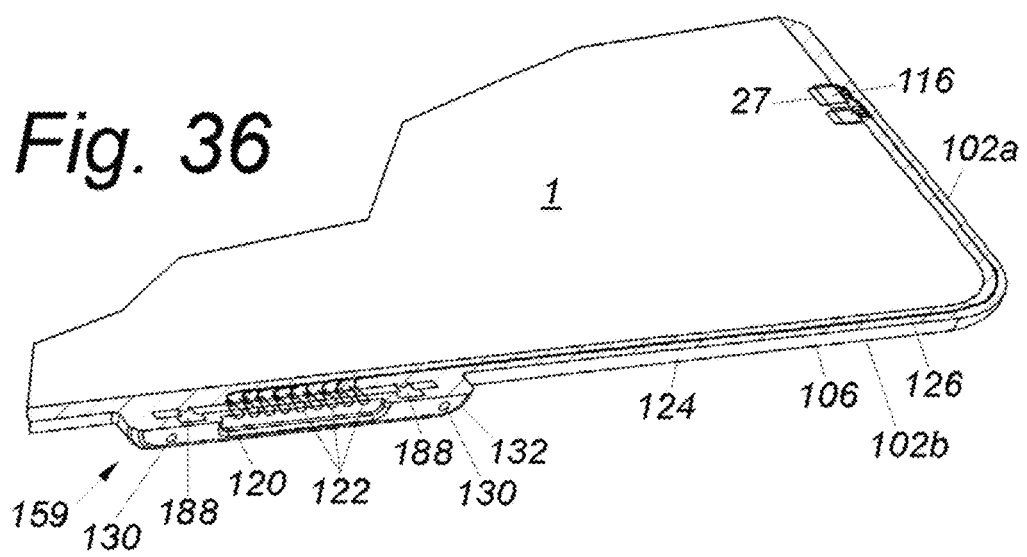
FIG. 36 is a cross-section taken through the protective cover of FIG. 1 as illustrated in FIG. 34, wherein the male plug and contactor of the electrical adapter are spaced apart in different areas of the side skirt of the protective shell, and wherein the magnetically permeable members are substituted for the magnets of the magnetic attraction couple.

FIG. 36 is a cross-section taken through protective cover 100 of FIG. 34, wherein male plug 116 and contactor 120 of electrical adapter 114 are spaced apart in different areas of side skirt 106 of protective shell 102. As illustrated here, electrical contacts 122 of contactor 120 embedded in body 128 of adapter 114 are electrically coupled to one or more of electrical connectors 118 of plug 116 via electrical cables, wires, traces or other electrical conductors 126 (one shown for clarity). Portable electronic device 1 is received within cavity 108 of elastomer shell 102 with female input/output socket 27 engaged with male plug 116 of adapter 114 in skirt 106 adjacent to one side 102a of protective shell 102.

Positioning interface dam 132 is formed in outer surface 124 of unitary protective shell 102, and adapter contactor 120 is further recessed within locator dam 132 to form complementary male nesting appendage 159 for seating in female nest 157. Here, locator dam 132 alternatively includes magnetically permeable ferromagnetic member 188, as disclosed herein. For example, ferromagnetic member 188 is embedded in locator dam 132 in side skirt 106 of protective shell 102 in a complementary position for attraction by magnets 178 in base receiver 9 of docking cradle tray 7, as disclosed herein.

Figure 37:
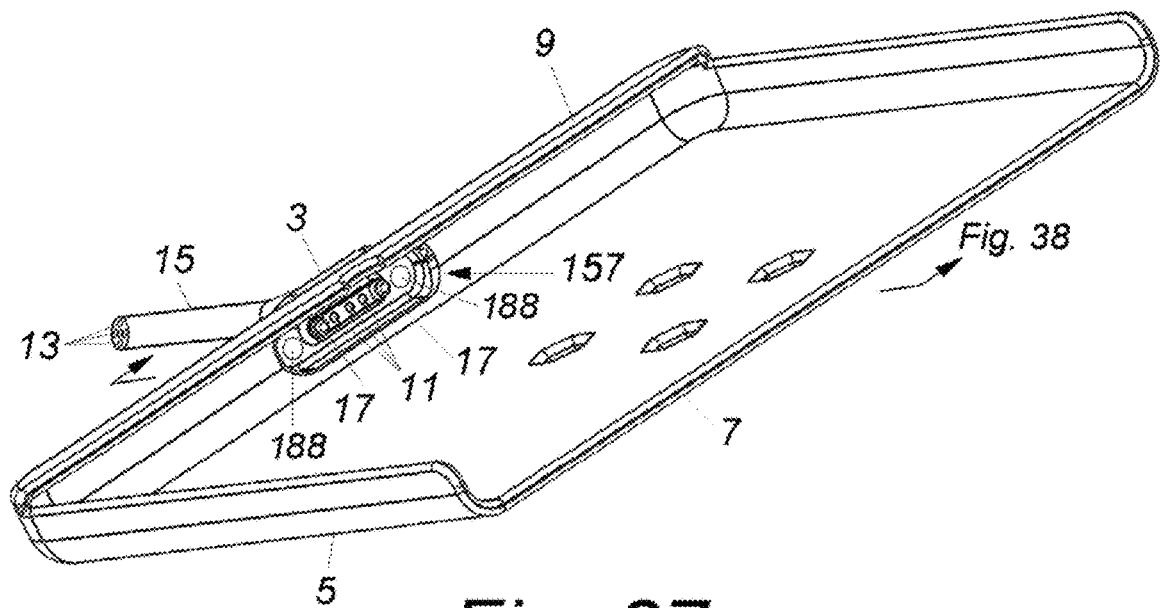
FIG. 37 illustrates the female nest feature of the base receiver in the docking cradle, which includes one or more ferromagnetic members, for example, exposed in flanking positions on either side of the biasing electrical contacts of the docking connector.

FIG. 37 illustrates female nest 157 of base receiver 9 in docking cradle 5, including one or more ferromagnetic members 188. For example, ferromagnetic members 188 are exposed in positions flanking biasing electrical contacts 11 of docking connector 3. Accordingly, when positioning interface dam 132 of protective cover 100 in side skirt 106 of shell 102 is optionally provided with magnets 178 mounted adjacent to either side of contactor 120, as illustrated for example in FIG. 33, ferromagnetic members 188 are positioned to cooperate with magnets 178 such that magnetic attraction of protective shell 102 to tray 7 operates to secure protective cover 100 in docking cradle 5 when male nesting appendage 159 is seated in complementary female nest 157, as disclosed herein. Docking connector 3 may also include optional guide pins 17, as disclosed herein, that are adapted for mating with optional mating guide pin receivers 130 if present in contactor 120 of electrical adapter 114.

Figure 38:
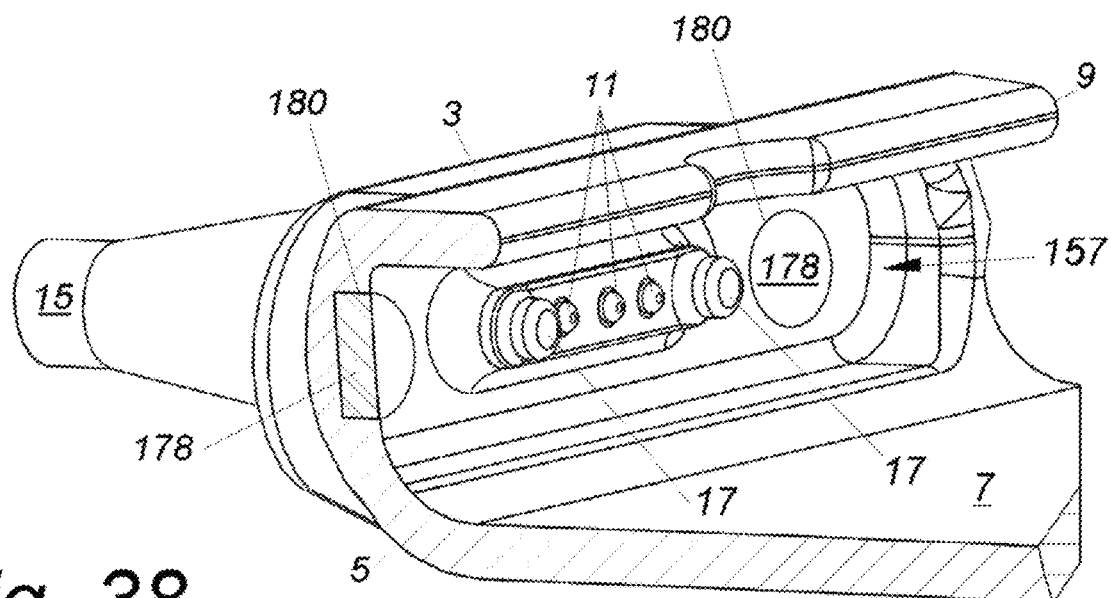
FIG. 38 is a cross-section view taken through FIG. 37, which illustrates the female nest features of the alternative base receiver, wherein one or more magnets are substituted for the ferromagnetic members in flanking positions on either side of the biasing electrical contacts of the docking connector, as shown in FIG. 37.

FIG. 38 illustrates female nest 157 of alternative base receiver 9, wherein one or more magnets 178 are substituted for ferromagnetic members 188 shown in FIG. 37. For example, magnets 178 are positioned flanking biasing electrical contacts 11 of docking connector 3. Accordingly, when positioning interface dam 132 of protective cover 100 in side skirt 106 of shell 102 is optionally provided with ferromagnetic members 188 mounted adjacent to either side of contactor 120, as illustrated for example in FIG. 34, magnets 178 are positioned to cooperate with ferromagnetic members 188 such that magnetic attraction of protective shell 102 to tray 7 operates to secure protective cover 100 in docking cradle 5 when male nesting appendage 159 is seated in complementary female nest 157, as disclosed herein. Docking connector 3 may also include optional guide pins 17, as disclosed herein, that are adapted for mating with optional mating guide pin receivers 130 if present in contactor 120 of electrical adapter 114.

Figure 39:
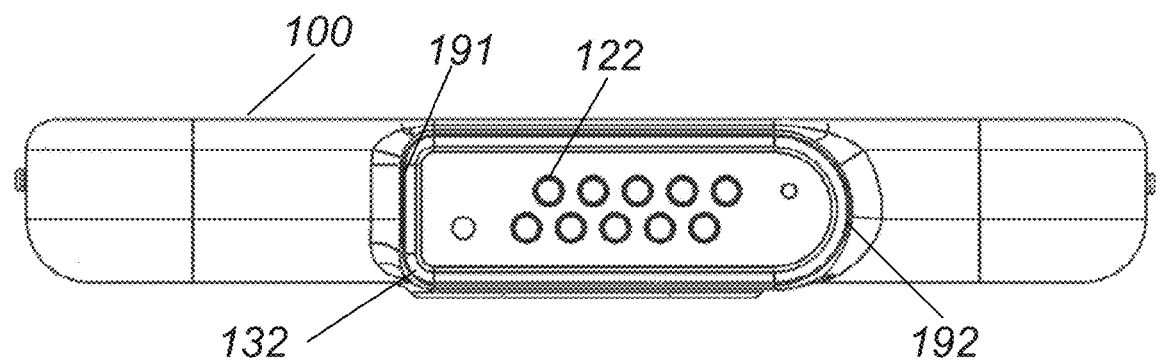
FIG. 39 is a side view illustrating one embodiment of a contact arrangement of the adapter of a cover.

FIG. 39 illustrates another arrangement of electrical contacts 122 for the cover 100. In this arrangement, there are ten electrical contacts 122 arranged in two rows. In the illustrated embodiment, the rows are staggered, but it will be recognized that the rows can be aligned with each other, instead of staggered. The docking cradle 5 can have the same number and arrangement of electrical contacts 11, although in some embodiments, the docking cradle may have fewer or more contacts than the cover 100.

In at least some embodiments, different covers 100 can be provided for different types of portable electronic devices 1, but the arrangement of electrical contacts 122 is the same so that a variety of different portable electronic devices 1 (including devices from different manufacturers) can be coupled to the same docking cradle 5 using an appropriate cover 100. It will be understood that the internal arrangement of electrical conductors 126 (which connect the electrical contacts 122 of the adapter 114 to the electrical connectors 118 of the male plug 116) of the different covers 100 may be different depending on the type of portable electronic device 1 that fits in the cover 100. Moreover, in at least some embodiments, one or more of the electrical contacts 122 may not be coupled to a corresponding electrical contact 118 of the adapter 114, particularly if there is not a corresponding contact in the portable electrical device 1 for which the cover 100 is designed.

Figure 41:
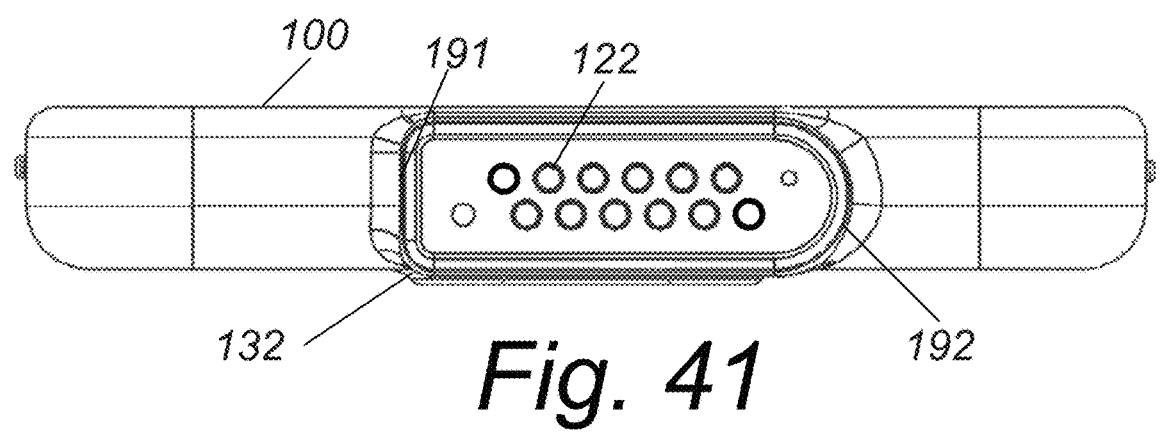
FIG. 41 is a side view illustrating another embodiment of a contact arrangement of the adapter of a cover.
Figure 42:
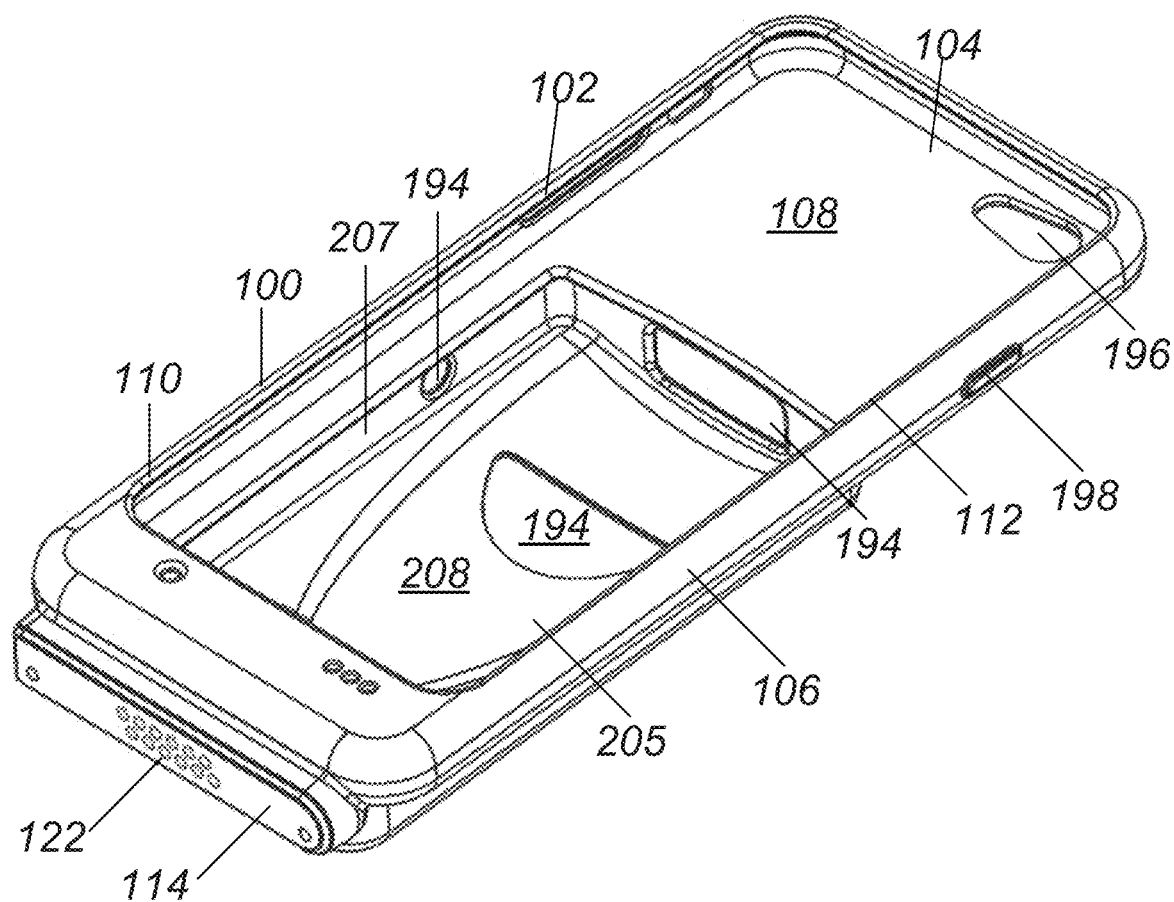
FIG. 42 is a perspective view of a cover that includes a peripheral cavity.

FIG. 41 illustrates an arrangement of twelve electrical contacts 122 in two staggered rows. It will be understood that the cover 100 can include any number of electrical contacts 122 including, but not limited to, two, three, four, five, six, seven, eight, nine, ten, twelve, fourteen, sixteen, eighteen, twenty, or more electrical contracts. The electrical contacts 122 can be arranged in any regular or irregular pattern. For example, three electrical contacts can be arranged in a straight line, an equilateral triangle, an isosceles triangle, a right triangle, or any other suitable arrangement. As another example, the electrical contacts 122 can be arranged in a single line or in two or more rows (e.g., two, three, four, or more rows) which may be aligned or staggered relative to each other and which may have the same or different numbers of contacts in each row. As yet another example, some or all of the electrical contacts 122 can be arranged at vertices of a regular or irregular polygon. For example, five electrical contacts 122 can be arranged at vertices of a pentagon, six electrical contacts 122 can be arranged at vertices of a hexagon, or eight electrical contacts can be arranged at vertices of an octagon.

FIGS. 39 and 41 also illustrate a dam 132 which has an asymmetric shape that can facilitate correctly coupling the cover 100 to the docking cradle 5. The dam 132 defines an asymmetric positioning interface. In this case, the dam 132 has a first edge 191 that is straight and a second edge 192, opposite the first edge, that is curved. The female nest 157 of the docking cradle 5 can be shaped similarly to the dam 132 so that the dam of the cover 100 only fits easily into the female nest of the docking cradle in one orientation. This asymmetric positioning interface of the cover facilitates correct coupling of the cover with the docking cradle 5 so that the electrical contacts 122 correctly and reliably mate with corresponding contacts on the docking cradle.

Figure 40:
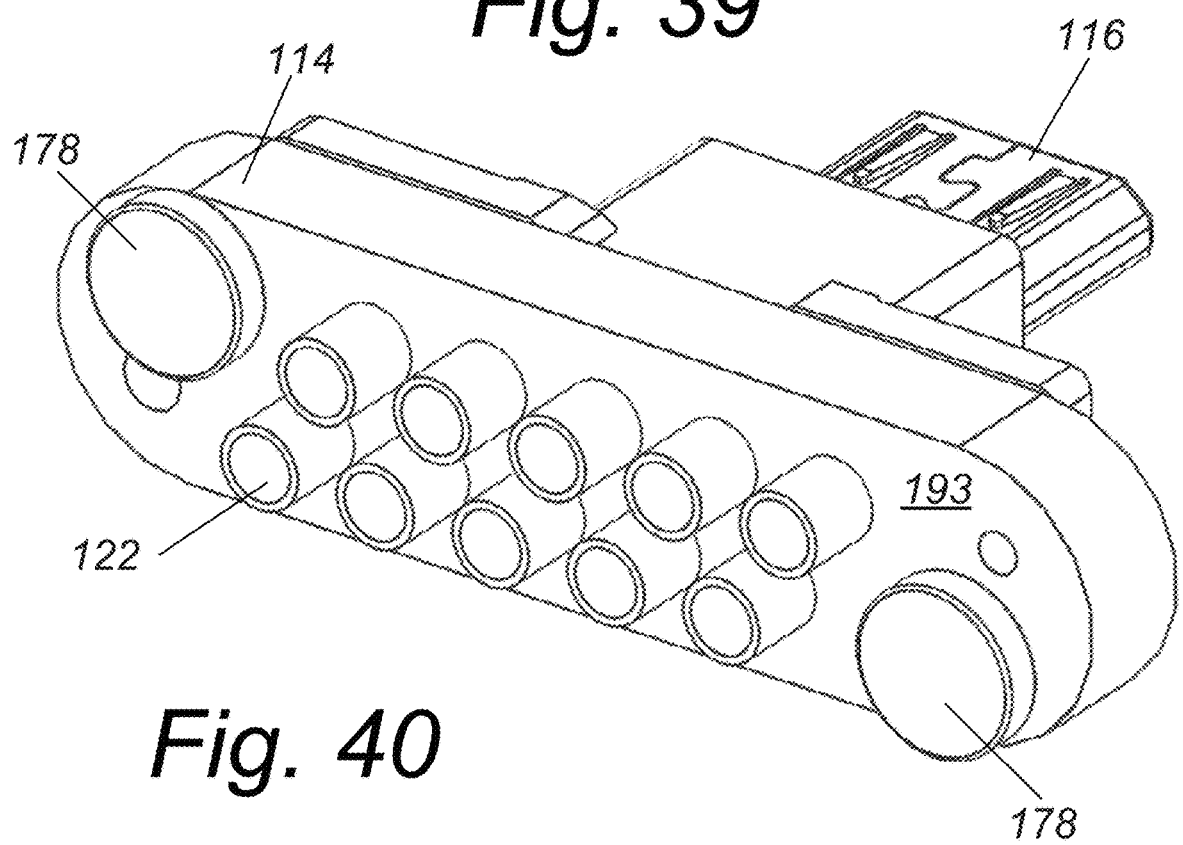
FIG. 40 is a perspective view of one embodiment of an adapter for use in a cover.

FIG. 40 illustrates a portion of the adapter 114 and includes the male plug 116, electrical contacts 122, magnets 178 (or ferromagnetic members 188), and body 128. The adapter 114 is positioned within the cover 100 with the side skirt 116 and dam 132 formed around portions of the adapter. In at least some embodiments, a portion of the shell 102 or dam 132 also covers a face 193 of the body 128 and the magnets 178 leaving a portion of the electrical contacts 122 exposed, as illustrated in FIGS. 39 and 41.

A cover for a portable electronic device can also include an additional pocket for a peripheral device. FIGS. 42-46 illustrate an embodiment of a cover 100 that can receive a portable electronic device 1 and a peripheral device 50. Examples of peripheral devices include, but are not limited to, a printer, a scanner, a card reader, a magnetic strip reader, a RFID reader, a NFC reader, a speaker, a battery, a camera, a light, a keyboard, a human interface device (e.g., a mouse, trackball, or the like), a medical device (e.g., a thermometer, glucose sensor, blood pressure monitor, imager, or any other suitable medical device), or any other suitable peripheral device. Other examples of peripheral devices can include illumination devices that can provide LED lights, black lights, infrared lights, lasers, or any other lighting devices, or any combination thereof, and can be used to provide general illumination, night vision, video or photography illumination or enhancement, signaling, pointing, measuring, scanning, alignment, or any other feature or use or any combination thereof. Such illumination devices may be designed to be used with any device within the cover such as, for example, a cell phone or smart phone, a terminal, a computer, a testing device, a tablet, or the like, or any combination thereof. Other examples of peripheral devices can be tool devices such as, for example, sensors (for detecting, for example, temperature, pressure, leveling, angles, altitude, light, density, x-rays, magnetic fields, acceleration, speed, velocity, distance, energy, current or energy flow, force, durometer, mass/weight, torque, resistance, capacitance, voltage, reactance, or the like or any combination thereof) or a fingerprint reader.

The cover 100 may be designed for a specific type of peripheral device or may accommodate multiple types of peripheral devices. In addition, although the illustrated embodiment permits inclusion of a single peripheral device in the cover, it will be understood that other embodiments can permit inclusion of multiple (e.g., two, three, four, or more) peripheral devices in one or more peripheral pockets in the cover.

Figure 44:
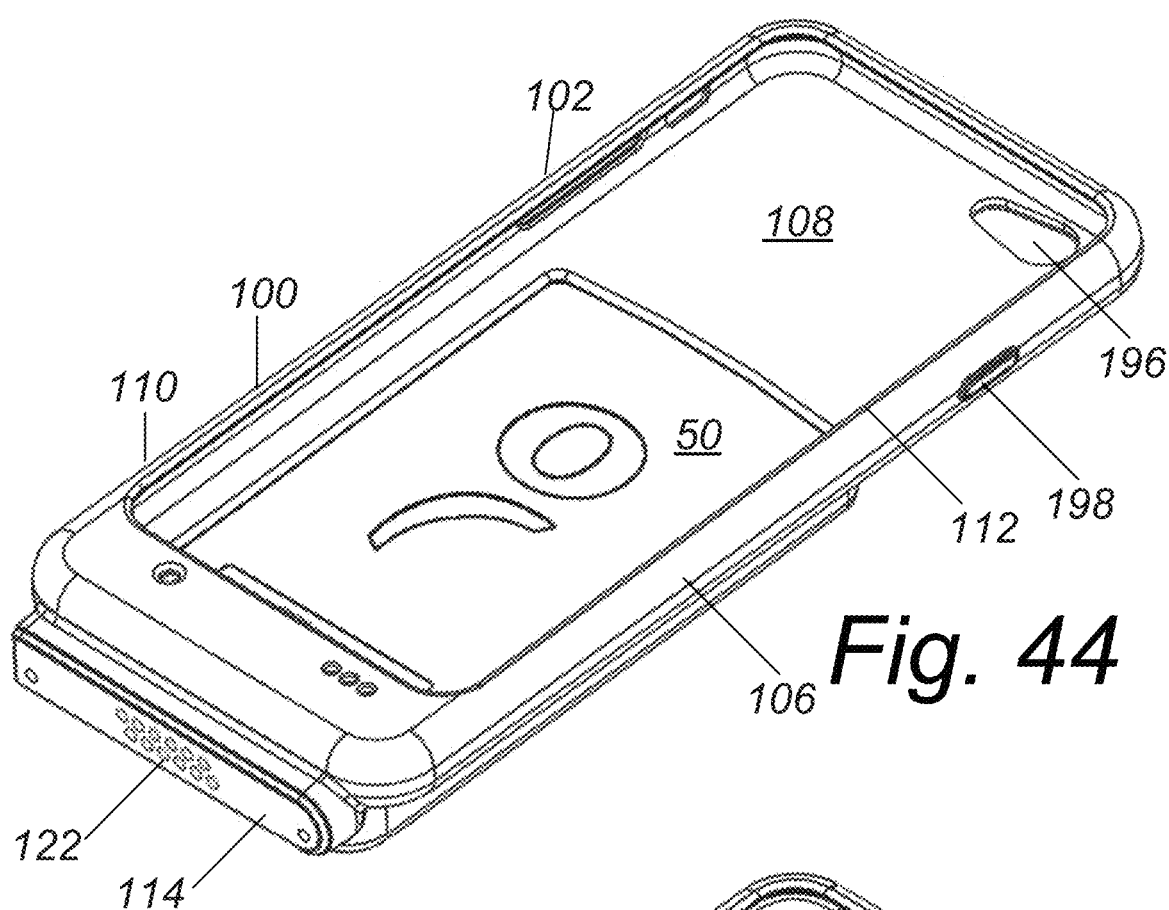
FIG. 44 is a perspective view of the cover of FIG. 42 with a peripheral device disposed in the peripheral cavity.
Figure 45:
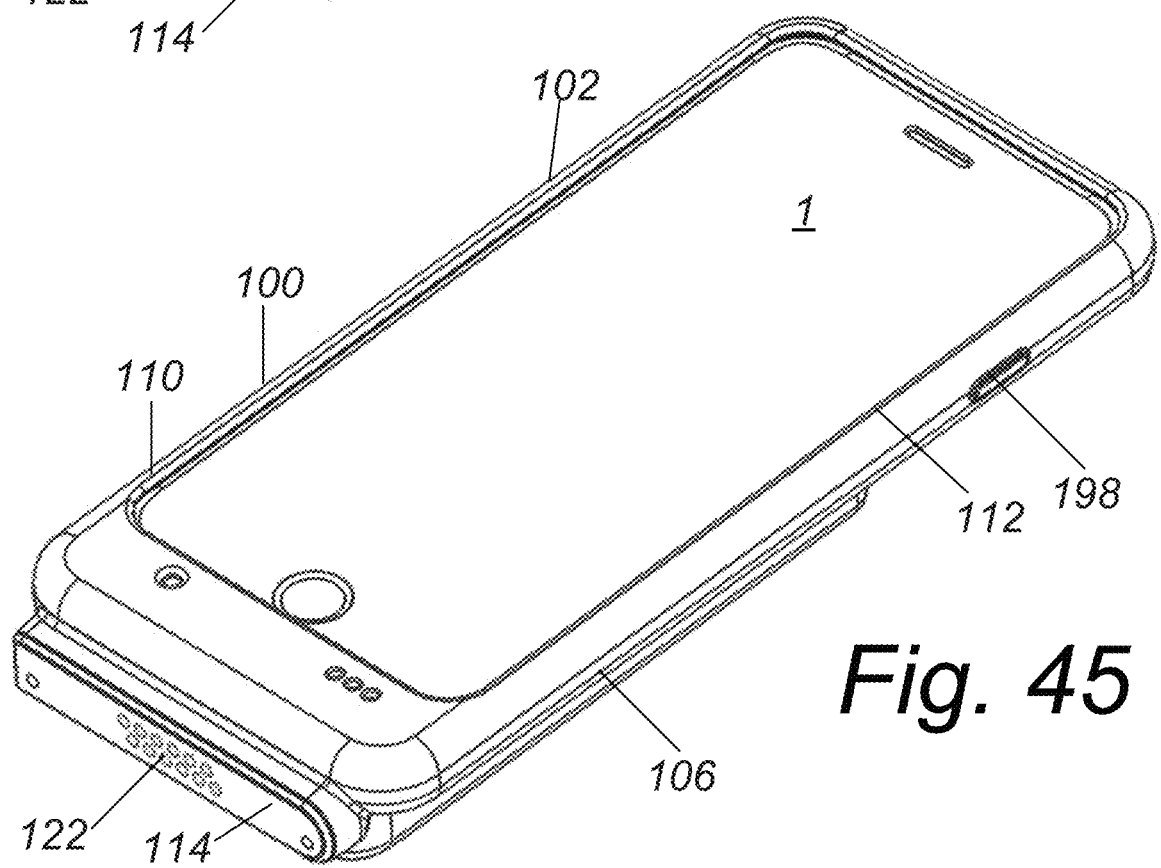
FIG. 45 is a perspective view of the cover of FIG. 42 with a portable electronic device disposed in the interior cavity.
Figure 46:
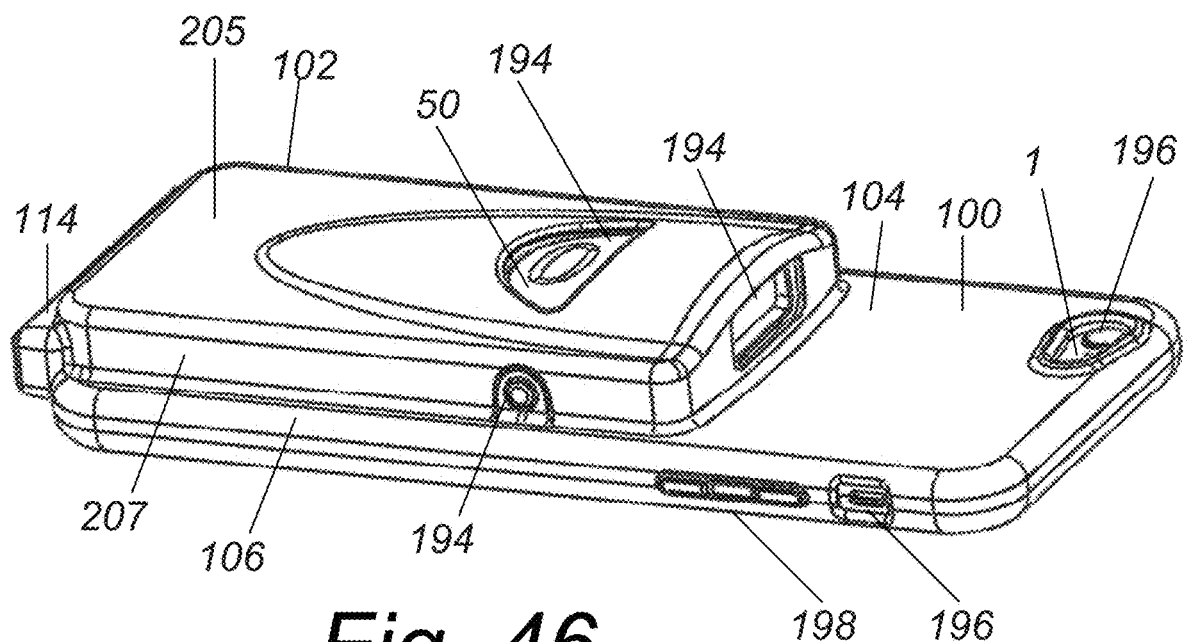
FIG. 46 is a perspective view showing the back side of the cover of FIG. 42 with a peripheral device in the peripheral cavity and a portable electronic device in the interior cavity of the cover.

The cover 100 includes a shell 102 with a center panel 104, a side skirt 106, a lip 110, a mouth opening 112, and an interior cavity 108 to receive the portable electronic device 1. In addition, the cover 100 includes a peripheral cavity 208 that forms a peripheral pocket for receiving the peripheral device 50. The peripheral cavity 208 can be formed using the center panel 104 and optionally part of the side skirt 106 or any other portion of the cover 100. The peripheral cavity 208 defines a device surface 205 and one or more side surfaces 207. In the illustrated embodiment, the peripheral cavity 208 and interior cavity 108 are contiguous and the peripheral device 50 can be inserted into the peripheral cavity 208 through the mouth opening 112 and interior cavity 108, as illustrated in FIG. 44. The portable electronic device 1 can then be inserted into the interior cavity 110 through the mouth opening, as illustrated in FIG. 45. In other embodiments, the cover 100 may include a peripheral opening (not shown) through which the peripheral may be inserted into the peripheral cavity 208. In such embodiments, the peripheral cavity 208 may be contiguous with the interior cavity 108 or the peripheral cavity and interior cavity can separated by a wall of the cover 100.

Figure 43:
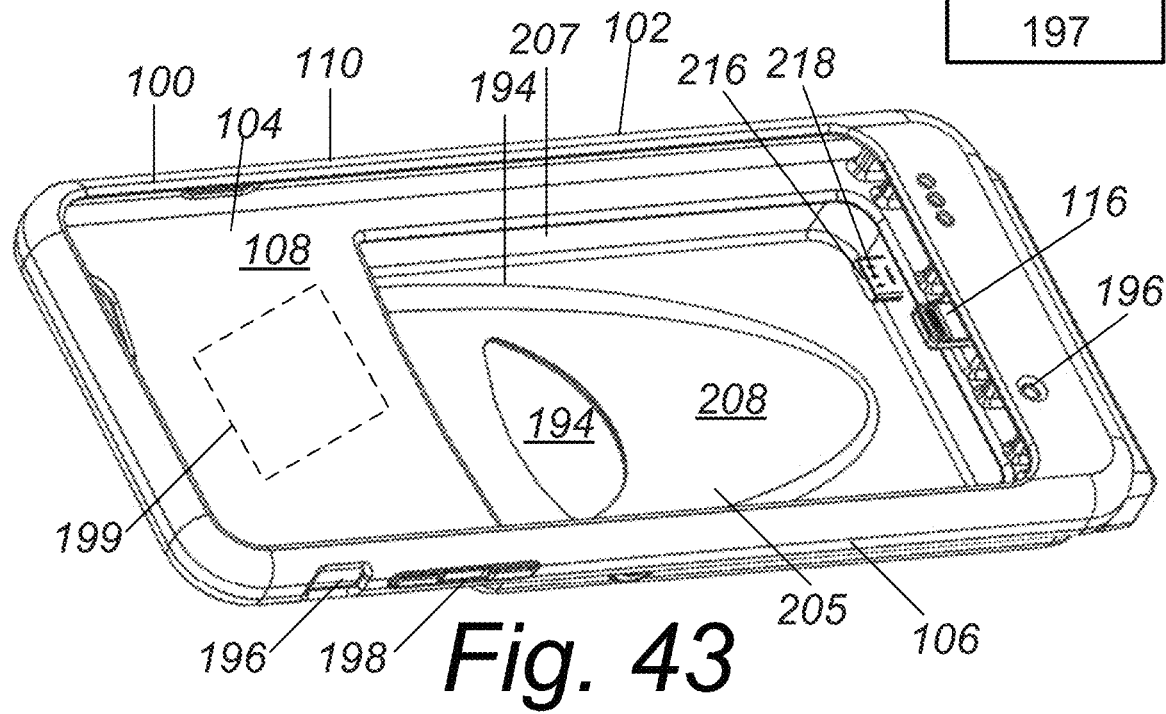
FIG. 43 is a perspective view of the cover of FIG. 42 from a different angle.

In addition to the male plug 116, the cover 100 includes a peripheral plug 216, as illustrated in FIG. 43. The peripheral plug 216 fits into the input/output socket of the peripheral device 50. The peripheral plug 216 may be designed for a particular peripheral device or may be suitable for multiple different devices. For example, the peripheral plug 216 (or the male plug 116 or both) can be a USB or microUSB plug designed to fit into a USB or microUSB port, respectively, in the peripheral device 50.

The peripheral plug 216 includes one or more electrical connectors 218 that connect to contacts within the peripheral device 50. The one or more electrical connectors 218 are coupled to the electrical contacts 122 of the adapter 114 of the cover 100 using conductors (not shown) that extend through the cover. This arrangement can be used to provide power to the peripheral device 50 via the adapter 114 and one or more electrical connectors 218. In at least some embodiments, the adapter 114 and associated conductors can be arranged so that the peripheral device 50 provides power, data, or both to the portable electronic device 1 through the adapter. For example, the adapter 114 may couple an electrical connector 218 of the peripheral plug 216 and an electrical connector 118 of the male plug 116 to the same electrical contact 122 of the adapter so that the peripheral device 50 can provide power or data to the portable electronic device 1 through the adapter. It will be understood that there are other mechanisms for sharing data between the peripheral device 50 and the portable electronic device 1 such as Bluetooth, NFC, and the like.

The cover 100 can include one or more openings 194 through the cover into the peripheral cavity 218. These openings 194 can allow access to components of the peripheral device 50 such as, for example, a jack, a scanner, a printer, a sensor, or the like. Similarly, the cover 100 can include one or more openings 196 into the interior cavity 118 to allow access to components of the portable electronic device. For example, the openings 196 can allow access to a camera, a headphone jack, a switch, a speaker, a microphone, or the like of the portable electronic device 1. In at least some embodiments, the placement, number, and size of the openings 196 of the cover are specifically arranged based on the type of portable electronic device for which the cover 100 is designed. In some embodiments, the cover 100 can include soft buttons 198 formed in the cover (for example, in the side skirt 106) at positions that can coincide with buttons on the portable electronic device 1. The soft buttons 196 can be, for example, part of the material of the cover with a surrounding indentation to identify placement of the soft button and facilitate actuation of the soft button. The soft buttons 196 are configured and arranged so that actuation of the soft button also actuates the underlying button of the portable electronic device 1. Such soft buttons 196 may coincide with power, volume, and other buttons on the portable electronic device 1. Any of the covers described herein can include one or more openings 196, one or more soft buttons 198, or any combination thereof.

Any of the covers 100 described herein can also include a tag element 199 disposed within or on the cover, as illustrated in FIG. 43. The tag element 199 can be, for example, a RFID tag or a NFC tag that can be used to identify the cover or device disposed within the cover. The tag element 199 can be molded into the cover 100 or may be disposed on an interior or exterior surface of the cover. In at least some embodiments, the tag element 199 can be associated with a fob 197 or other tag query device that a user can carry and which can be used to wirelessly query the tag element 199 to determine if the cover 100 is within a range of the fob or other tag query device. The fob 197 can be activated by the user to assist in finding the cover or associated portable electronic device. Alternatively or additionally, the fob 197 may include an audible alarm, vibratory alarm, or both that can be automatically activated when the fob exceeds a threshold distance from the cover 100 to warn the user that the cover 100 and associated portable electronic device are left behind (for example, left on the docking cradle). In some embodiments, the user may select whether the fob 197 provides an audible alarm, a vibratory alarm, or both. In some embodiments, the user may program the threshold distance.

Figure 47:
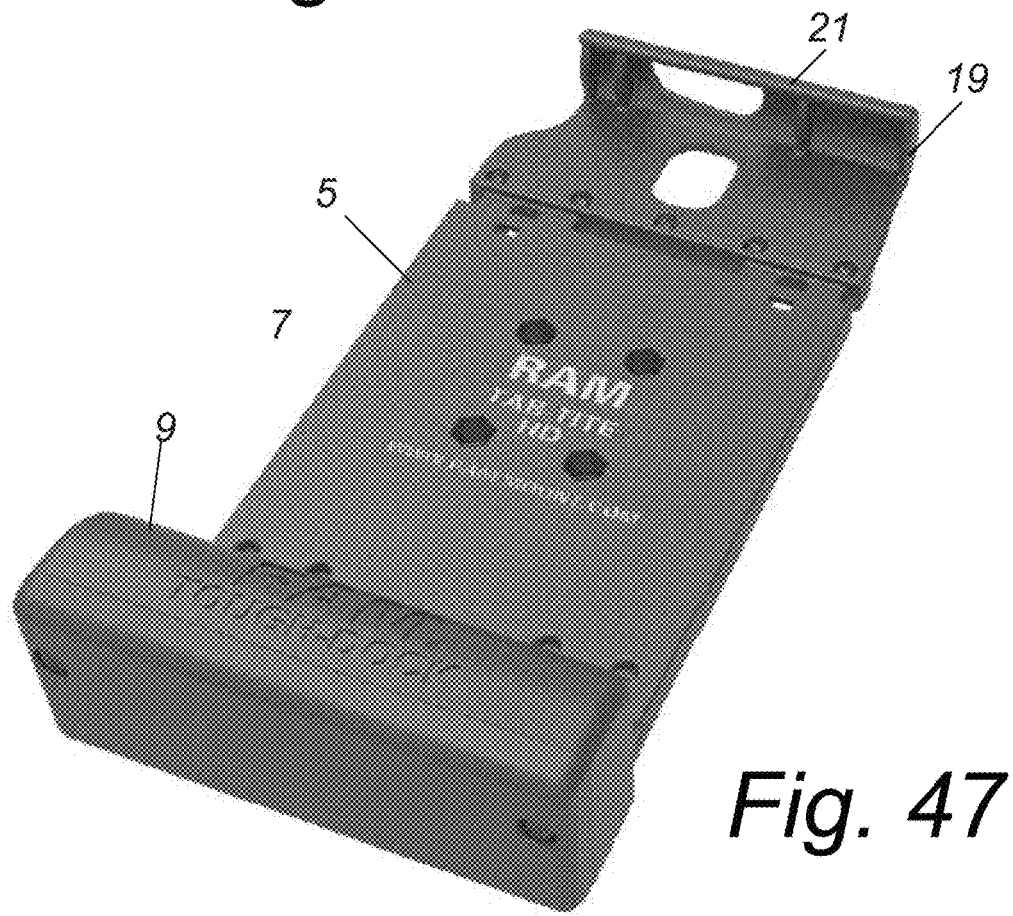
FIG. 47 is a perspective view of another docking cradle.
Figure 48:
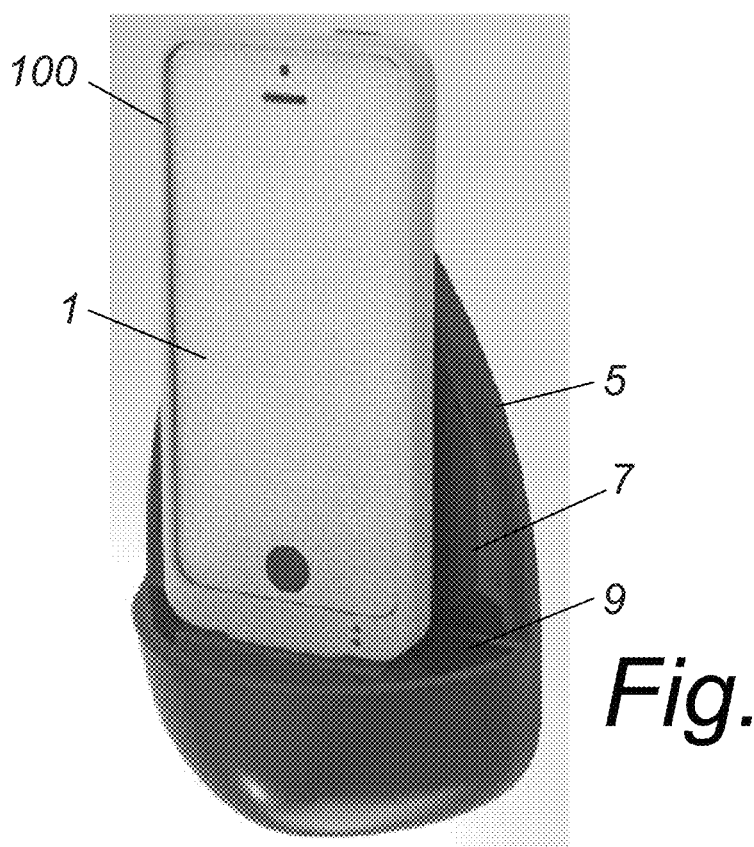
FIG. 48 is a perspective view of a stand-alone docking cradle with a portable electronic device, such as a mobile phone, in a cover and disposed on the cradle.
Figure 49:
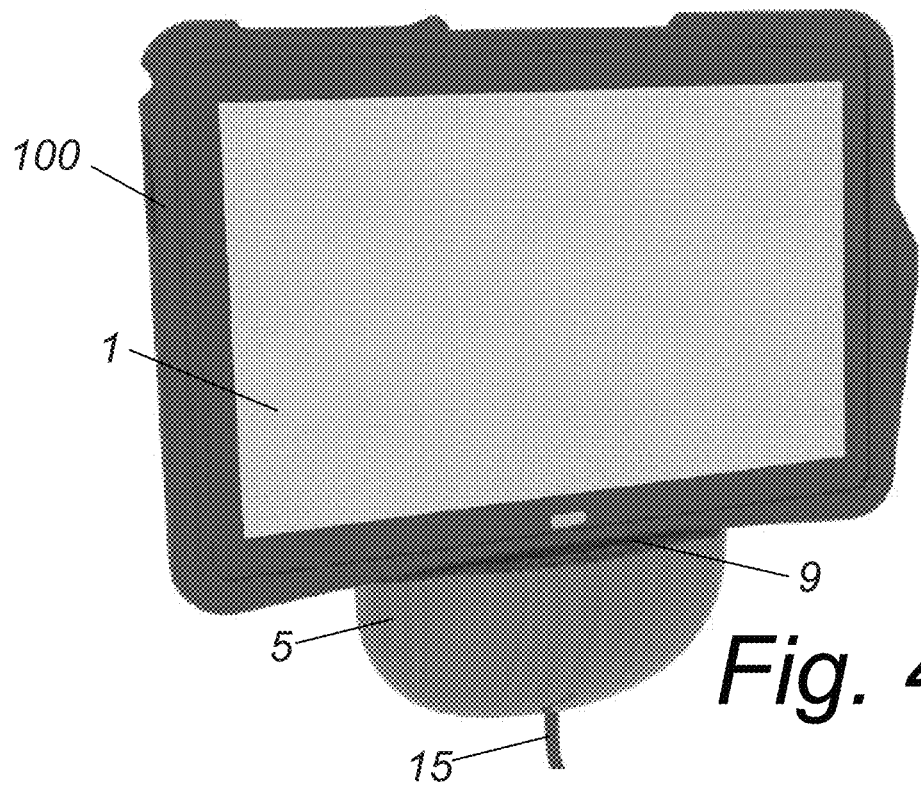
FIG. 49 is a perspective view of a wall mounted docking cradle with a portable electronic device, such as a tablet, in a cover and disposed on the cradle.

FIGS. 47-49 illustrate additional embodiments of the docking cradle 5. These docking cradles 5 include a tray 7 (not shown in FIG. 49) and a base receiver 9 upon which a portable electronic device 1 within a cover 100 can be placed. The docking cradle 5 of FIG. 47 includes a clamp 19 and an arm 21. The docking cradle 5 of FIG. 48 is a stand-alone cradle that can be placed on any stable surface, such as a desk, shelf, credenza, table, or the like. The docking cradle 5 of FIG. 49 can be mounted on a wall or other surface. FIG. 48 illustrates a mobile phone or other relatively small device as the portable electronic device 1. FIG. 49 illustrates a tablet or other relatively large device as the portable electronic device 1. Many docking cradles can accommodate both large and small portable electronic devices, but other docking cradles may be specifically designed for a portable electronic device of a particular size or range of sizes.

FIG. 48 illustrates a cable 15 exiting the docking cradle 5. It will be understood that the other illustrated docking cradles can include a cable. The cable may be detachable from the docking cradle or can be more permanently attached to the docking cradle. In some embodiments that incorporate a detachable cable, the docking cradle includes a port, such as a USB or microUSB port, that can receive an end of the cable.

In some embodiments, the docking cradle can include electronic components for providing power, data, or other signals to the portable electronic device from the cradle. In other embodiments, the docking cradle is a "pass-through" device where the docking cradle is simply an intermediary between the portable electronic device and another device, such as a charger, computer, other portable electronic device, or the like. In these embodiments, the cable exiting the docking cradle can be coupled to this other device and, at least in some instances, the docking cradle merely transmits signals between the electronic contacts of the docking cradle and the cable.

Figure 50A:
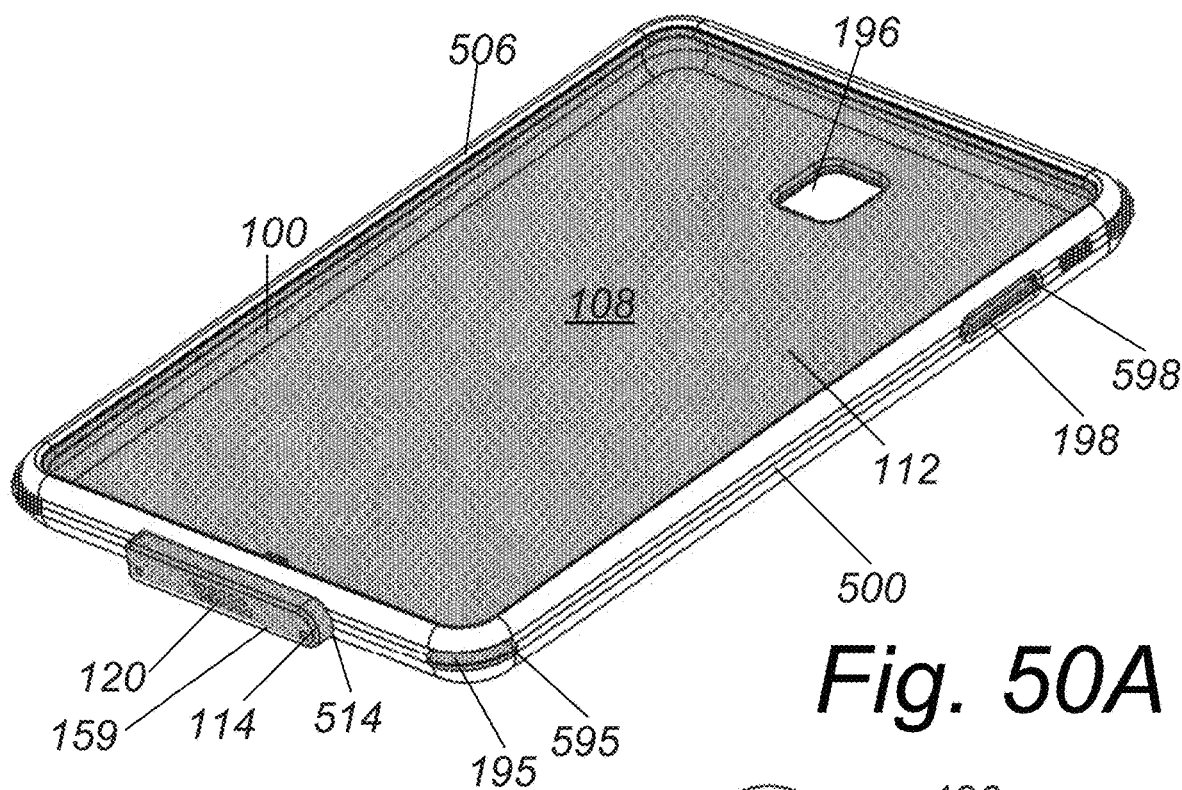
FIG. 50A is a perspective front view of a protective arrangement with a flexible cover and a hard shell.
Figure 50B:
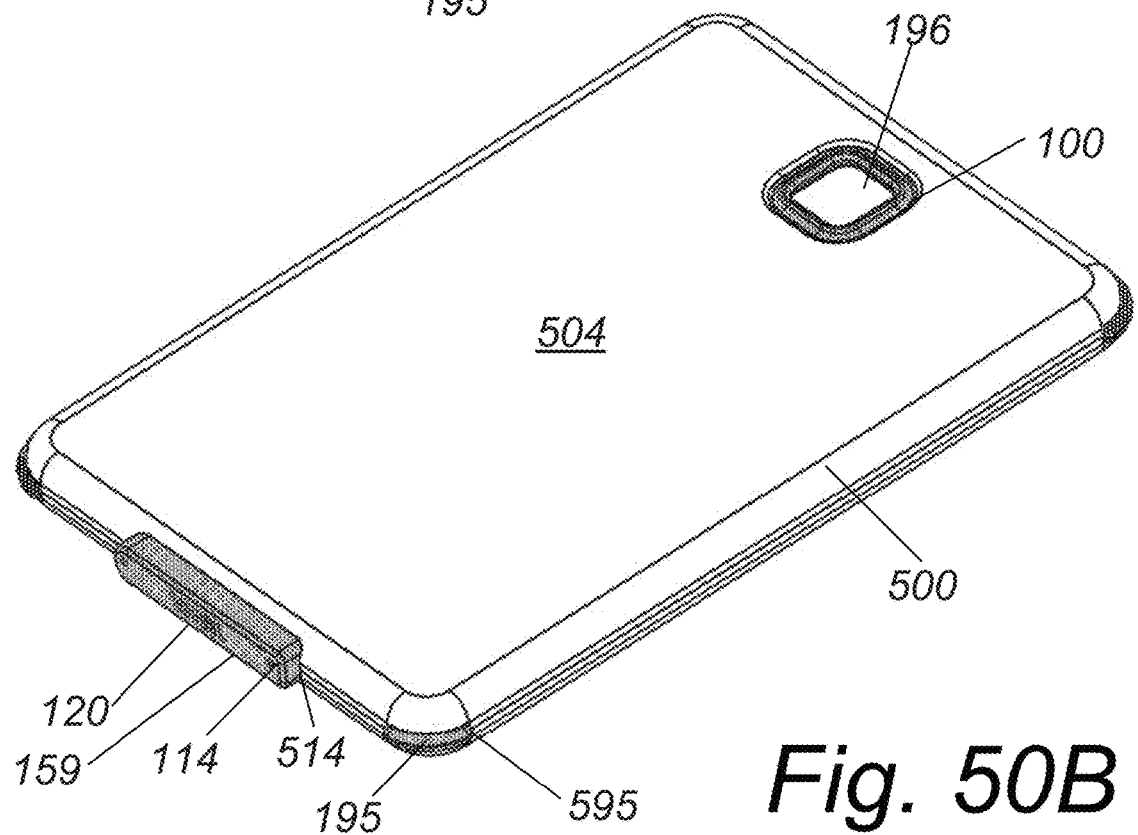
FIG. 50B is a perspective back view of the protective arrangement of FIG. 50A.

In some embodiments, a hard (or rigid) shell can be utilized with the flexible cover or skin to provide additional protection to electronic device disposed within the skin. FIGS. 50A and 50B are front and back views of a flexible cover, or skin, 100 (shaded for illustration purposes) and a hard (or rigid) shell 500. The electronic device will be disposed within the flexible cover, or skin, 100 as described above. Any of the flexible covers described above can be used for the flexible cover, or skin, 100 with the hard shell 500 modified to fit the specific cover.

The hard shell 500 can be made of any hard or rigid plastic material, such as, for example, polycarbonate, or the like; carbon fiber; metal; leather; or the like; or any combination thereof. In at least some embodiments, the hard shell 500 includes a back panel 504 (FIG. 50B) and a skirt 506 (FIG. 50A) which, with the cover 100, forms a mouth opening 112 that communicates with a cavity 108. Mouth opening 112 is sized to receive electronic device into cavity 108. In some embodiments, the back panel 504 may not cover the entire back portion of the cover 100. In some embodiments, the skirt 506 may not completely surround the mouth opening 112, but may only extend around a portion (for example, no more than 90%, 75%, 50%, 40%, or less) of the mouth opening.

In the illustrated embodiment, the hard shell 500 includes openings through which portions of the flexible cover, or skin, 100 are accessible or protrude. For example, the hard shell 500 includes an opening 514 through which a portion of the adapter 114 (such as the nesting feature 159 or the contactor 120) of the cover 100 protrudes or is accessible for connection to a docking cradle or other device. In at least some embodiments, the hard shell 500 includes one or more button openings 598 to allow access to soft buttons 198 of the cover 100 (or buttons of the electronic device) or from which the soft buttons 198 of the cover 100 (or buttons of the electronic device) can protrude. In at least some embodiments, the hard shell 500 can include one or more corner openings 595 which allow corner portions 195 of the cover 100 to protrude to enhance corner protection using the flexibility of the cover 100. Both the hard shell 500 and cover 100 can include openings 196 to allow access to a camera, a headphone jack, a switch, a speaker, a microphone, or the like of the electronic device.

The combination of the hard shell 500 and the flexible cover 100 can align and support the electronic device. In addition, the protruding portions of the flexible cover 100, such as the protruding corner portions 195, can act as soft bumpers to protect the electronic device.

In alternative embodiments, the electronic device can be inserted into a hard shell and then the device and hard shell can be inserted into any one of the protective covers 100 described above. In yet other embodiments, a hard shell can be provided as a removable (or permanent) liner for any of the protective covers 100 described above. The hard shells of these embodiments will include an opening through which the male plug 116 of the adapter 114 can protrude to allow connection to the input/output socket of the electronic device by the male plug 116 of the adapter 114.

Figure 51A:
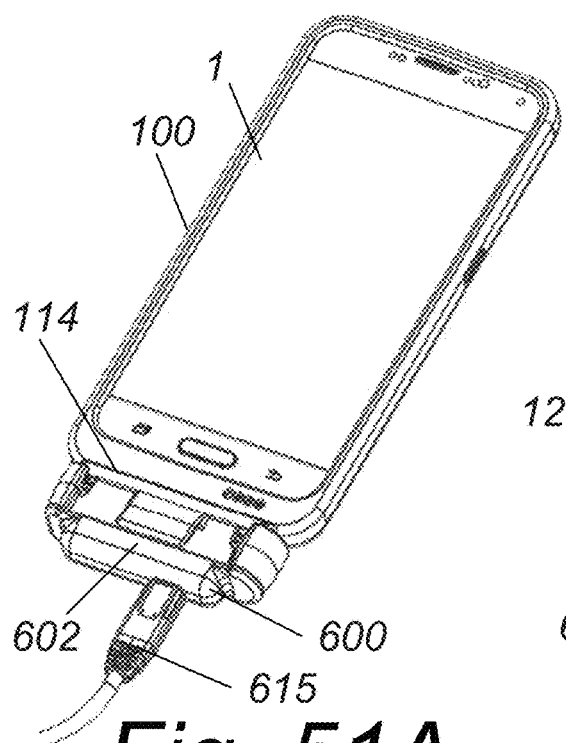
FIG. 51A is a perspective front view of one embodiment of a portable electronic device, a cover, and an external adapter.
Figure 51B:
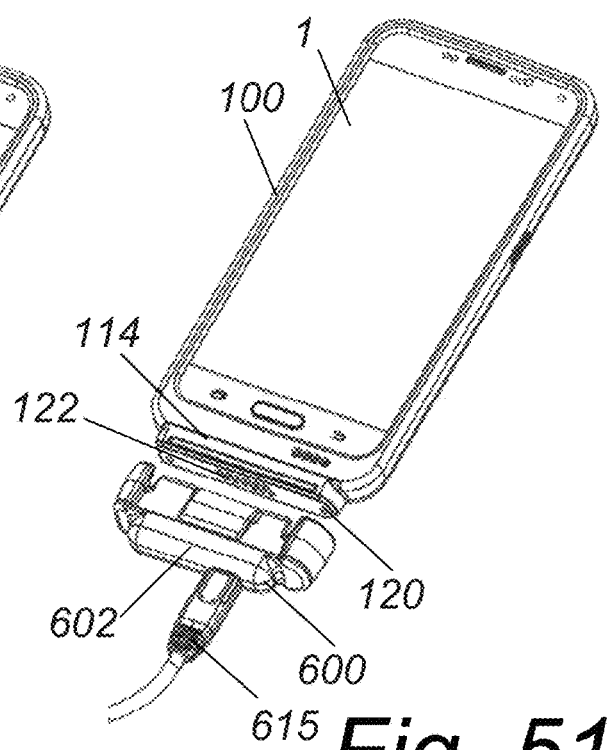
FIG. 51B is a perspective view of the portable electronic device, cover, and external adapter with the external adapter uncoupled from the cover.
Figure 51C:
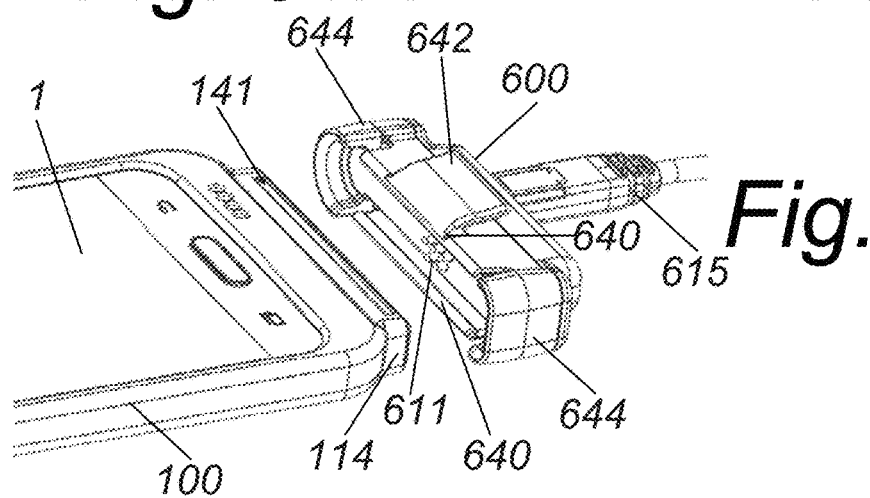
FIG. 51C is a close-up perspective view of a portion of the electronic device, cover, and external adapter of FIGS. 51A and 51B.
Figure 51D:
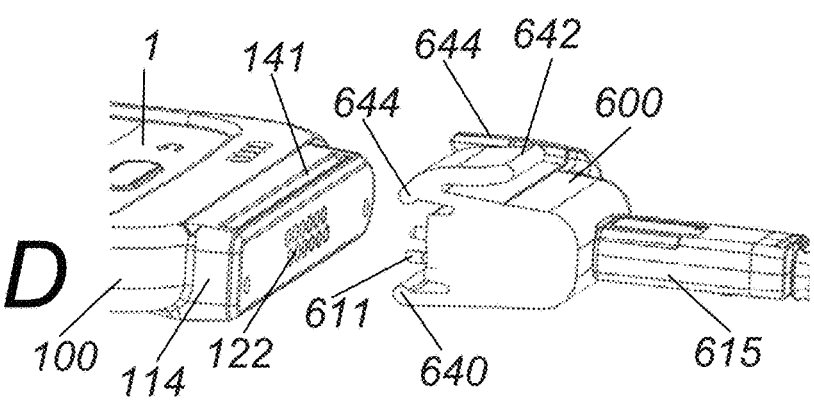
FIG. 51D is a close-up perspective view of a portion of the electronic device, cover, and external adapter of FIGS. 51A and 51B with a portion of the external adapter cut away.

Instead of a docking cradle, the portable electronic device and the cover can be coupled to an external adapter. FIGS. 51A-51D illustrate a portable electronic device 1 disposed in a cover 100 (which can be any of the covers described herein) and an external adapter 600 with a wire or cable 615 extending from the external adapter. In FIG. 51A, the external adapter 600 is coupled to the adapter 114 of the cover 100. In FIGS. 51B-51D, the external adapter 600 is uncoupled from the adapter 114 of the cover 100. In at least some embodiments, the external adapter 600 only couples to the adapter 114 of the cover 100 and may only contact the cover 100 at the adapter 114 and, optionally, portions of the cover immediately adjacent to the adapter. The external adapter 600 may not have a tray.

The external adapter 600 has a housing 602 with a plurality of electrical contacts 611 (FIGS. 51C and 51D) for mating with the contacts 122 of the contactor 120 of the adapter 114 of the cover 100. The electrical contacts 611 are electrically coupled to the electrical wire or cable 615. In some embodiments, the electrical wire or cable 615 is detachable from the external adapter 600. In some embodiments, the cable 615 is any cable that may be used with the portable electronic device and includes a plug which fits into a corresponding receptacle on the external adapter 600.

In at least some embodiments, the adapter 114 and the external adapter 600 include the components of the magnetic attraction couple described above with respect to the docking cradle 5. Alternatively or additionally, the external adapter 600 and adapter 114 can include other coupling elements to reliably attach the external adapter 600 to the cover 100. It will be understood that the docking cradles described above can also include any of these coupling elements.

In at least some embodiments, the external adapter 600 includes, as a coupling element, at least one ridged element 640 that can engage a detent 141 in the adapter 114. In the illustrated embodiment of FIGS. 51A-51D, the external adapter 600 includes two ridged elements 640 opposite each other and the adapter 114 includes two detents 141 (one of which is not shown) on opposite surfaces of the adapter 114. In at least some embodiments, the ridged elements 640 are, prior to engagement of the adapter 114, spaced apart by less than the corresponding width of the adapter 114 so that, when engaged in the detents 141, the two ridged elements (and the external adapter 600) form a compression fit with the adapter 114 that resists decoupling of the ridged elements 640 from the detents 141.

In at least some embodiments, the external adapter 600 further includes a tab 642 extending from one of the ridged elements 640 (or two tabs with each tab extending from a different one of the ridged elements) in a cantilever or other arrangement so that a user can push on the tab to cause the ridged element to disengage from the detent 14 so that the external adapter 600 can be decoupled from the adapter 114 of the cover 100. Other disengagement methods or mechanisms can also be used. It will be understood that in other embodiments, the cover may include at least one ridge element (and optional tab) and the external adapter may include at least one detent.

In at least some embodiments, the external adapter 600 can include one or more gripping members 644, as a coupling element, that extend away from the remainder of the external adapter 600 and are arranged so that they form a compression or friction grip on the adapter 114 when the external adapter 600 engages the adapter 114. This compression or friction grip resists decoupling of the external adapter 600 from the adapter 114, but can be overcome by exertion of a decoupling force as the user pulls the external adapter 600 and adapter 114 apart. The illustrated embodiment of FIGS. 51A-51D includes two opposing gripping members 644, but it will be recognized that other embodiments can utilize more than two gripping members arranged around the external adapter 600 or a single gripping member that is formed around the entire (or a part of) the circumference of the external adapter 600. In at least some embodiments, the gripping member(s) 644 can be shaped to fit the shape of the corresponding parts of the adapter 114. For example, the adapter of FIG. 41 has a first edge 191 that is straight and a second edge 192, opposite the first edge, that is curved and so gripping members 644 can be shaped with one having a shape to fit the straight first edge 191 and the other having a shape to fit the curved second edge 192. It will be recognized that an external adapter (or docking cradle) can include one or both of the ridged elements 640 and gripping members 644.

Figure 52A:
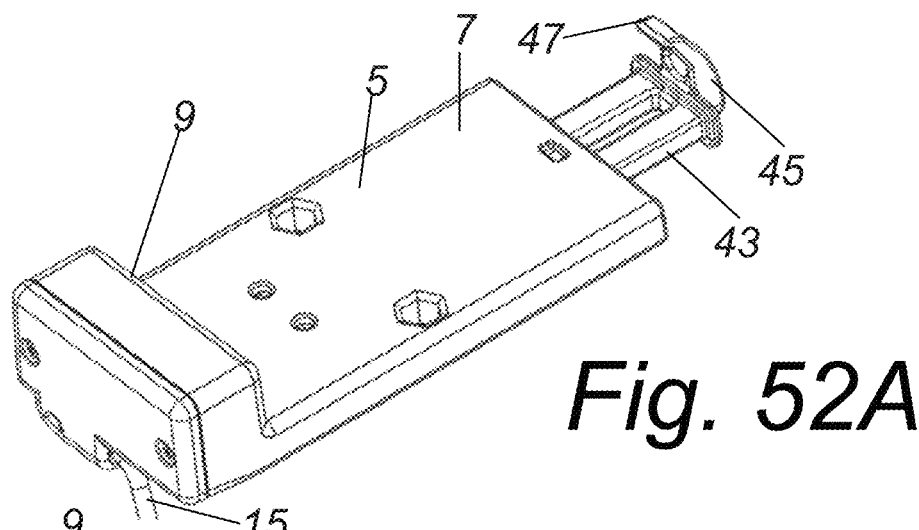
FIG. 52A is a perspective front view of one embodiment of a docking cradle with a movable arm in an extended position.
Figure 52B:
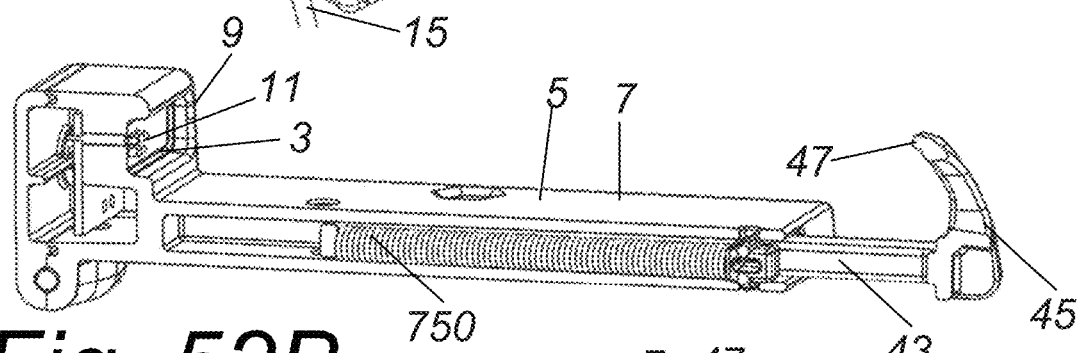
FIG. 52B is a cut-away side view of the docking cradle of FIG. 52A.
Figure 52C:
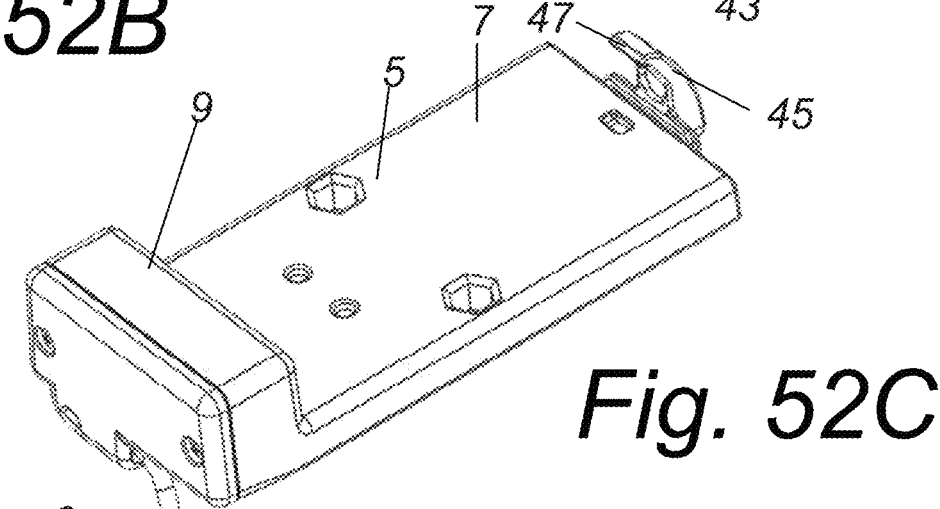
FIG. 52C is a perspective front view of the docking cradle of FIG. 52A with the moveable arm in the close position.
Figure 52D:
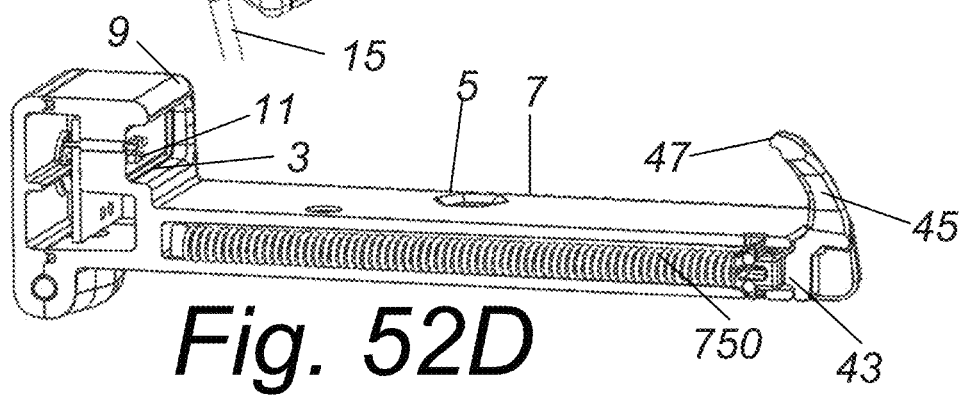
FIG. 52D is a cut-away side view of the docking cradle of FIG. 52C.
Figure 52E:
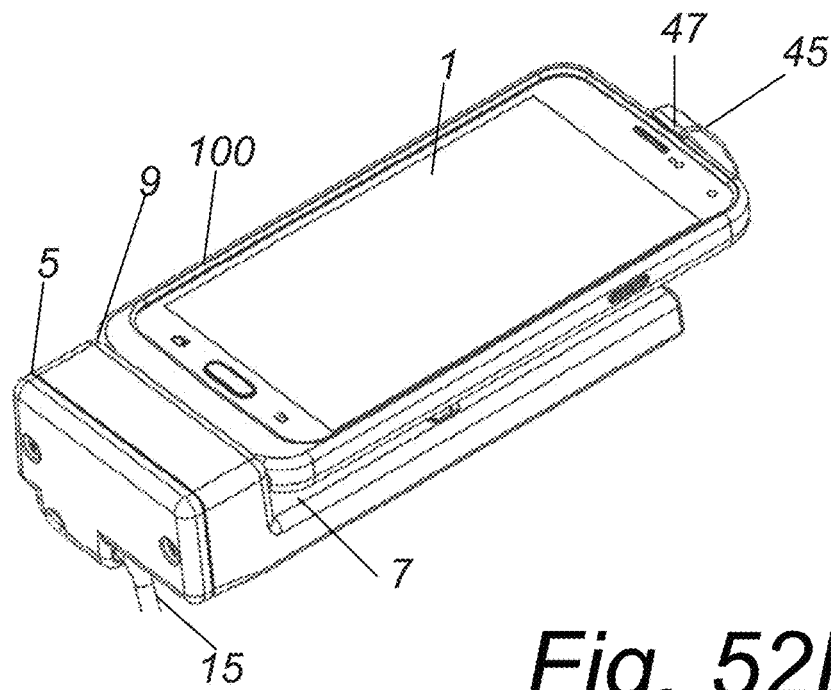
FIG. 52E is a perspective front view of the docking cradle of FIG. 52A with a portable electronic device and a cover received by the docking cradle.
Figure 52F:
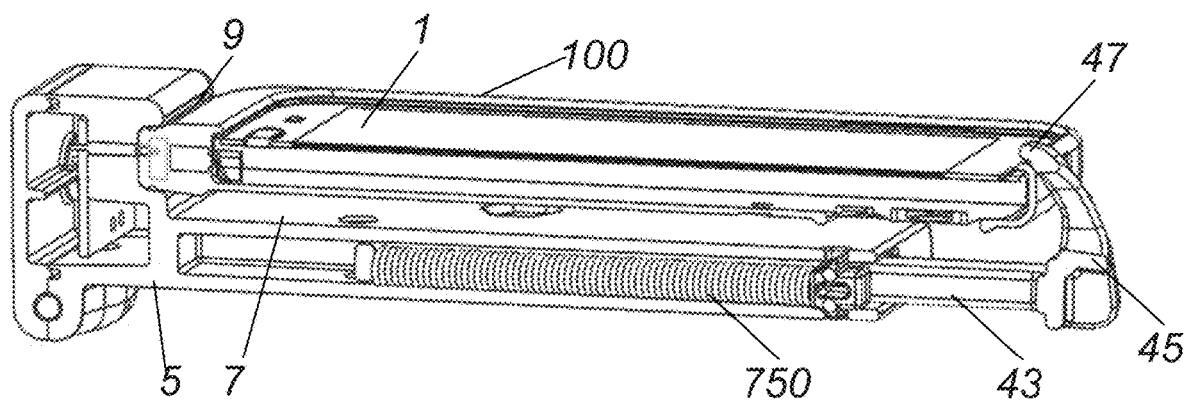
FIG. 52F is a cut-away side view of the docking cradle of FIG. 52E.

FIGS. 52A-F illustrate one embodiment of a docking cradle 5 with a movable arm 43 to receive a portable electronic device 1 in a cover 100 (FIGS. 52E and 52F). In addition to the movable arm 43, the docking cradle 5 includes a docking connector 3 with electrical contacts 11, a tray 7, base receiver 9, and wire or cable 15 as described in any of the embodiments above. In at least some embodiments, the movable arm 43 includes a forward extension 45 that fits over an edge (for example, the top edge) of the portable electronic device 1 (FIGS. 52E and 52F) and can include a lip 47 that contacts the front surface of the portable electronic device 1 to assist in maintaining the portable electronic device engaged with the docking cradle.

The movable arm 43 can be moved from an extended position (FIGS. 52A and 52B) to a close position (FIGS. 52C and 52D) and any intermediate position, such as an engaged position (FIGS. 52E and 52F) where the movable arm 43 engages the portable electronic device 1 and cover 100 to and maintains the engagement of these components to the docking cradle 5.

In the illustrated embodiment of FIGS. 52A-F, the moveable arm 43 is coupled to a spring 750 (FIGS. 52B, 52D, 52F) that is biased toward the close position of FIGS. 52C and 52D. It will be understood that other mechanical arrangements, such as a ratchet arrangement, can be used in place of the spring 750. The spring 750 resists the inadvertent disengagement of the portable electronic device 1 and cover 100 from the docking cradle 5 (as illustrated in FIGS. 52E and 52F). A user can extend the movable arm 43 away from the tray 7 to allow a portable electronic device to be placed on the tray followed by releasing the movable arm to allow the movable arm to engage the portable electronic device to hold the device on the docking cradle. The user can disengage the portable electronic device 1 and cover 100 from the docking cradle 5 by extending the movable arm away from the portable electronic device, cover, and tray 7 to release the portable electronic device and cover.

Figure 53:
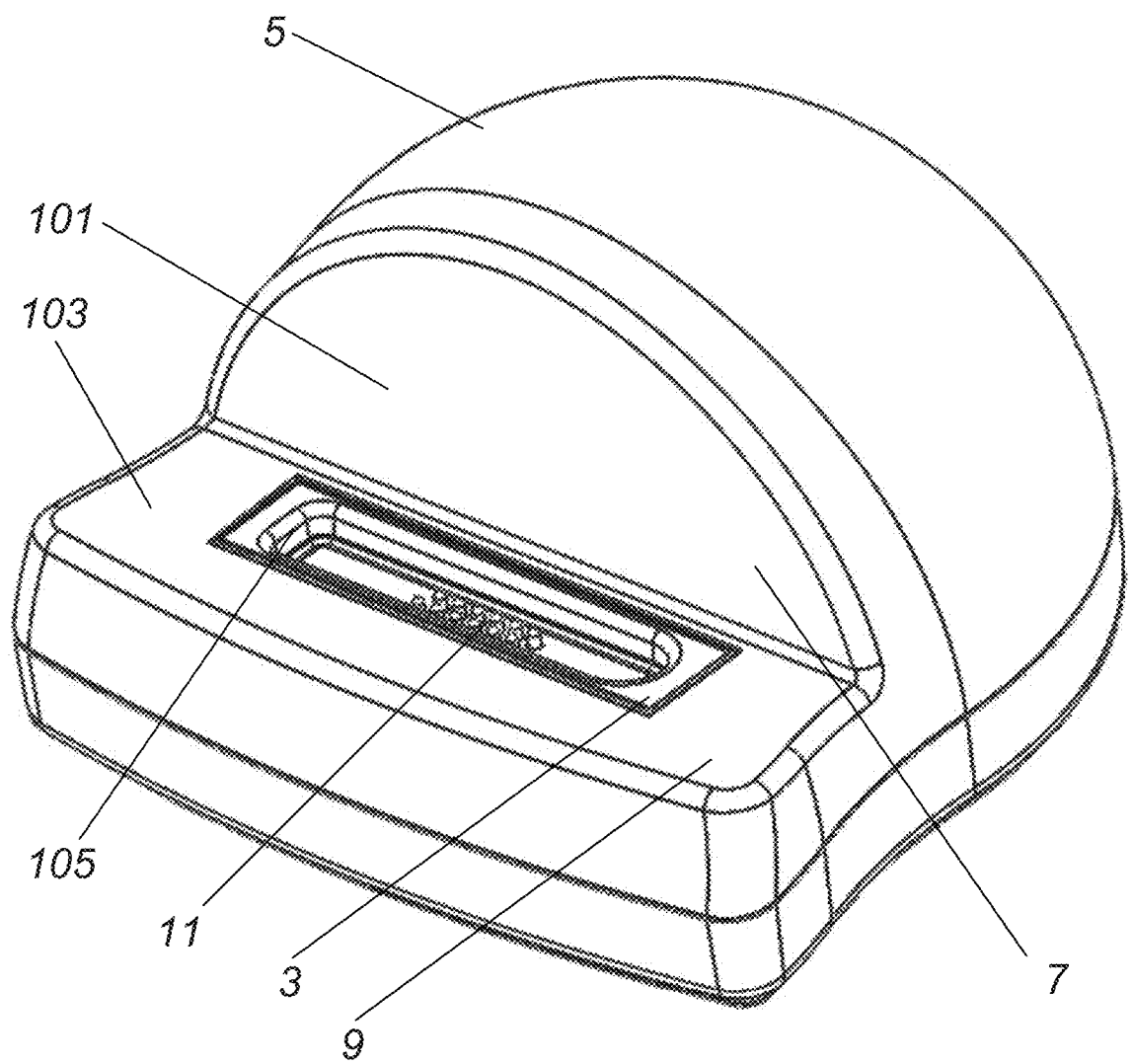
FIG. 53 is a perspective view of yet another docking cradle.

FIG. 53 illustrates another example of a docking cradle 5 similar to the docking cradles in FIGS. 48 and 49. The docking cradle 5 includes a tray 7 and a base receiver 9 upon which a portable electronic device 1 within a cover 100 can be placed. The tray 7 includes a back support surface 101 to support a back of the cover 100 and a docking support surface 103 extending from the back support surface (also shown, for example, in FIGS. 3, 4, 37, and 47). In at least some embodiments, the back support surface 101 and the docking support surface 103 form an angle in a range of 90 to 130 degrees or a range of 90 to 120 degrees or in a range of 90 to 100 degrees or equal to 90 degrees.

The docking cradle 5 includes a docking connector 3 which, in the illustrated examples, is a female connector. The docking connector 3 includes contacts 11 which may be, for example, biasing contacts such as biasing pins or biasing leaf springs or any other suitable type of contact. The docking connector 3 also includes a rim 105 which may be recessed with respect to the docking support surface, as illustrated in FIG. 53. In at least some embodiments, the rim 105 and docking connector 3 can be asymmetric, such as an elongated D-shape, as illustrated in FIG. 53, with a straight side and a curved side opposite the straight side. Such an arrangement may facilitate proper alignment when the cover is mated with the docking cradle.

Figure 54A:
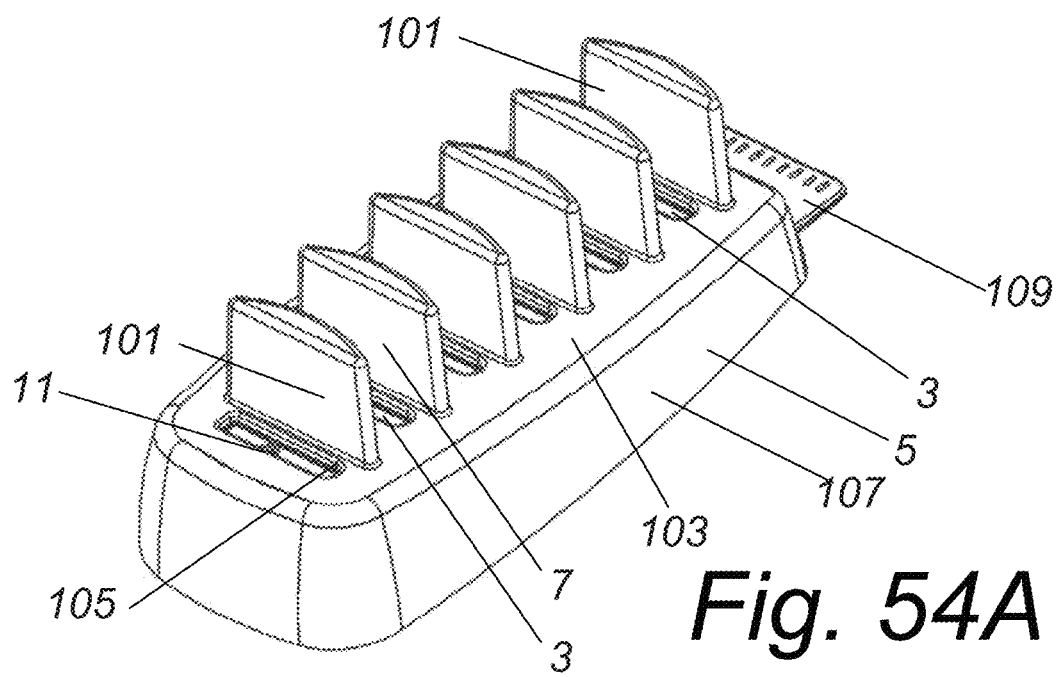
FIG. 54A is a perspective view of a docking cradle that can accommodate multiple electronic devices and covers.
Figure 54B:
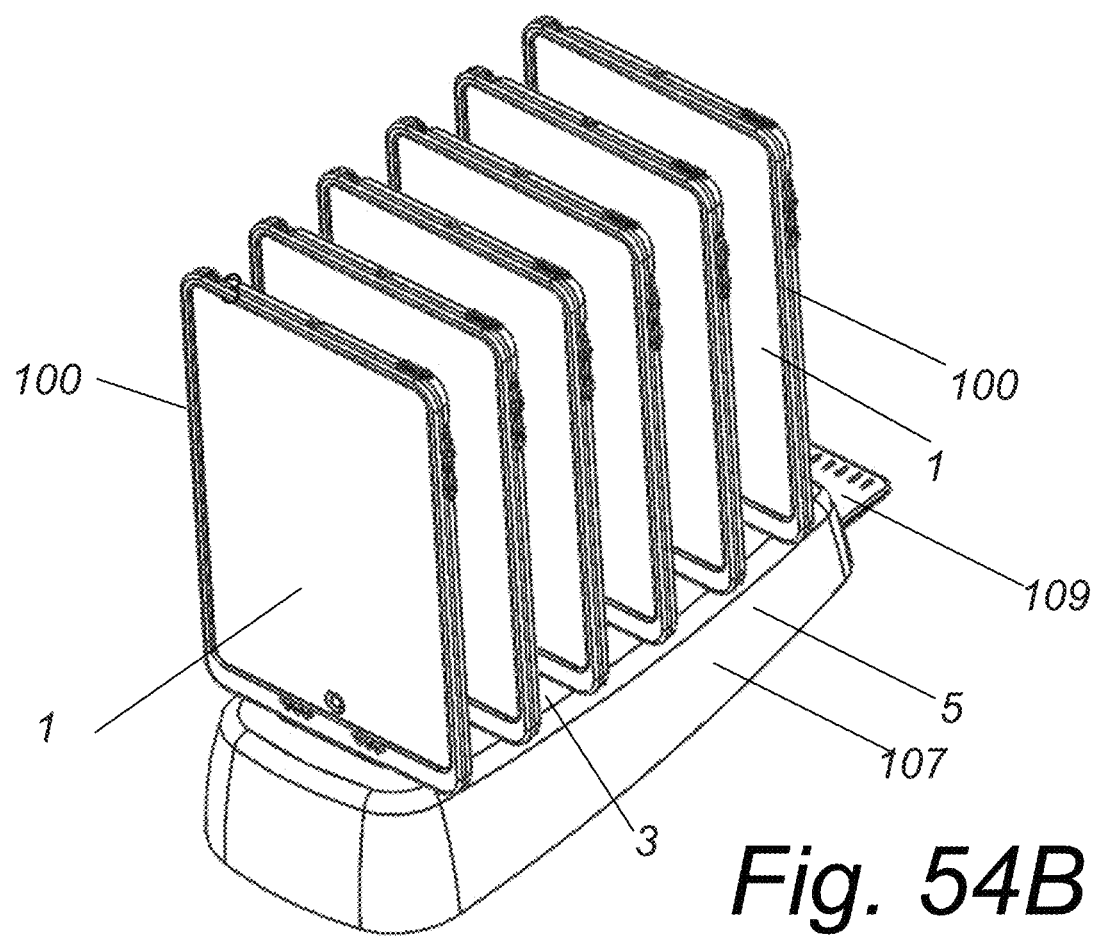
FIG. 54B is a perspective view of the docking cradle of FIG. 54A with multiple electronic devices and covers docked.

The docking cradle 5 of FIG. 53 is a stand-alone cradle that can be placed on any stable surface, such as a desk, shelf, credenza, table, or the like. FIGS. 54A-54B illustrate another docking cradle 3 with multiple back support surfaces 101 and docking connectors 3 with one or more docking support surfaces 103 formed in a housing 107. This can permit multiple electronic devices 1 in covers 100 to be docked in the docking cradle 3. One or more cables (not shown) or a connector 109 can extend from the docking cradle for attachment to another device where the docking cradle is simply an intermediary between the portable electronic device and the other device, such as a charger, computer, other portable electronic device, or the like. In these embodiments, the cable or connector exiting the docking cradle can be coupled to this other device. It will be understood that the docking connector of any of the docking cradles disclosed herein can utilize the magnetic coupling arrangement described above and may also include one or more guide pins as described above.

Figure 55A:
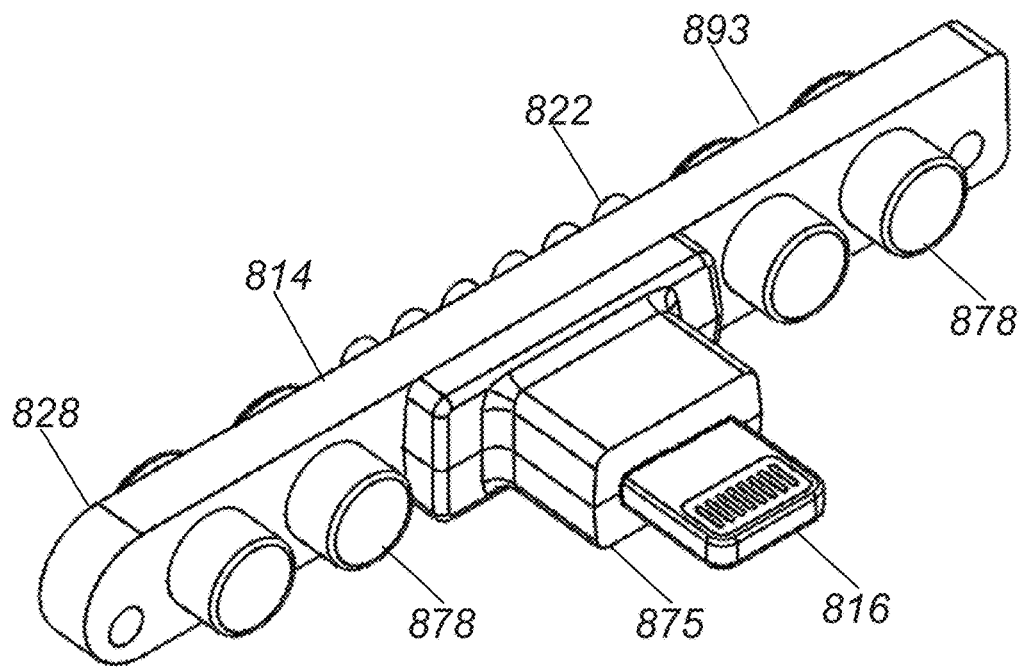
FIG. 55A is a perspective view of another embodiment of an adapter for use in a cover.
Figure 55B:
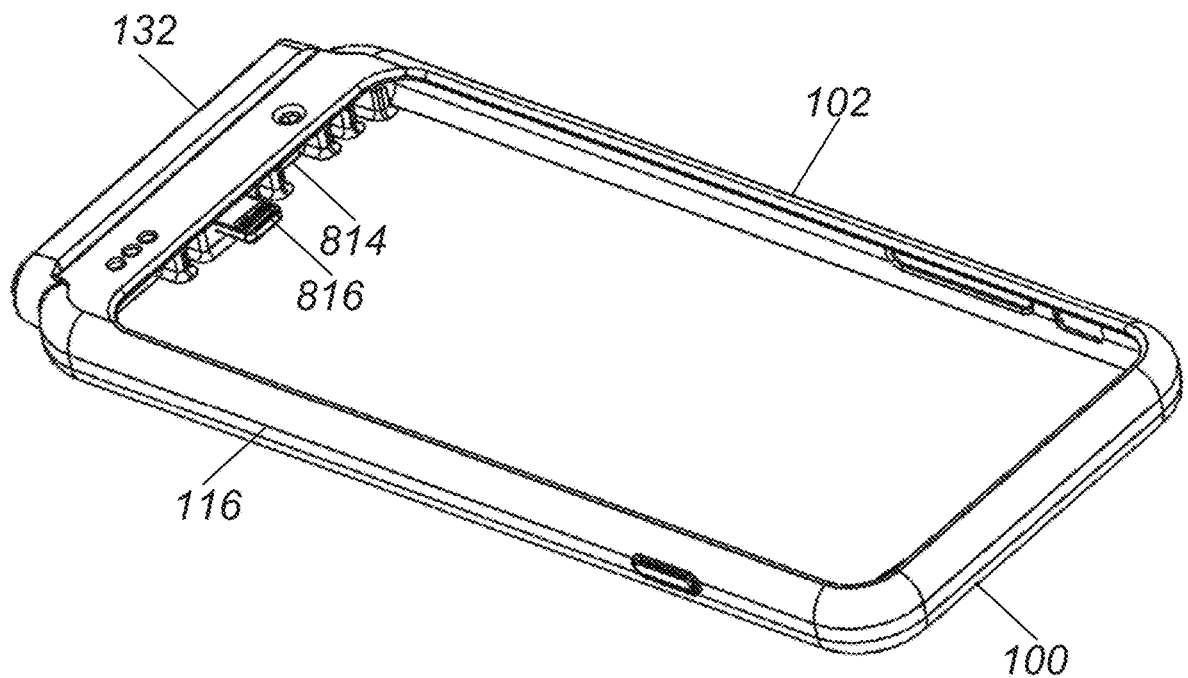
FIG. 55B is a perspective view of one embodiment of a cover with the adapter of FIG. 55A.
Figure 56A:
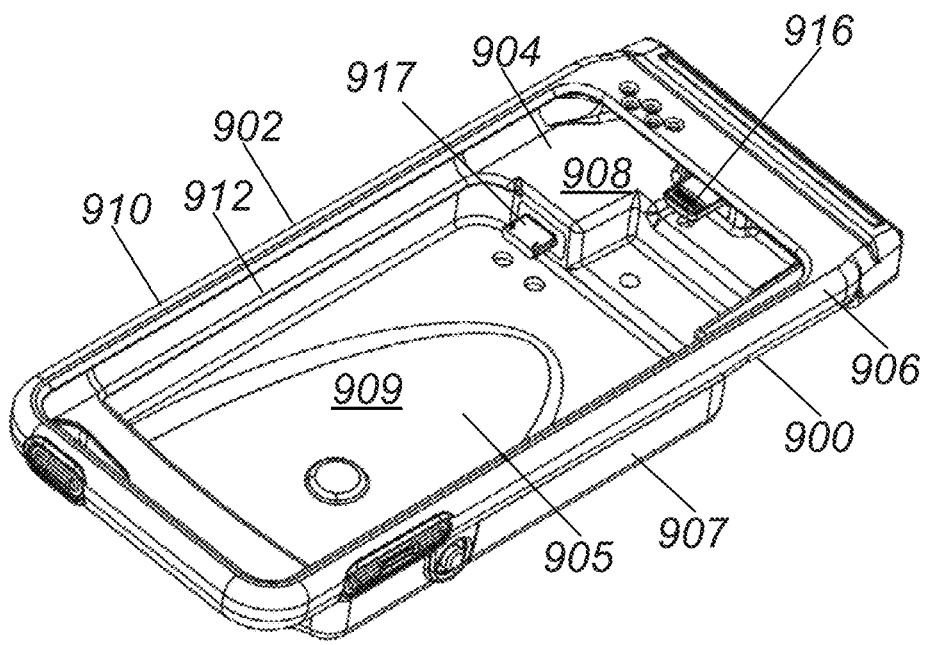
FIG. 56A is a perspective view of one embodiment of a cover with a peripheral cavity.
Figure 56B:
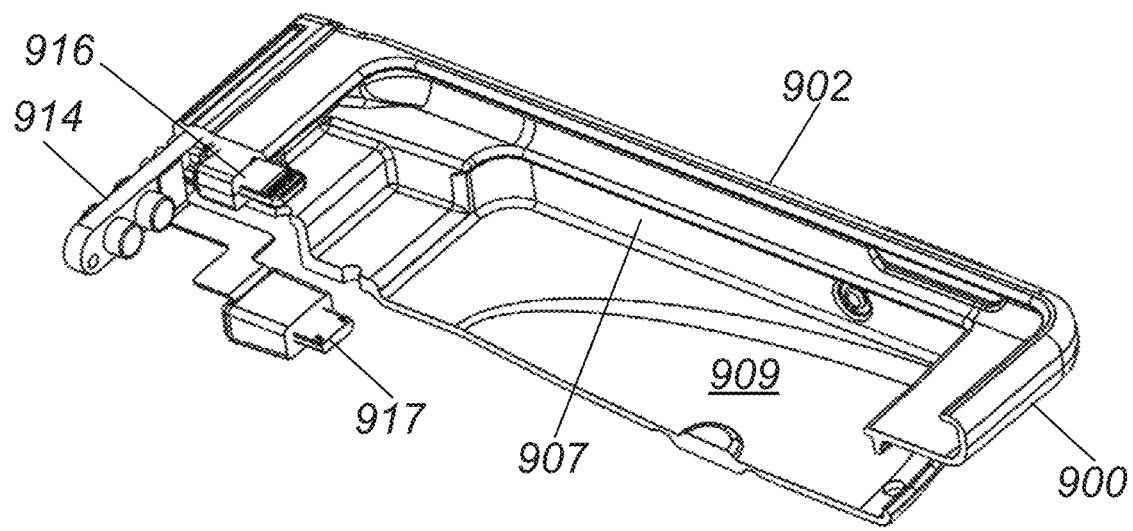
FIG. 56B is a perspective view of the cover of 56A with a portion of the cover cut-away.

FIG. 55A illustrates a portion of an adapter 814 and includes a male plug 816, electrical contacts 822, magnets 878 (or ferromagnetic members), and a body 828. The adapter 814 can be used in any of the covers described herein as an alternative to any of the adapters 114. The adapter 814 is positioned within the cover 100 with the side skirt 116 and dam 132 formed around portions of the adapter, as illustrated in FIG. 55B. In at least some embodiments, a portion of the shell 102 or dam 132 also covers a face 893 of the body 828 and the magnets 878 leaving a portion of the electrical contacts 822 exposed similar to the embodiments illustrated in FIGS. 39 and 41.

As described above, the electrical contacts 822 are electrically coupled to the electrical connectors of the plug 816 by conductors (see, electrical conductors 126 described above). It has been found that available arrangements of plugs and the conductors are not generally suitable for the high pressure injection molding process used to form with shell 102 of the cover 100. In such processes, the adapter 814 is an insert placed in the mold and the shell 102 of the cover 100 is molded around the adapter. It has been found that the plastic that forms the shell 102 may enter openings in the adapter 814 and can break or damage the conductors due to the high pressure of the molding process and may also fill the interior region, if present, of a connector and prevent mating with the corresponding female connector of the portable electronic device.

Accordingly, the adapter 814 includes a sealed housing 875 disposed around the conductors 126 and from which the plug 816 extends. The sealed housing 875 can be formed by low pressure injection molding around the portion of the adapter containing the conductors to form a relatively tight seal with the body 828 and the plug 816 to reduce or prevent flow of material between these components during the later high pressure injection molding process that forms the shell 102.

Figure 57A:
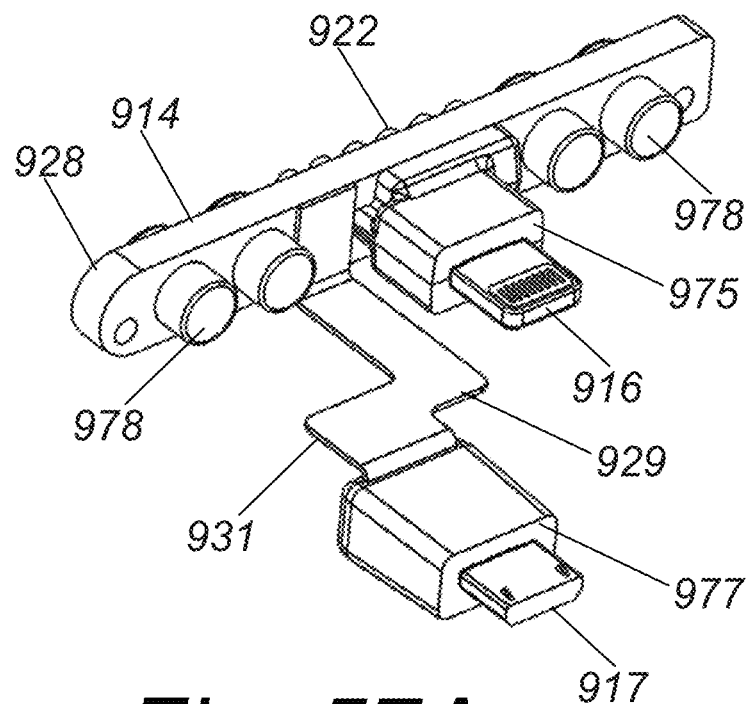
FIG. 57A is a perspective view of an adapter for use in a cover, such as the cover of FIG. 56A, with a peripheral cavity.
Figure 57B:
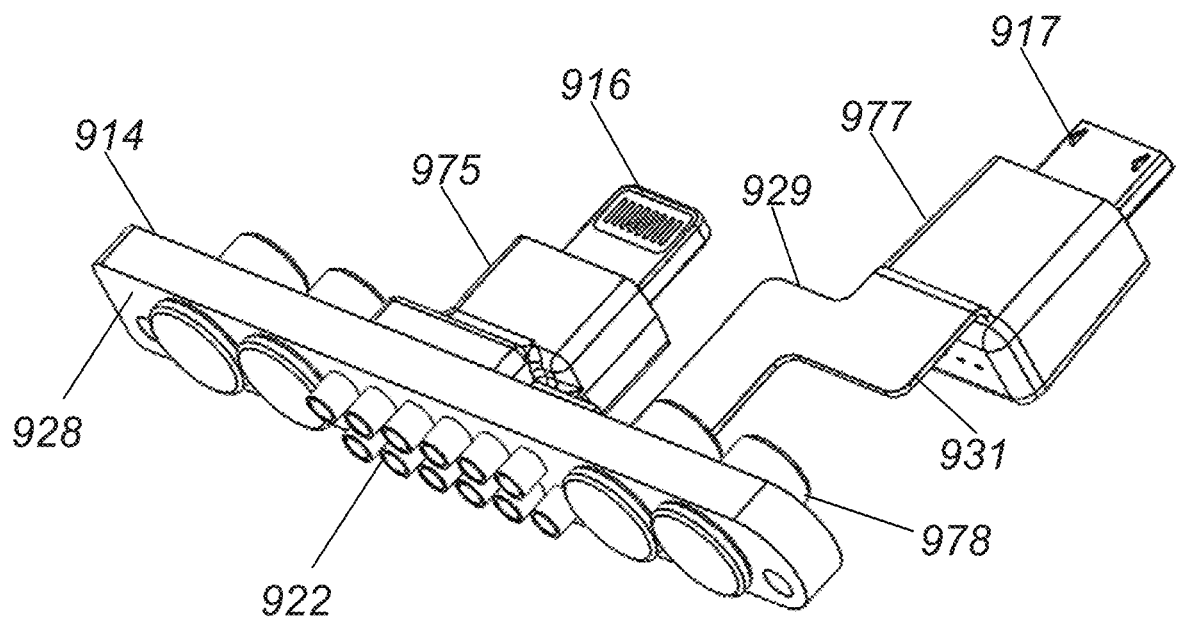
FIG. 57B is a perspective view of the adapter of FIG. 57A from a different angle.

FIGS. 57A and 57B illustrate another embodiment of a cover 900 that can receive a portable electronic device 1 (FIG. 45) and a peripheral device 50 (FIG. 44) as an alternative to the embodiments of cover 100 illustrated in FIGS. 42-46. Unless indicated otherwise, cover 900 can include any or all of the features described with respect to cover 100 illustrated in FIGS. 42-46 or any other cover 100 described herein.

The cover 900 includes a shell 902 with a center panel 904, a side skirt 906, a lip 910, a mouth opening 912, and an interior cavity 908 to receive the portable electronic device. In addition, the cover 900 includes a peripheral cavity 909 that forms a peripheral pocket for receiving the peripheral device 50. The peripheral cavity 909 can be formed using the center panel 904 and optionally part of the side skirt 906 or any other portion of the cover 900. The peripheral cavity 909 defines a device surface 905 and one or more side surfaces 907. In the illustrated embodiment, the peripheral cavity 909 and interior cavity 908 are contiguous and the peripheral device 50 can be inserted into the peripheral cavity 909 through the mouth opening 912 and interior cavity 908. As described above, in other embodiments, the peripheral device can be inserted through a different opening (i.e., a peripheral opening.) The peripheral opening can be positioned in the center panel 904 or along any one or more of the four sides of the side skirt 906. Also, as described above, in some embodiments, the cover can receive more than one peripheral.

In addition to the male plug 916, the cover 900 includes a peripheral plug 917. The peripheral plug 917 fits into the input/output socket of the peripheral device. The peripheral plug 917 may be designed for a particular peripheral device or may be suitable for multiple different devices.

FIGS. 57A and 57B illustrate one embodiment of a portion of an adapter 914 that includes both the male plug 916 and the peripheral plug 917, as well as a body 928, electrical contacts 922, magnets 978 (or ferromagnetic members), and a body 928. The electrical contacts 922 and magnets 978 are attached to the body and the male plug 916 is coupled to the body with the conductors that couple the male plug 916 to the electrical contacts 922 passing through the body.

The adapter 914 also includes a bridge 929 which is attached to the body 928. The bridge 929 contains a carrier 931 upon which the conductors (e.g., wires, conductive traces, or the like) that couple the electrical connectors of the peripheral plug 917 to the electrical contacts 922. In some embodiments, the conductors of the bridge 929 are attached directly to portions of the electrical contacts 922 that are exposed through the body 928 or the conductors can be coupled to the electrical contacts 922 through conductive vias, wires, or traces that pass through the body 928. In at least some embodiments, the carrier 931 is at least 0.4 mm thick in order to withstand the high pressure injection molding of the shell 902 of the cover 900. Thinner carriers may break apart during the injection molding process. The peripheral plug 917 includes one or more electrical connectors that connect to contacts within the peripheral device. This arrangement can be used to provide power to the peripheral device via the adapter 914. In at least some embodiments, the adapter 914 and associated conductors can be arranged so that the peripheral device provides power, data, or both to the portable electronic device through the adapter 914. In at least some embodiments, the male plug 916 and the peripheral plug 917 can both include a sealed housing 975, 977 as described above to prevent or reduce inflow of plastic material to the high injection molding process for forming the shell 902 of the cover 901 as described above.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. An arrangement, comprising:
   an adapter coupleable to a portable electronic device for mating with an external connector, the adapter comprising a contactor and a male positioning interface, the contactor comprising a contactor surface and a plurality of contacts exposed and arranged on the contactor surface and electrically coupleable to the portable electronic device, the male positioning interface defining a rim surrounding, and in contact with, a perimeter of the contactor surface of the contactor of the adapter to guide proper mating of the contactor of the adapter to the external connector; and
   a hard shell configured to receive the portable electronic device and adapter, wherein the hard shell is configured so that the adapter extends out of the hard shell for mating with the external connector;
   wherein the adapter is detachable from the hard shell by a user.

2. The arrangement of claim 1, wherein the adapter further comprises a male plug comprising a plurality of connectors configured for mating with a female socket of the portable electronic device to electrically couple the connectors to the portable electronic device, wherein the connectors are electrically coupled to the contacts of the contactor.

3. The arrangement of claim 1, wherein the hard shell defines an opening through which the adapter protrudes when received by the hard shell.

4. The arrangement of claim 1, further comprising a flexible cover configured to receive the portable electronic device and extend around four side faces of the portable electronic device and extend around a peripheral edge of both front and back faces of the portable electronic device, wherein the adapter forms part of the flexible cover.

5. The arrangement of claim 4, wherein the hard shell is configured to receive the electronic device received within the flexible cover.

6. The arrangement of claim 1, wherein the contacts are contact rings at least partially flush with the contact surface.

7. A docking system, comprising:
   the arrangement of claim 1; and
   a docking cradle comprising a tray configured to receive the arrangement and a docking connector comprising a plurality of contacts positioned to connect with one or more of the plurality of contacts of the contactor.

8. The docking system of claim 7, wherein the docking cradle further comprises a female base receiver configured to mate with the male positioning interface of the arrangement.

9. The docking system of claim 7, wherein the male positioning interface comprises a first magnetic coupling element and the docking cradle comprises a second magnetic coupling element, wherein the first magnetic coupling element comprises one of a magnetic material or a magnetically attractive material and the second magnetic coupling element comprises a different one of the magnetic material or the magnetically attractive material.

10. An arrangement, comprising:
    an adapter coupleable to a portable electronic device for mating with an external connector, the adapter comprising a contactor and a male positioning interface, the contactor comprising a contactor surface and a plurality of contacts exposed at the contactor surface and electrically coupleable to the portable electronic device, the male positioning interface defining a rim to guide proper mating of the contactor of the adapter to the external connector; and a hard shell configured to receive the portable electronic device and adapter, wherein the hard shell defines an opening through which the adapter protrudes when received by the hard shell;

wherein the adapter is detachable from the hard shell.

11. The arrangement of claim 10, wherein the contactor is at least partially embedded in the male positioning interface.

12. The arrangement of claim 10, further comprising a flexible cover configured to receive the portable electronic device and extend around four side faces of the portable electronic device and extend around a peripheral edge of both front and hack faces of the portable electronic device, wherein the adapter forms part of the flexible cover.

13. The arrangement of claim 12, wherein the hard shell is configured to receive the portable electronic device received within the flexible cover.

14. The arrangement of claim 10, wherein the adapter further comprises a male plug comprising a plurality of connectors configured for mating with a female socket of the portable electronic device to electrically couple the connectors to the portable electronic device, wherein the connectors are electrically coupled to the contacts of the contactor.

15. The arrangement of claim 10, wherein the contactor surface is flat and the contacts are at least partially flush with the flat contactor surface.

16. A docking system, comprising:
the arrangement of claim 10; and
a docking cradle comprising a tray configured to receive the arrangement and a docking connector comprising a plurality of contacts positioned to connect with one or more of the plurality of contacts of the contactor.

17. The docking system of claim 16, wherein the docking cradle further comprises a female base receiver configured to mate with the male positioning interface of the arrangement.

18. The docking system of claim 16, wherein the male positioning interface comprises a first magnetic coupling element and the docking cradle comprises a second magnetic coupling element, wherein the first magnetic coupling element comprises one of a magnetic material or a magnetically attractive material and the second magnetic coupling element comprises a different one of the magnetic material or the magnetically attractive material.

* * * * *